US011163317B2

(12) United States Patent
Kelkar et al.

(10) Patent No.: US 11,163,317 B2
(45) Date of Patent: Nov. 2, 2021

(54) SYSTEM AND METHOD FOR SHARED AUTONOMY THROUGH COOPERATIVE SENSING

(71) Applicant: Honda Motor Co., Ltd., Tokyo (JP)

(72) Inventors: Paritosh Kelkar, Dearborn, MI (US); Xue Bai, Novi, MI (US); Samer Rajab, Novi, MI (US); Hasan Tafish, Farmington Hills, MI (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/415,379

(22) Filed: May 17, 2019

(65) Prior Publication Data
US 2020/0042017 A1 Feb. 6, 2020

Related U.S. Application Data

(63) Continuation-in-part of application No. 16/050,158, filed on Jul. 31, 2018.

(51) Int. Cl.
B60W 30/165 (2020.01)
G05D 1/02 (2020.01)
(Continued)

(52) U.S. Cl.
CPC ......... G05D 1/0295 (2013.01); B60W 30/165 (2013.01); G01S 5/0072 (2013.01);
(Continued)

(58) Field of Classification Search
CPC ..... B60W 30/165; G08G 1/22; G05D 1/0295; G05D 2201/0213; G01S 5/0072; G01S 5/0284; G01S 19/51
See application file for complete search history.

(56) References Cited

U.S. PATENT DOCUMENTS 5,375,059 A 12/1994 Kyrtsos et al.
5,511,093 A 4/1996 Edler et al.
(Continued)

FOREIGN PATENT DOCUMENTS

CN 105141582 12/2015
CN 108181898 6/2018
(Continued)

OTHER PUBLICATIONS

J. Arbib and T. Seba, "Rethinking transportation 2020-2030," RethinkX, May 2017.
(Continued)

Primary Examiner — Hunter B Lonsberry
Assistant Examiner — Matthew J. Reda
(74) Attorney, Agent, or Firm — Rankin, Hill & Clark LLP

(57) ABSTRACT

Systems and methods for shared autonomy through cooperative sensing are described. According to one embodiment, a cooperative sensing system includes a rendezvous module that receives broadcast messages from a plurality of cooperating vehicles on the roadway. The rendezvous module also selects a subordinate vehicle from the plurality of cooperating vehicles based on the autonomy level of the subordinate vehicle as compared to an autonomy level of a principal vehicle. The cooperative sensing system also includes a positioning module that determines a cooperative position of the principal vehicle and the subordinate vehicle. The cooperative sensing system further includes a negotiation module that receives at least one cooperating parameter from the subordinate vehicle. The cooperative sensing system includes a perception module that initiates cooperative automation the subordinate vehicle according to the at least one cooperating parameter when the principal vehicle and (Continued)

the subordinate vehicle are positioned in the cooperative position.

20 Claims, 14 Drawing Sheets

(51) Int. Cl.
  *G08G 1/00* (2006.01)
  *G01S 5/02* (2010.01)
  *G01S 5/00* (2006.01)
(52) U.S. Cl.
  CPC .............. *G01S 5/0284* (2013.01); *G08G 1/22* (2013.01); *G05D 2201/0213* (2013.01)

(56) References Cited

U.S. PATENT DOCUMENTS

| | | | |
|---|---|---|---|
| 5,555,503 A | 9/1996 | Kyrtsos et al. | |
| 6,330,508 B1 | 12/2001 | Akabori et al. | |
| 6,356,820 B1 | 3/2002 | Hashimoto et al. | |
| 6,360,200 B1 | 3/2002 | Edler et al. | |
| 6,421,600 B1 | 7/2002 | Ross | |
| 6,445,983 B1 | 9/2002 | Dickson et al. | |
| 6,487,500 B2 | 11/2002 | Lemelson et al. | |
| 6,552,342 B2 | 4/2003 | Holz et al. | |
| 7,164,118 B2 | 1/2007 | Anderson et al. | |
| 7,233,683 B2 | 6/2007 | Han et al. | |
| 7,280,674 B2 | 10/2007 | Matveev | |
| 7,299,056 B2 | 11/2007 | Anderson | |
| 7,313,404 B2 | 12/2007 | Anderson | |
| 7,444,240 B2 | 10/2008 | Macneille et al. | |
| 7,646,336 B2 | 1/2010 | Tan et al. | |
| 7,760,889 B2 | 7/2010 | Form et al. | |
| 7,834,801 B2 | 11/2010 | Waite et al. | |
| 7,994,902 B2 | 8/2011 | Avery et al. | |
| 8,223,037 B2 | 7/2012 | Grotendorst et al. | |
| 8,229,663 B2 | 7/2012 | Zeng et al. | |
| 8,233,660 B2 | 7/2012 | Fritsch et al. | |
| 8,352,111 B2 | 1/2013 | Mudalige | |
| 8,401,758 B2 | 3/2013 | Stählin et al. | |
| 8,447,519 B2 | 5/2013 | Basnayake et al. | |
| 8,451,812 B2 | 5/2013 | Stählin et al. | |
| 8,457,123 B2 | 6/2013 | Grotendorst et al. | |
| 8,473,187 B2 | 6/2013 | Kammel et al. | |
| 8,564,657 B2 | 10/2013 | Michalke et al. | |
| 8,583,341 B2 | 11/2013 | Stählin et al. | |
| 8,643,510 B2 | 2/2014 | Schräbler et al. | |
| 8,666,591 B2 | 3/2014 | Stählin et al. | |
| 8,710,978 B2 | 4/2014 | Stählin et al. | |
| 8,775,063 B2 | 7/2014 | Zeng | |
| 8,812,226 B2 | 8/2014 | Zeng | |
| 8,862,384 B2 | 10/2014 | Stahlin et al. | |
| 8,983,771 B2 | 3/2015 | Breed | |
| 9,117,371 B2 | 8/2015 | Hutchings | |
| 9,123,993 B2 | 9/2015 | Schräbler et al. | |
| 9,189,961 B2 | 11/2015 | Mehr et al. | |
| 9,243,916 B2 | 1/2016 | Roumeliotis et al. | |
| 9,280,593 B1 | 3/2016 | Dykstra et al. | |
| 9,300,423 B2 | 3/2016 | Rubin et al. | |
| 9,316,718 B2 | 4/2016 | Stählin et al. | |
| 9,341,720 B2 | 5/2016 | Garin et al. | |
| 9,393,958 B2 | 7/2016 | Stählin et al. | |
| 9,472,097 B2 | 10/2016 | Stelzig et al. | |
| 9,488,480 B2 | 11/2016 | Georgy et al. | |
| 9,541,408 B2 | 1/2017 | Stählin et al. | |
| 9,563,808 B2 | 2/2017 | Zeng et al. | |
| 9,597,983 B2 | 3/2017 | Strasdat et al. | |
| 9,637,050 B2 | 5/2017 | Miura et al. | |
| 9,709,404 B2 | 7/2017 | Roumeliotis et al. | |
| 9,721,469 B2 | 8/2017 | Grotendorst et al. | |
| 9,786,171 B2 | 10/2017 | Prokhorov | |
| 9,830,823 B1 | 11/2017 | Chainer et al. | |
| 9,875,416 B2 | 1/2018 | Buerkle et al. | |
| 9,882,791 B2 | 1/2018 | Grotendorst et al. | |
| 9,886,857 B2 | 2/2018 | Linder et al. | |
| 9,921,581 B2 | 3/2018 | Tseng et al. | |
| 9,927,816 B2 | 3/2018 | Li et al. | |
| 9,935,875 B2 | 4/2018 | Grotendorst et al. | |
| 10,023,091 B2 | 7/2018 | Bendewald et al. | |
| 10,031,523 B2 | 7/2018 | Ricci et al. | |
| 10,053,095 B2 | 8/2018 | Habu | |
| 10,055,517 B2 | 8/2018 | Stählin et al. | |
| 10,089,419 B2 | 10/2018 | Michalke et al. | |
| 10,089,876 B1 | 10/2018 | Ramasamy et al. | |
| 10,115,314 B2 | 10/2018 | Boegel | |
| 10,168,418 B1 | 1/2019 | Al-Stouhi et al. | |
| 10,217,358 B2 | 2/2019 | Zydek et al. | |
| 10,262,541 B2 | 4/2019 | Miyazawa et al. | |
| 10,282,994 B2 | 5/2019 | Park et al. | |
| 10,366,289 B2 | 7/2019 | Puttagunta et al. | |
| 10,388,152 B2 | 8/2019 | Biehle et al. | |
| 2003/0102997 A1 | 6/2003 | Levin et al. | |
| 2006/0164292 A1 | 7/2006 | Buechler et al. | |
| 2007/0018890 A1 | 1/2007 | Kulyukin | |
| 2008/0040004 A1 | 2/2008 | Breed | |
| 2008/0064762 A1 | 3/2008 | Fuchs et al. | |
| 2008/0161986 A1 | 7/2008 | Breed | |
| 2009/0234859 A1 | 9/2009 | Grigsby et al. | |
| 2010/0100321 A1 | 4/2010 | Koenig et al. | |
| 2010/0131135 A1 | 5/2010 | Jaensch et al. | |
| 2010/0164789 A1 | 7/2010 | Basnayake | |
| 2011/0045089 A1 | 2/2011 | Lieb et al. | |
| 2011/0313665 A1 | 12/2011 | Lueke et al. | |
| 2014/0129075 A1 | 5/2014 | Carleton | |
| 2015/0019076 A1 | 1/2015 | Stählin et al. | |
| 2015/0127189 A1* | 5/2015 | Mehr .................. B60W 30/165 701/1 |
| 2015/0254781 A1 | 9/2015 | Binion et al. | |
| 2015/0358481 A1 | 12/2015 | Nagata et al. | |
| 2016/0054441 A1 | 2/2016 | Kuo et al. | |
| 2016/0063341 A1 | 3/2016 | Ogata et al. | |
| 2016/0075335 A1 | 3/2016 | Arndt et al. | |
| 2016/0086032 A1 | 3/2016 | Pickett | |
| 2016/0140729 A1 | 5/2016 | Soatto et al. | |
| 2016/0205656 A1 | 7/2016 | Zeng et al. | |
| 2016/0223643 A1 | 8/2016 | Li et al. | |
| 2016/0288798 A1 | 10/2016 | Michalke et al. | |
| 2016/0334805 A1 | 11/2016 | Rothoff et al. | |
| 2016/0349365 A1 | 12/2016 | Ling | |
| 2017/0017734 A1 | 1/2017 | Groh et al. | |
| 2017/0043771 A1 | 2/2017 | Ibanez-Guzman et al. | |
| 2017/0082737 A1 | 3/2017 | Slobodyanyuk et al. | |
| 2017/0082757 A1 | 3/2017 | Kunkel et al. | |
| 2017/0094248 A1 | 3/2017 | Kashyap | |
| 2017/0127249 A1 | 5/2017 | Li et al. | |
| 2017/0212527 A1 | 7/2017 | Park | |
| 2017/0243485 A1 | 8/2017 | Rubin et al. | |
| 2017/0278390 A1 | 9/2017 | Zydek et al. | |
| 2017/0278398 A1 | 9/2017 | Kato et al. | |
| 2017/0344023 A1* | 11/2017 | Laubinger ............. B60W 50/14 |
| 2018/0087907 A1 | 3/2018 | DeBitetto et al. | |
| 2018/0158322 A1 | 6/2018 | McDonnell et al. | |
| 2018/0160333 A1 | 6/2018 | Patil et al. | |
| 2018/0162394 A1* | 6/2018 | Kamiya ............. G06K 9/00805 |
| 2018/0167790 A1 | 6/2018 | Cavalcanti et al. | |
| 2018/0210463 A1* | 7/2018 | Switkes ............... G05D 1/0293 |
| 2018/0233040 A1 | 8/2018 | Zydek et al. | |
| 2018/0237012 A1 | 8/2018 | Jammoussi et al. | |
| 2018/0259976 A1 | 9/2018 | Williams et al. | |
| 2018/0284810 A1 | 10/2018 | Strunck et al. | |
| 2019/0012909 A1 | 1/2019 | Mintz | |
| 2019/0025818 A1 | 1/2019 | Mattingly et al. | |
| 2019/0054920 A1 | 2/2019 | Karlsson et al. | |
| 2019/0061757 A1 | 2/2019 | Garnault et al. | |
| 2019/0073545 A1 | 3/2019 | Dolgov et al. | |
| 2019/0079538 A1 | 3/2019 | Switkes et al. | |
| 2019/0080610 A1 | 3/2019 | Kokaki | |
| 2019/0086914 A1* | 3/2019 | Yen ..................... G05D 1/0212 |
| 2019/0096264 A1 | 3/2019 | Mando | |
| 2019/0154790 A1 | 5/2019 | Strunck | |
| 2019/0176769 A1 | 6/2019 | Strasdat et al. | |
| 2019/0184993 A1 | 6/2019 | Wigard et al. | |
| 2019/0236959 A1 | 8/2019 | Belapurkar et al. | |

(56) References Cited

U.S. PATENT DOCUMENTS

| | | | |
|---|---|---|---|
| 2019/0243381 A1 | 8/2019 | Strunck et al. | |
| 2019/0310648 A1 | 10/2019 | Yang et al. | |
| 2019/0344785 A1 | 11/2019 | Banzhaf et al. | |
| 2019/0354101 A1 | 11/2019 | Sujan et al. | |
| 2020/0013281 A1 | 1/2020 | Eriksson et al. | |
| 2020/0042013 A1* | 2/2020 | Kelkar | H04W 4/40 |
| 2020/0042017 A1 | 2/2020 | Kelkar et al. | |
| 2020/0133307 A1* | 4/2020 | Kelkar | G08G 1/22 |
| 2020/0312155 A1* | 10/2020 | Kelkar | G08G 1/096758 |

FOREIGN PATENT DOCUMENTS

| | | |
|---|---|---|
| CN | 108376470 | 8/2018 |
| CN | 108489712 A | 9/2018 |
| CN | 108534944 A | 9/2018 |
| CN | 108711300 | 10/2018 |
| CN | 109212354 A | 1/2019 |
| CN | 208568237 U | 3/2019 |
| CN | 109782185 A | 5/2019 |
| CN | 209590155 U | 11/2019 |
| DE | 19802590 C2 | 7/2002 |
| DE | 10123568 A1 | 11/2002 |
| DE | 4220296 B4 | 6/2004 |
| DE | 4220228 B4 | 10/2004 |
| DE | 102004021290 A1 | 3/2005 |
| DE | 102005012599 A1 | 11/2005 |
| DE | 102004048119 B4 | 4/2006 |
| DE | 102004062811 A1 | 6/2006 |
| DE | 102005007428 A1 | 8/2006 |
| DE | 102005015202 A1 | 8/2006 |
| DE | 102008005004 A1 | 7/2008 |
| DE | 102007049305 A1 | 4/2009 |
| DE | 102009007177 A1 | 8/2009 |
| DE | 102009048285 A1 | 4/2010 |
| DE | 102008056604 B4 | 5/2010 |
| DE | 102004056380 B4 | 7/2010 |
| DE | 102006010462 B4 | 7/2010 |
| DE | 102010002092 A1 | 12/2010 |
| DE | 102009053734 A1 | 5/2011 |
| DE | 102009058611 A1 | 6/2011 |
| DE | 102010001276 A1 | 7/2011 |
| DE | 102010030867 A1 | 1/2012 |
| DE | 102011113316 A1 | 3/2012 |
| DE | 102011108292 A1 | 4/2012 |
| DE | 102010053788 A1 | 6/2012 |
| DE | 102011004316 A1 | 8/2012 |
| DE | 102012002762 A1 | 8/2013 |
| DE | 102005003181 B4 | 9/2013 |
| DE | 102009020989 B4 | 5/2014 |
| DE | 102013217482 A1 | 3/2015 |
| DE | 102013225778 A1 | 6/2015 |
| DE | 102013227013 A1 | 6/2015 |
| DE | 102014202385 A1 | 8/2015 |
| DE | 102014202387 A1 | 8/2015 |
| DE | 102014210170 A1 | 12/2015 |
| DE | 102014213296 A1 | 1/2016 |
| DE | 102014013870 A1 | 3/2016 |
| DE | 102014206454 B4 | 3/2016 |
| DE | 102014224718 A1 | 6/2016 |
| DE | 102005049468 B4 | 7/2016 |
| DE | 102016204490 A1 | 10/2016 |
| DE | 102015211065 A1 | 12/2016 |
| DE | 102015212652 A1 | 1/2017 |
| DE | 102015214795 A1 | 2/2017 |
| DE | 102015215852 A1 | 2/2017 |
| DE | 102015216074 | 3/2017 |
| DE | 102015216386 A1 | 3/2017 |
| DE | 102015216748 A1 | 3/2017 |
| DE | 102016200054 A1 | 7/2017 |
| DE | 102016200501 A1 | 7/2017 |
| DE | 102016214724 A1 | 2/2018 |
| DE | 102016214876 A1 | 2/2018 |
| DE | 102016215523 A1 | 2/2018 |
| DE | 102016217089 A1 | 3/2018 |
| DE | 102016218934 A1 | 3/2018 |
| DE | 102006038348 B4 | 5/2018 |
| DE | 102016223447 A1 | 5/2018 |
| DE | 102016224576 A1 | 6/2018 |
| DE | 102017208330 A1 | 11/2018 |
| DE | 102018216082 A1 | 12/2018 |
| DE | 102018217775 A1 | 1/2019 |
| DE | 102017213848 A1 | 2/2019 |
| DE | 102016215524 B4 | 3/2019 |
| DE | 102017223510 A1 | 6/2019 |
| DE | 102018200863 A1 | 7/2019 |
| DE | 102018002609 A1 | 10/2019 |
| DE | 102018004375 A1 | 12/2019 |
| EP | 2056235 A1 | 6/2009 |
| EP | 2256690 B1 | 8/2016 |
| JP | 6432834 B2 | 11/2018 |
| KR | 101406194 | 6/2014 |
| KR | 101996235 | 7/2019 |
| WO | 2004031877 | 4/2004 |
| WO | WO200615891 A1 | 2/2006 |
| WO | WO200930520 A1 | 3/2009 |
| WO | WO200930532 A1 | 3/2009 |
| WO | WO200974656 A1 | 6/2009 |
| WO | WO2010139647 A1 | 12/2010 |
| WO | WO2010139807 A1 | 12/2010 |
| WO | WO201320619 A1 | 2/2013 |
| WO | WO201525050 A1 | 2/2015 |
| WO | WO201551988 A1 | 4/2015 |
| WO | WO201551990 A2 | 4/2015 |
| WO | WO201559195 A1 | 4/2015 |
| WO | WO2015047174 | 4/2015 |
| WO | WO201620290 A1 | 2/2016 |
| WO | WO201687117 A1 | 6/2016 |
| WO | WO2017048842 | 3/2017 |
| WO | WO201797596 A2 | 6/2017 |
| WO | WO201836824 A1 | 3/2018 |
| WO | WO201850181 A1 | 3/2018 |
| WO | WO2018146315 | 8/2018 |
| WO | WO2018202448 A1 | 11/2018 |
| WO | WO2019015897 A1 | 1/2019 |
| WO | WO2019162027 | 8/2019 |
| WO | WO2019192909 A1 | 10/2019 |
| WO | WO2019206377 A1 | 10/2019 |
| WO | WO2019206378 A1 | 10/2019 |

OTHER PUBLICATIONS

C. Bergenhem, S. Shladover, E. Coelingh, C. Englund, and S. Tsugawa, "Overview of platooning systems," in Proceedings of the 19th ITS World Congress, Oct. 22-26, Vienna, Austria (2012), 2012.

M. Boban, A. Kousaridas, K. Manolakis, J. Eichinger, and W. Xu, "Use cases, requirements, and design considerations for 5g v2x," arXiv preprint arXiv:1712.01754, 2017.

F. Camarda, F. Davoine, and V. Cherfaoui, "Fusion of evidential occupancy grids for cooperative perception," in 2018 13th Annual Conference on System of Systems Engineering (SoSE), Jun. 2018, pp. 284-290.

R. C. Coulter, "Implementation of the pure pursuit path tracking algorithm," Carnegie-Mellon UNIV Pittsburgh PA Robotics INST, Tech. Rep., 1992.

J. Gan, M. Vasic, and A. Martinoli, "Cooperative multiple dynamic object tracking on moving vehicles based on Sequential Monte Carlo Probability Hypothesis Density filter," in 2016 IEEE 19th International Conference on Intelligent Transportation Systems (ITSC), Nov. 2016, pp. 2163-2170.

P. E. Hart, N. J. Nilsson, and B. Raphael, "A formal basis for the heuristic determination of minimum cost paths," Systems Science and Cybernetics, IEEE Transactions on, vol. 4, No. 2, pp. 100-107, Jul. 1968.

R. Jonker and T. Volgenant, "Improving the hungarian assignment algorithm," Operations Research Letters, vol. 5, No. 4, pp. 171-175, 1986.

S. Kim, B. Qin, Z. J. Chong, X. Shen, W. Liu, M. H. Ang, E. Frazzoli, and D. Rus, "Multivehicle Cooperative Driving Using Cooperative Perception: Design and Experimental Validation," IEEE Transactions on Intelligent Transportation Systems, vol. 16, No. 2, pp. 663-680, Apr. 2015.

(56) References Cited

OTHER PUBLICATIONS

H. W. Kuhn, "The hungarian method for the assignment problem," Naval research logistics quarterly, vol. 2, No. 1-2, pp. 83-97, 1955.
W. Liu, S. W. Kim, Z. J. Chong, X. T. Shen, and M. H. Ang, "Motion planning using cooperative perception on urban road," in 2013 6th IEEE Conference on Robotics, Automation and Mechatronics (RAM), Nov. 2013, pp. 130-137.
S. W. M. C. S. Lynen, M. W. Achtelik and R. Siegwart, "A robust and modular multi-sensor fusion approach applied to mav navigation," Nov. 2013, pp. 3923-3929.
T. C. Ng, J. I. Guzman, and M. D. Adams, "Autonomous vehicle-following systems: A virtual trailer link model," in 2005 IEEE/RSJ international conference on intelligent robots and systems. IEEE, 2005, pp. 3057-3062.
E. C. Olsen, S. E. Lee, W. W. Wierwille, and M. J. Goodman, "Analysis of distribution, frequency, and duration of naturalistic lane changes," in Proceedings of the Human Factors and Ergonomics Society Annual Meeting, vol. 46, No. 22. SAGE Publications Sage CA: Los Angeles, CA, 2002, pp. 1789-1793.
M. Pivtoraiko and A. Kelly, "Efficient constrained path planning via search in state lattices," in International Symposium on Artificial Intelligence, Robotics, and Automation in Space, 2005.
J. Ploeg, E. Semsar-Kazerooni, A. I. M. Medina, J. F. C. M. de Jongh, J. van de Sluis, A. Voronov, C. Englund, R. J. Bril, H. Salunkhe, Á. Arrúe, A. Ruano, L. Garćia-Sol, E. van Nunen, and N. van de Wouw, "Cooperative Automated Maneuvering at the 2016 Grand Cooperative Driving Challenge," IEEE Transactions on Intelligent Transportation Systems, vol. 19, No. 4, pp. 1213-1226, Apr. 2018.
A. Rauch, S. Maier, F. Klanner, and K. Dietmayer, "Inter-vehicle object association for cooperative perception systems," in 16th International IEEE Conference on Intelligent Transportation Systems (ITSC 2013), Oct. 2013, pp. 893-898.
T. Robinson, E. Chan, and E. Coelingh, "Operating platoons on public motorways: An introduction to the sartre platooning programme," in 17th world congress on intelligent transport systems, vol. 1, 2010, p. 12.
S. Saxena, I. K. Isukapati, S. F. Smith, and J. M. Dolan, "Multiagent Sensor Fusion for Connected & Autonomous Vehicles to Enhance Navigation Safety," p. 13.
S. E. Shladover, C. Nowakowski, X.-Y. Lu, and R. Ferlis, "Cooperative adaptive cruise control: Definitions and operating concepts," Transportation Research Record, vol. 2489, No. 1, pp. 145-152, 2015.
S. Singh, "Critical reasons for crashes investigated in the national motor vehicle crash causation survey," Tech. Rep., 2015.
S. Standard, "J3016.", Taxonomy and Definitions for Terms Related to On-Road Motor Vehicle Automated Driving Systems, vol. 4, pp. 593-598, 2014.
R. Stem, S. Cui, M.L. Delle Monache, R. Bhadani, M. Bunting, M. Churchill, N. Hamilton, R. Haulcy, H. Pohlmann, F. Wu, B. Piccoli, B. Seibold, J. Sprinkle, and D. Work, "Dissipation of stop-and-go waves via control autonomous vehicles: Field experiments", arXiv:1705.01693v1, May 4, 2017.
D. Swaroop and S. M. Yoon, "The design of a controller for a following vehicle in an emergency lane change maneuver," 1999.
H.-S. Tan, R. Rajamani, and W.-B. Zhang, "Demonstration of an automated highway platoon system," in Proceedings of the 1998 American Control Conference. ACC (IEEE Cat. No. 98CH36207), vol. 3. IEEE, 1998, pp. 1823-1827.
Office Action of U.S. Appl. No. 15/851,536 dated Mar. 19, 2020, 51 pages.
Office Action of U.S. Appl. No. 16/050,158 dated Feb. 14, 2020, 61 pages.
Office Action of U.S. Appl. No. 15/686,262 dated Nov. 7, 2019, 29 pages.
Office Action of U.S. Appl. No. 15/686,262 dated Jan. 14, 2020, 42 pages.
An Adaptive TDMA Slot Assignment Strategy in Vehicular Ad Hoc Networks http://www.riverpublishers.com/journal_read_html_article.php?j=JMMC/1/2/6, printed Dec. 21, 2017.
Notice of Allowance of U.S. Appl. No. 15/686,262 dated May 20, 2019, 9 pages.
Notice of Allowance of U.S. Appl. No. 15/686,262 dated Apr. 21, 2020, 14 pages.
Office Action of U.S. Appl. No. 16/050,158 dated Oct. 1, 2020, 24 pages.
Office Action of U.S. Appl. No. 15/851,536 dated Oct. 30, 2020, 33 pages.
University of Tennessee, Lease Squares Mean, Sep. 5, 2006, http://dawg.utk.edu/glossary/g_least_squares_means.htm (Year: 2006).
Office Action of U.S. Appl. No. 15/851,536 dated Jun. 23, 2020, 56 pages.
Office Action of U.S. Appl. No. 16/050,158 dated Jun. 18, 2020, 47 pages.
Office Action of U.S. Appl. No. 16/050,158 dated Mar. 12, 2021, 25 pages.
Notice of Allowance of U.S. Appl. No. 16/050,158 dated Jul. 20, 2021, 14 pages.

* cited by examiner

SYSTEM AND METHOD FOR SHARED AUTONOMY THROUGH COOPERATIVE SENSING

BACKGROUND

Vehicles have varying levels of autonomy. Some vehicles can assist drivers with lane keeping and parallel parking, while vehicles with higher levels of autonomy can maneuver on busy city streets and congested highways without driver intervention. For example, a high autonomy vehicle may maneuver without driver intervention based on the manner in which a lead vehicle, ahead of the high autonomy vehicle, is maneuvering. The high autonomy vehicle follows the lead vehicle using its increased sensing ability to track and mirror the movements of the lead vehicle. Accordingly, the high autonomy vehicle does not need to communicate with the lead vehicle. Instead, the high autonomy vehicle maneuvers based on the lead vehicle regardless of the lead vehicle's autonomy level or communication capability, because the high autonomy vehicle is performing all the sensing, decision making, trajectory calculations, etc. Accordingly, the high autonomy vehicle is completely reliant on only its own sensing ability and there is no benefit to the lead vehicle.

BRIEF DESCRIPTION

According to one aspect, a cooperative sensing system of a principal vehicle for providing enhanced autonomy to a subordinate vehicle on a roadway is described. The cooperative sensing system includes a rendezvous module that receives broadcast messages from a plurality of cooperating vehicles on the roadway. A broadcast message, received from a cooperating vehicle of the plurality of cooperating vehicles, includes a vehicle identifier and an autonomy level of the cooperating vehicle. The rendezvous module also selects the subordinate vehicle from the plurality of cooperating vehicles based on the autonomy level of the subordinate vehicle as compared to the autonomy level of the principal vehicle. The cooperative sensing system also includes a positioning module that determines a cooperative position of the principal vehicle and the subordinate vehicle. The cooperative sensing system further includes a negotiation module that receives at least one cooperating parameter from the subordinate vehicle. The parameter defines a behavioral aspect of the subordinate vehicle. The cooperative sensing system includes a perception module that initiates cooperative automation with the subordinate vehicle according to the at least one cooperating parameter when the principal vehicle and the subordinate vehicle are positioned in the cooperative position.

Accordingly, to another aspect, a computer-implemented method for a principal vehicle to provide enhanced autonomy to a subordinate vehicle on a roadway includes receiving broadcast messages from a plurality of cooperating vehicles on the roadway. A broadcast message received from a cooperating vehicle of the plurality of cooperating vehicles includes an autonomy level of the cooperating vehicle. The computer-implemented method also includes selecting the subordinate vehicle from the plurality of cooperating vehicles based on a lower autonomy level of the subordinate vehicle as compared to the principal vehicle. The computer-implemented method further includes determining a cooperative position of the principal vehicle and the subordinate vehicle. The computer-implemented method yet further includes sending a cooperative proposal to the subordinate vehicle and receiving acceptance of the cooperative proposal. The cooperative proposal includes a pecuniary arrangement for cooperative automation. The computer-implemented method also includes receiving at least one cooperating parameter from the subordinate vehicle. The parameter defines a behavioral aspect of the subordinate vehicle. The computer-implemented method further includes controlling the subordinate vehicle according to the at least one cooperating parameter when the principal vehicle and the subordinate vehicle are positioned in the cooperative position.

According to a further aspect, a non-transitory computer-readable storage medium including instructions that when executed by a processor, cause the processor to receive broadcast messages from a plurality of cooperating vehicles on the roadway. A broadcast message received from a cooperating vehicle of the plurality of cooperating vehicles includes an autonomy level of the cooperating vehicle. A subordinate vehicle is selected from the plurality of cooperating vehicles based on a lower autonomy level of the subordinate vehicle as compared to the principal vehicle. The instructions, when executed by a processor, further cause the processor to determine a cooperative position of the principal vehicle and the subordinate vehicle and receive at least one cooperating parameter from the subordinate vehicle. The parameter defines a behavioral aspect of the subordinate vehicle. The instructions, when executed by a processor, also cause the processor to receive rearward subordinate sensor data from the subordinate vehicle. The rearward subordinate sensor data is combined with principal sensor data from the principal vehicle to generate combined sensor data. The instructions, when executed by a processor, further cause the processor to plan a path based on the combined sensor data.

The instructions, when executed by a processor, further cause the processor to receive vehicle occupant data about a vehicle occupant of the subordinate vehicle or the principal vehicle. A vehicle occupant state is determined based on the vehicle occupant data. The instructions, when executed by a processor, also cause the processor to control the subordinate vehicle on the planned path according to the at least one cooperating parameter when the principal vehicle and the subordinate vehicle are positioned in the cooperative position. The instructions, when executed by a processor, further cause the processor to identify a cooperating state associated with the vehicle occupant state that modifies the at least one cooperating parameter.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings.

DETAILED DESCRIPTION

Figure 1:
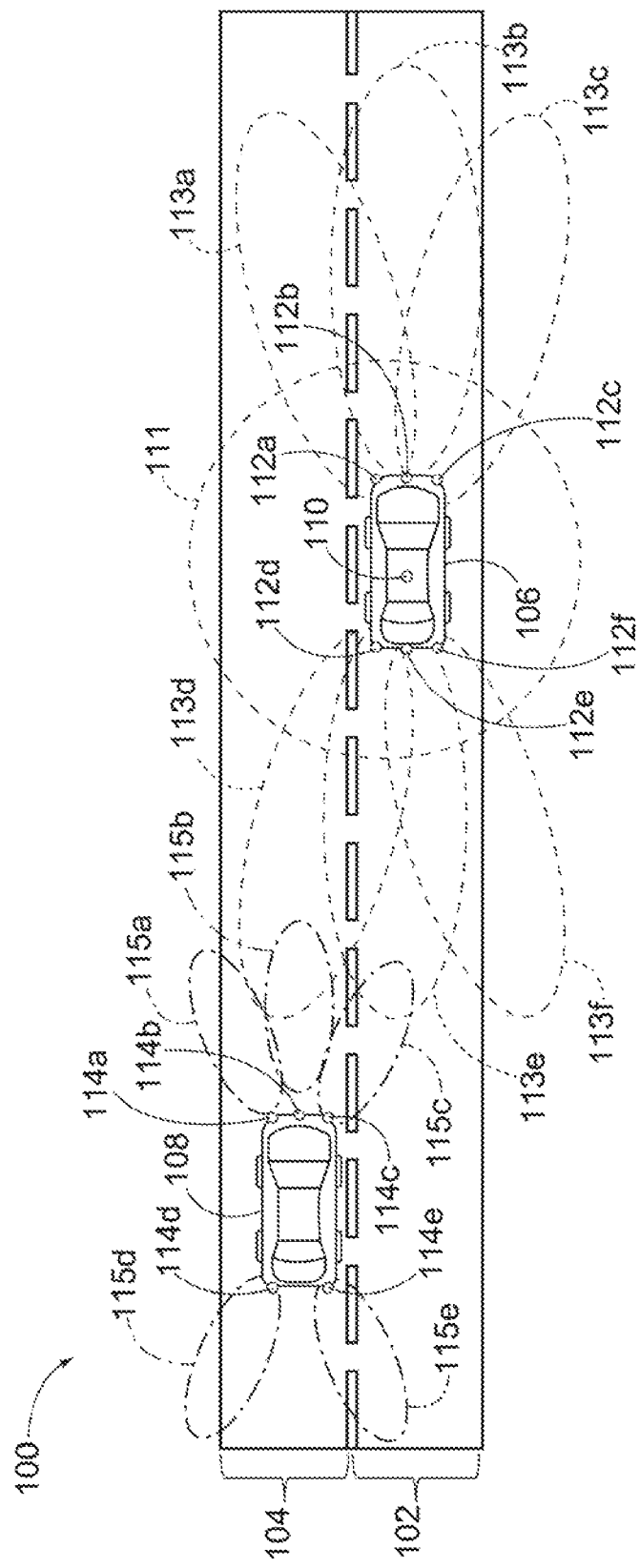
FIG. 1 is a schematic view of an exemplary traffic scenario on a roadway according to one embodiment.

The systems and methods discussed herein are generally directed to shared autonomy through cooperative sensing between cooperating vehicles. Shared autonomy occurs when cooperating vehicles participate in cooperative automation. During cooperative automation, a principal vehicle provides a subordinate vehicle with data, functionality, and/or control that allows the subordinate vehicle to function in a manner consistent with a higher level of autonomy than the inherent level of autonomy of the subordinate vehicle. Cooperative automation also occurs when the subordinate vehicle provides the principal vehicle with sensor data, information, and/or remuneration for the principal vehicle's cooperation.

The cooperative sensing allows a vehicle having a higher level of autonomy, the principal vehicle, to extend its sensing capability and path planning ability to a vehicle having a lower level of autonomy, the subordinate vehicle. For example, the principal vehicle may use principal sensor data from its own sensors, as well as subordinate sensor data from the subordinate vehicle to plan a path for the subordinate vehicle. The principal vehicle provides navigation data to the subordinate vehicle, which allows the subordinate vehicle to maneuver with the principal vehicle even though the subordinate vehicle may not have the autonomy level necessary to independently maneuver. Because the decision making is performed by the principal vehicle, during cooperative automation, a vehicle occupant of the subordinate vehicle would perceive that the subordinate vehicle as having a higher level of autonomy than it does. In this manner, subordinate vehicles are able to take advantage of the increased sensing capability and path planning of the principal vehicles.

Furthermore, in some embodiments, the principal vehicle is able to leverage the support provided to the subordinate vehicle. For example, the principal vehicle may send the subordinate vehicle business parameters that include a pecuniary arrangement for cooperative automation. In another embodiment, a principal vehicle sharing autonomy with a subordinate vehicle may have access to a restricted lane (e.g., high occupancy vehicle lane, increased speed lane, etc.). Cooperative sensing also enlarges the sensing area of the principal vehicle thereby allowing the principal vehicle to plan more informed and safer paths. Accordingly, both the principal vehicle and the subordinate vehicle can benefit from a cooperative automation.

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, instructions for execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, vehicle to cloud communications, among others. Computer communication can utilize any type of wired, wireless, or network communication protocol including, but not limited to, Ethernet (e.g., IEEE 802.3), Wi-Fi (e.g., IEEE 802.11), communications access for land mobiles (CALM), WiMAX, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, buildings, landmarks, obstructions in the roadway, road segments, intersections, etc. Thus, obstacles may be identified, detected, or associated with a path along a route on which a vehicle is travelling or is projected to travel along.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

"Vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

I. System Overview

Referring now to the drawings, the drawings are for purposes of illustrating one or more exemplary embodiments and not for purposes of limiting the same. FIG. 1 is a schematic view of an exemplary traffic scenario on a roadway 100 that will be used to describe shared autonomy through cooperative sensing according to one embodiment. The roadway 100 can be any type of road, highway, freeway, or travel route. In FIG. 1, the roadway 100 includes a first lane 102 and a second lane 104 with vehicles traveling in the same longitudinal direction, however, the roadway 100 can have various configurations not shown in FIG. 1 and can have any number of lanes.

The roadway 100 includes a plurality of vehicles. Here, the vehicles are cooperating vehicles, specifically a principal vehicle 106 and a subordinate vehicle 108. Cooperating vehicles exhibit some level of functioning autonomy, such as parking assist or adaptive cruise control, and are able to engage in computer communication with other vehicles. A cooperating vehicle may be a host vehicle to an operating environment 200 having access, either directly or remotely, to a VCD 202 that will be described in further detail with respect to FIG. 2.

The principal vehicle 106 is traveling in the first lane 102 and the subordinate vehicle 108 is traveling in the second lane 104. The principal vehicle 106 and the subordinate vehicle 108 have different levels of autonomy. The levels of autonomy describe a vehicles ability to sense its surroundings and possibly navigate pathways without human intervention. In some embodiments, the levels may be defined by specific features or capabilities that the cooperating vehicle may have, such as a cooperating vehicle's ability to plan a path.

A classic vehicle without sensing capability or decision-making ability may have a null autonomy level meaning that the car has only the most basic sensing ability, such as environmental temperature, and no decision-making ability. Conversely, a vehicle capable of decision making, path planning, and navigation without human intervention may have a full autonomy level. A fully autonomous vehicle may function, for example, as a robotic taxi. In between the null autonomy level and the full autonomy level exist various autonomy levels based on sensing ability and decision-making capability. A vehicle with a lower level of autonomy may have some sensing ability and some minor decision-making capability. For example, a cooperating vehicle having a lower level may use light sensors (e.g., cameras and light detecting and ranging (LiDAR) sensors) for collision alerts. A cooperating vehicle having a higher level of autonomy may be capable of decision making, path planning, and navigation without human intervention, but only within a defined area. These descriptions of levels are exemplary in nature to illustrate that there are differences in the autonomous abilities of different vehicles. More or fewer autonomy levels may be used. Furthermore, the levels may not be discrete such that they include specific functionalities, but rather be more continuous in nature.

As a further example of autonomy levels, the Society of Automotive Engineers (SAE) has defined six levels of autonomy. SAE Level 0 includes an automated system that issues warnings and may momentarily intervene but has no sustained vehicle control. At SAE Level 1 the driver and the automated system share control of the vehicle. For example, SAE Level 1 includes features like Adaptive Cruise Control (ACC), where the driver controls steering and the automated system controls speed, and Parking Assistance, where steering is automated while speed is manual. At SAE Level 2 the automated system takes full control of the vehicle (accelerating, braking, and steering), but the driver must monitor the driving and be prepared to intervene immediately at any time if the automated system fails to respond properly. A vehicle at SAE Level 3 allows the driver to safely turn their attention away from the driving tasks and the vehicle will handle situations that call for an immediate response, like emergency braking. At SAE Level 4 driver attention is not required for safety, for example, the driver may safely go to sleep or leave the driver's seat. However, self-driving may only be supported in predetermined spatial areas. A vehicle at SAE Level 5 does not require human intervention. For example, a robotic taxi would be deemed to operate at SAE Level 5.

The SAE Levels are provided as an example to understand the difference in autonomy levels and are described in the embodiments herein for clarity. However, the systems and methods described herein may operate with different autonomy levels. The autonomy level may be recognized by other cooperating vehicles based on standardized autonomy levels such as the SAE levels or as provided by the National Highway Traffic Safety Administration (NHTSA).

Returning to FIG. 1, suppose the principal vehicle 106 has the same or a greater level of autonomy than the subordinate vehicle 108. For example, the principal vehicle 106 may be an SAE Level 4 autonomous vehicle and the subordinate vehicle 108 may be an SAE Level 2 autonomous vehicle. The principal vehicle 106 includes at least one sensor for sensing objects and the surrounding environment around the principal vehicle 106. In an exemplary embodiment, the surrounding environment of the principal vehicle 106 may be defined as a predetermined area located around (e.g., ahead, to the side of, behind, above, below) the principal vehicle 106 and includes a road environment in front, to the side, and/or behind of the principal vehicle 106 that may be within the vehicle's path. The at least one sensor may include a light sensor 110 for capturing principal sensor data in a light sensing area 111 and one or more principal image sensors 112a, 112b, 112c, 112d, 112e, and 112f for capturing principal sensor data in corresponding image sensing principal areas 113a, 113b, 113c, 113d, 113e, and 113f.

The light sensor 110 may be used to capture light data in the light sensing area 111. The size of the light sensing area 111 may be defined by the location, range, sensitivity, and/or actuation of the light sensor 110. For example, the light sensor 110 may rotate 360 degrees around the principal vehicle 106 and collect principal sensor data from the light sensing area 111 in sweeps. Conversely, the light sensor 110 may be omnidirectional and collect principal sensor data from all directions of the light sensing area 111 simultaneously. For example, the light sensor 110 emits one or more laser beams of ultraviolet, visible, or near infrared light in the light sensing area 111 to collect principal sensor data.

The light sensor 110 may be configured to receive one or more reflected laser waves (e.g., signals) that are reflected off one or more objects in the light sensing area 111. In other words, upon transmitting the one or more laser beams through the light sensing area 111, the one or more laser beams may be reflected as laser waves by one or more traffic related objects (e.g., motor vehicles, pedestrians, trees, guardrails, etc.) that are located within the light sensing area 111 and are received back at the light sensor 110.

The one or more principal image sensors 112a, 112b, 112c, 112d, 112e, and 112f may also be positioned around the principal vehicle 106 to capture additional principal sensor data from the corresponding image sensing principal areas 113a, 113b, 113c, 113d, 113e, and 113f. The size of the image sensing principal areas 113a-113f may be defined by the location, range, sensitivity and/or actuation of the one or more principal image sensors 112a-112f.

The one or more principal image sensors 112a-112f may be disposed at external front and/or side portions of the principal vehicle 106, including, but not limited to different portions of the vehicle bumper, vehicle front lighting units, vehicle fenders, and the windshield. The one or more principal image sensors 112a-112f may be positioned on a planar sweep pedestal (not shown) that allows the one or more principal image sensors 112a-112f to be oscillated to capture images of the external environment of the principal vehicle 106 at various angles. Additionally, the one or more principal image sensors 112a-112f may be disposed at internal portions of the principal vehicle 106 including the vehicle dashboard (e.g., dash mounted camera), rear side of a vehicle rear view mirror, etc.

The principal sensor data includes the captured sensor data from the at least one sensor of the principal vehicle. In this example, the principal sensor data is captured from the light sensing area 111 and the image sensing principal areas 113a-113f. Therefore, the principal sensor data is from the principal sensor area defined by the light sensing area 111 and the image sensing principal areas 113a-113f.

The subordinate vehicle 108 also includes at least one sensor for sensing objects and the surrounding environment around the subordinate vehicle 108. The surrounding environment of the subordinate vehicle 108 may be defined as a predetermined area located around (e.g., ahead, to the side of, behind, above, below) the subordinate vehicle 108 and includes a road environment in front, to the side, and/or behind of the principal vehicle 106 that may be within the vehicle's path.

The at least one sensor of the subordinate vehicle 108 may include one or more subordinate image sensors 114a, 114b, 114c, 114d, and 114e similar to the one or more principal image sensors 112a-112f and that operate in a similar manner. The one or more subordinate image sensors 114a-114e capture subordinate sensor data from the corresponding image sensing subordinate areas 115a, 115b, 115c, 115d, and 115e. The size of the image sensing subordinate areas 115a-115f may be defined by the location, range, sensitivity and/or actuation of the one or more subordinate image sensors 114a-114f. However, the one or more subordinate image sensors 114a-114e may have less coverage than the one or more principal image sensors 112a-112f. The reduced coverage may be due to a smaller field of view of the individual image sensors or the fewer number of image sensors. Accordingly, the subordinate sensing area of the subordinate vehicle 108 may be smaller than the principal sensing area of the principal vehicle 106. In this example, the subordinate sensor data is captured from the image sensing subordinate areas 115a-115e. Therefore, the subordinate sensor data is from the subordinate sensing area defined by the image sensing subordinate areas 115a-115e.

The principal vehicle 106 uses principal sensor data from the light sensor 110 and the one or more principal image sensors 112a-112f combined with the subordinate sensor data from the one or more subordinate image sensors 114a-114e of the subordinate vehicle 108. The combined sensor data forms a sensor map that includes the principal sensor area and the subordinate sensor area. Thus, here, the sensor map includes the light sensing area 111, the image sensing principal areas 113a-113f, and the image sensing subordinate areas 115a-115e. The sensor map may additionally encompass both the principal vehicle 106 and the subordinate vehicle 108.

The sensor map allows the principal vehicle 106 to analyze the surrounding environment of both the principal vehicle 106 and the subordinate vehicle 108. Thus, the principal vehicle 106 is able to generate a behavior plan that includes actions that accommodate both the principal vehicle 106 and the subordinate vehicle 108 based on the sensor map. For example, the principal vehicle 106 may generate a behavior plan specifically for the subordinate vehicle 108 with individualized actions for the subordinate vehicle 108 to execute. By executing the behavior plan provided by the principal vehicle 106, the subordinate vehicle 108 is able to take advantage of the superior decision making of the principal vehicle 106, and thereby the higher autonomy level of the principal vehicle 106. In this manner the principal vehicle 106 shares autonomy with the subordinate vehicle 108 and the subordinate vehicle 108 appears to have a higher autonomy level than the subordinate vehicle 108 inherently has.

The light sensor 110, the one or more principal image sensors 112a-112f, and the one or more subordinate image sensors 114a-114e are shown and described in a specific arrangement as an example to provide clarity. The sensor arrangements of the principal vehicle 106 and the subordinate vehicle 108 may employ more or fewer sensors, sensors of different types, and/or different configurations of sensors not shown in FIG. 1.

Cooperating vehicles, including the principal vehicle 106 and the subordinate vehicle 108, have an operating environment that allows them to share autonomy through cooperative sensing. A host vehicle, as used herein, refers to a cooperating vehicle having the operating environment. Accordingly, either the principal vehicle 106 or the subordinate vehicle 108 can act as a host vehicle with respect to the operating environment 200 shown in FIG. 2. In particular, FIG. 2 is a block diagram of the operating environment 200 for implementing a cooperative sensing system according to an exemplary embodiment.

Figure 2:
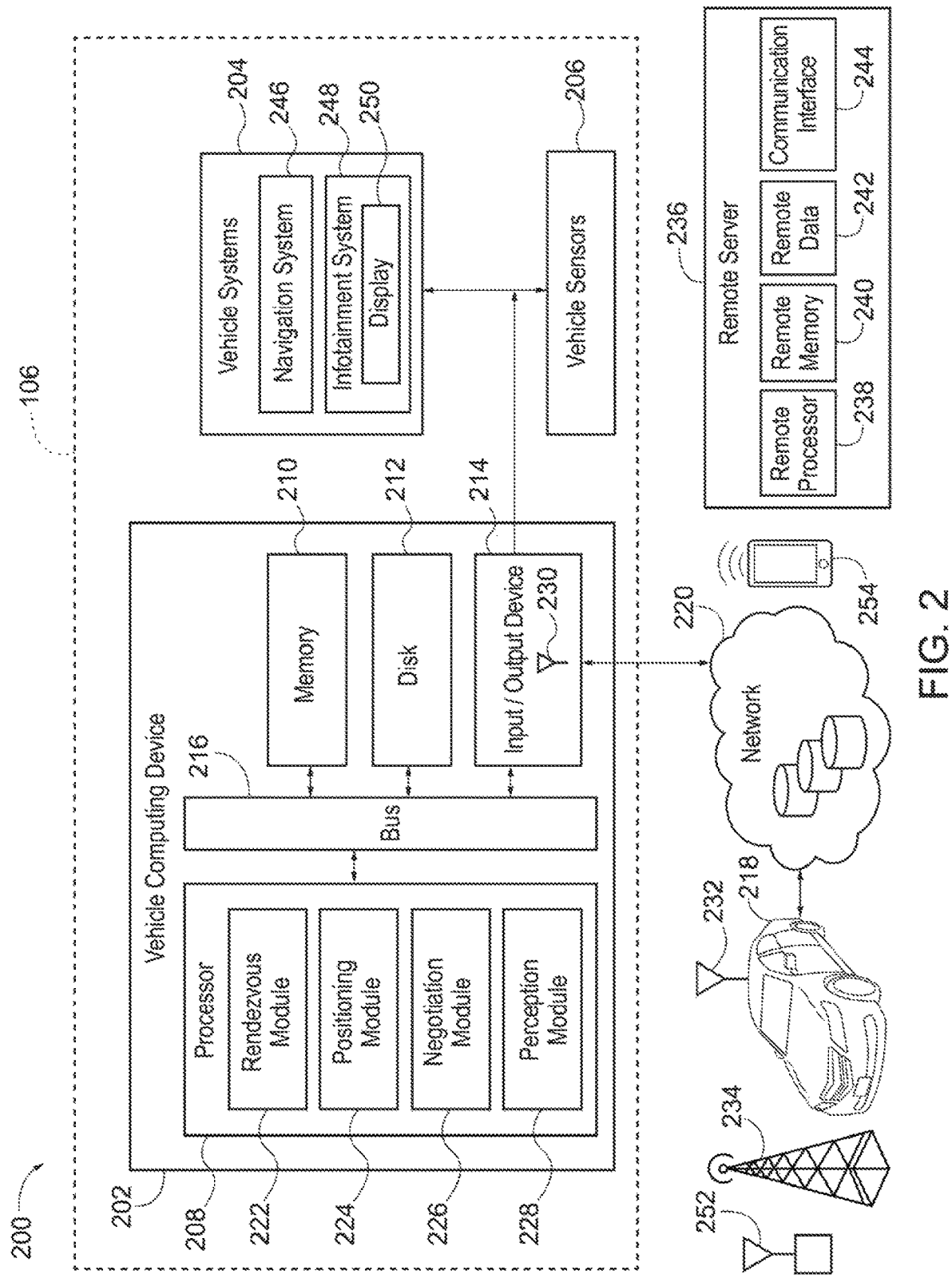
FIG. 2 is a block diagram of an operating environment for implementing a cooperative sensing system according to an exemplary embodiment.

In FIG. 2, the host vehicle includes a vehicle computing device (VCD) 202, vehicle systems 204, and vehicle sensors 206. Generally, the VCD 202 includes a processor 208, a memory 210, a disk 212, and an input/output (I/O) device 214, which are each operably connected for computer communication via a bus 216 and/or other wired and wireless technologies defined herein. The VCD 202 includes provisions for processing, communicating, and interacting with various components of the host vehicle and other components of the operating environment 200, including other cooperating vehicles like a cooperating vehicle 218.

In one embodiment, the VCD 202 can be implemented with the host vehicle, for example, as part of a telematics unit, a head unit, an infotainment unit, an electronic control unit, an on-board unit, or as part of a specific vehicle control system, among others. In other embodiments, the VCD 202 can be implemented remotely from the host vehicle, for example, with a portable device 254, a remote device (not shown), or the remote server 236, connected via the communication network 220.

The processor 208 can include logic circuitry with hardware, firmware, and software architecture frameworks for facilitating shared autonomy through cooperative sensing and control of the host vehicle and/or a cooperating vehicle 218. Suppose the principal vehicle 106 is the host vehicle, the cooperating vehicle 218 may be the subordinate vehicle 108. In other embodiments, the cooperating vehicle 218 may be one or more cooperating vehicles.

The processor 208 can store application frameworks, kernels, libraries, drivers, application program interfaces, among others, to execute and control hardware and functions discussed herein. For example, the processor 208 can include a rendezvous module 222, a positioning module 224, a negotiation module 226, and a perception module 228, although the processor 208 can be configured into other architectures. Further, in some embodiments, the memory 210 and/or the disk 212 can store similar components as the processor 208 for execution by the processor 208.

The I/O device 214 can include software and hardware to facilitate data input and output between the components of the VCD 202 and other components of the operating environment 200. Specifically, the I/O device 214 can include network interface controllers (not shown) and other hardware and software that manages and/or monitors connections and controls bi-directional data transfer between the I/O device 214 and other components of the operating environment 200 using, for example, the communication network 220.

More specifically, in one embodiment, the VCD 202 can exchange data and/or transmit messages with other cooperating vehicles, such as the cooperating vehicle 218, and/or devices via a transceiver 230 or other communication hardware and protocols. For example, the transceiver 230 can exchange data with the cooperating vehicle 218 via a remote transceiver 232 of the cooperating vehicle 218. In some embodiments, the host vehicle and the cooperating vehicle 218 can also exchange data (e.g., vehicle data as described herein) over remote networks by utilizing a wireless network antenna 234, roadside equipment 252, and/or the communication network 220 (e.g., a wireless communication network), or other wireless network connections.

As mentioned above, in some embodiments, data transmission can be executed at and/or with other infrastructures and servers. For example, the VCD 202 can transmit and receive information, such as roadway data or vehicle data, directly or indirectly to and from the remote server 236 over the communication network 220. The remote server 236 can include a remote processor 238, a remote memory 240, remote data 242, and a communication interface 244 that are configured to be in communication with one another. Thus, the transceiver 230 can be used by the VCD 202 to receive and transmit information to and from the remote server 236 and other servers, processors, and information providers through the communication network 220.

In alternative embodiments, the transceiver 230 may be a radio frequency (RF) transceiver can be used to receive and transmit information to and from the remote server 236. In some embodiments, the VCD 202 can receive and transmit information to and from the remote server 236 including, but not limited to, vehicle data, traffic data, road data, curb data, vehicle location and heading data, high-traffic event schedules, weather data, or other transport related data. In some embodiments, the remote server 236 can be linked to multiple vehicles (e.g., the cooperating vehicle 218), other entities, traffic infrastructures, and/or devices through a network connection, such as via the wireless network antenna 234, the roadside equipment 252, and/or other network connections.

In this manner, vehicles that are equipped with cooperative sensing systems may communicate via the remote transceiver 232 if the cooperating vehicles are in transceiver range. Alternatively, the vehicles may communicate by way of remote networks, such as the communication network 220, the wireless network antenna 234, and/or the roadside equipment 252. For example, suppose the cooperating vehicle 218 is out of transceiver range of the host vehicle. Another cooperating vehicle may communicate with the host vehicle using the transceiver 230. The transceiver 230 may also act as interface for mobile communication through an internet cloud and is capable of utilizing a GSM, GPRS, Wi-Fi, WiMAX, or LTE wireless connection to send and receive one or more signals, data, etc. directly through the cloud. In one embodiment, the out of range vehicles may communicate with the host vehicle via a cellular network using the wireless network antenna 234.

Referring again to the host vehicle, the vehicle systems 204 can include any type of vehicle control system and/or vehicle described herein to enhance the host vehicle and/or driving of the host vehicle. For example, the vehicle systems 204 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). As will be described, one or more of the vehicle systems 204 can be controlled according the systems and methods discussed herein. Here, the vehicle systems 204 include a navigation system 246 and an infotainment system 248. The navigation system 246 stores, calculates, and provides route and destination information and facilitates features like turn-by-turn directions. The infotainment system 248 provides visual information and/or entertainment to the vehicle occupant and can include a display 250.

The vehicle sensors 206, which can be implemented with the vehicle systems 204, can include various types of sensors for use with the host vehicle and/or the vehicle systems 204 for detecting and/or sensing a parameter of the host vehicle, the vehicle systems 204, and/or the environment surrounding the host vehicle. For example, the vehicle sensors 206 can provide data about vehicles and/or downstream objects in proximity to the host vehicle. For example, the vehicle sensors 206 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. The vehicle sensors 206 can be any type of sensor, for example, acoustic, electric, environmental, optical, imaging, light, pressure, force, thermal, temperature, proximity, among others.

Using the system and network configuration discussed above, cooperative sensing and vehicle control can be provided based on real-time information from vehicles using vehicular communication of sensor data. Detailed embodiments describing exemplary methods using the system and network configuration discussed above, will now be discussed in detail.

One or more of the components of the operating environment 200 can be considered in whole or in part a vehicle communication network. In FIG. 2, a block diagram of the operating environment 200 is shown with a simplified diagram of a cooperating vehicle 218, a communication network 220, and a block diagram of a remote server 236. It is understood that the principal vehicle 106 and/or the subordinate vehicle 108 may be the host vehicle having the operating environment 200. Likewise, the principal vehicle 106 or the subordinate vehicle 108 may be the cooperating vehicle 218. Other cooperating vehicles (not shown) can include one or more of the components and/or functions discussed herein with respect to the host vehicle. Thus, although not shown in FIG. 2, one or more of the components of the host vehicle, can also be implemented with other cooperating vehicles and/or the remote server 236, other entities, traffic indicators, and/or devices (e.g., V2I devices, V2X devices) operable for computer communication with the host vehicle and/or with the operating environment 200.

Further, it is understood that the components of the host vehicle and the operating environment 200, as well as the components of other systems, hardware architectures, and software architectures discussed herein, can be combined, omitted, or organized into or distributed among different architectures for various embodiments.

For purposes of illustration, each vehicle shown in FIG. 1 is equipped for computer communication as defined herein. However, one or more of the vehicles may not be equipped for computer communication and/or not equipped with the shared autonomy through cooperative sensing methods and systems discussed herein. Although non-cooperating vehicles may not participate in cooperative sensing, the methods and systems can perform cooperative sensing based on the information about the non-cooperating vehicles that is received from the cooperating vehicles that are participating. The percentage of cooperating vehicles that are participating is the penetration rate of cooperating vehicles. A partial penetration rate is due to the existence of non-cooperating vehicles in a traffic scenario also having cooperating vehicles. However, the methods and systems can perform cooperative sensing based on the information received from the cooperating vehicles, even with a partial penetration rate.

II. Methods for Shared Autonomy Through Cooperative Sensing

Figure 3:
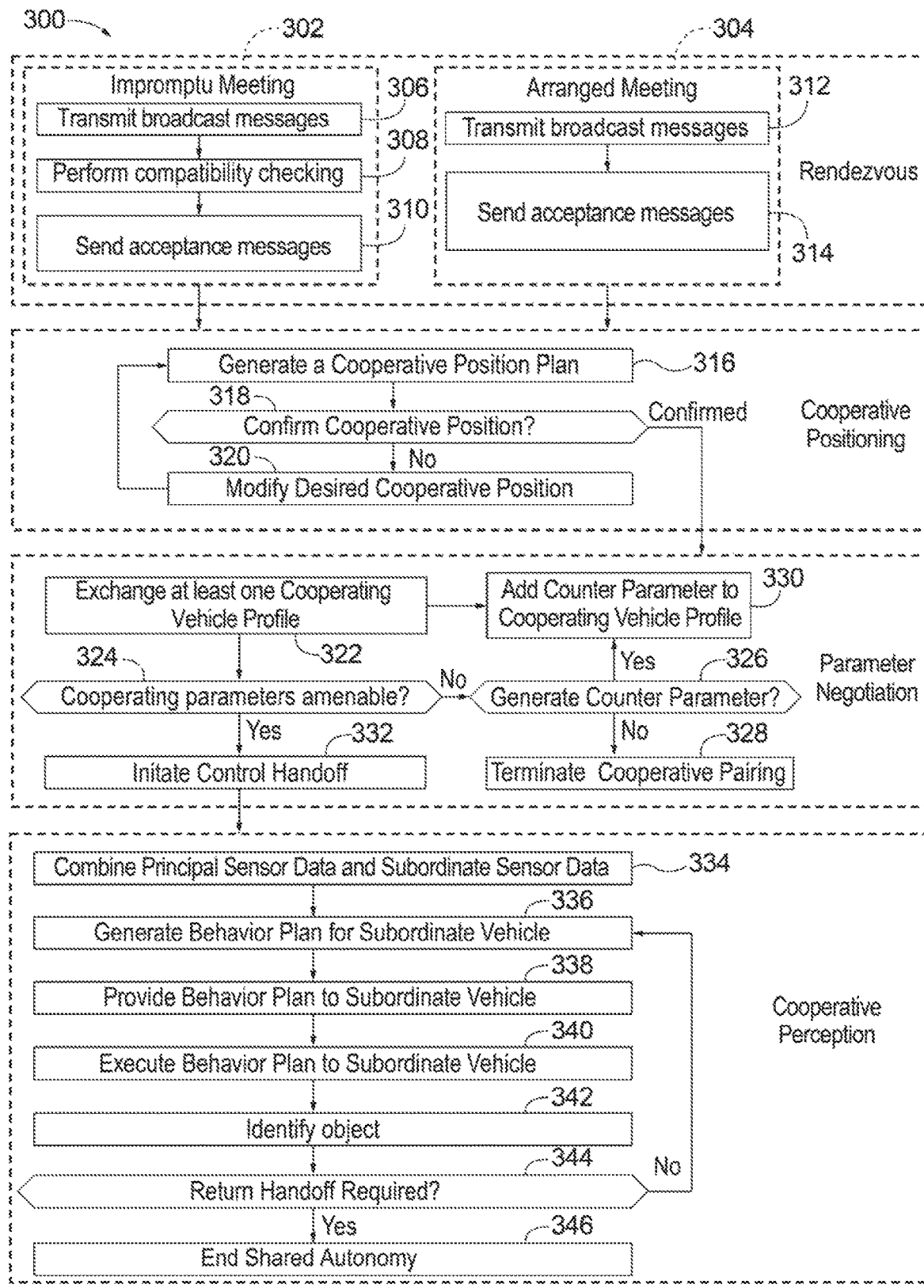
FIG. 3 is a process flow for shared autonomy through cooperative sensing according to one embodiment.

Referring now to FIG. 3, a method 300 for cooperative sensing will now be described according to an exemplary embodiment. FIG. 3 will also be described with reference to FIGS. 1, 2, and 4-11.

As shown in FIG. 3, the method for shared autonomy through cooperative sensing can be described by four stages, namely, (A) rendezvous, (B) cooperative positioning, (C) parameter negotiation, and (D) cooperative perception. For simplicity, the method 300 will be described by these stages, but it is understood that the elements of the method 300 can be organized into different architectures, blocks, stages, and/or processes.

A. Rendezvous

In the rendezvous stage, cooperating vehicles identify one another. The rendezvous processes described below are performed by, coordinated by, and/or facilitated by the rendezvous module 222 for the cooperating vehicles. The rendezvous module 222 may additionally utilize other components of the operating environment 200, including vehicle systems 204 and the vehicle sensors 206 as well as the subsystems 400 shown in FIG. 4.

Returning to FIG. 3, the identification of the cooperating vehicles may be impromptu, shown at the impromptu meeting 302, or prearranged, shown at the arranged meeting 304. For example, an impromptu meeting may occur when the cooperating vehicles are traveling in the same direction on a roadway. At block 306, the cooperating vehicles transmit broadcast messages. For example, the broadcast messages may be sent from the communications module 406 of the principal vehicle subsystems 402 to the subordinate communications module 420 the subordinate vehicle 108 having subordinate vehicle subsystems 404. The communications modules 406 and 420 by utilizing the remote transceiver 232, a wireless network antenna 234, roadside equipment 252, and/or the communication network 220 (e.g., a wireless communication network), or other wireless network connections.

The broadcast messages include vehicle identifiers and a level of autonomy of the cooperating vehicle. Accordingly, while meeting on the roadway 100 may not be planned, cooperating vehicles can identify one another with broadcast messages. A vehicle identifier may include a unique identifier that allows another cooperating vehicle to identify the broadcasting cooperating vehicle. For example, the vehicle identifier may include location information that indicates a global position of the cooperating vehicle so that a host vehicle can identify a cooperating vehicle based on the relative position of the cooperating vehicle to the host vehicle.

The vehicle identifier may also include a redundant identifier. The redundant identifier may be information about the cooperating vehicle that allows a host vehicle to check the identification of the cooperating vehicle using sensor data. For example, the redundant identifier may be a color of the vehicle. Suppose that the host vehicle identifies a specific cooperating vehicle based on the cooperating vehicle's relative position and the host vehicle receives a redundant identifier indicating that the cooperating vehicle is red. The host vehicle may use an image sensor and image processing to determine the color of the identified vehicle. If the identified vehicle is blue, the host vehicle may request an updated vehicle identifier. If the identified vehicle is red, the host vehicle confirms the identity of the broadcasting cooperating vehicle. A similar process could be carried out with other redundant identifiers, such as license plate numbers or vehicle type or shape (car, truck, sedan, coupe or hatchback).

As described above, the broadcast message also includes a cooperating vehicle's level of autonomy. The level of autonomy is based on the cooperating vehicle's ability to sense its surroundings and navigate pathways without human intervention. In some embodiments, the levels of autonomy may be based on standardized levels proprietary to cooperating vehicles or defined by a third party, such as the SAE levels of autonomy described above.

In one embodiment, the broadcast messages may include a level of autonomy based on the cooperating vehicle's ability at the time of manufacture. For example, the level of autonomy may be set at the time of manufacture based on the design specification of the cooperating vehicle. Additionally or alternatively, the level of autonomy may reflect the effective ability of the cooperating vehicle at the time of broadcast. For example, while initially the level of autonomy of the cooperating vehicle may be set based on the design specifications, the level of autonomy may be changed if the ability of the cooperating vehicle changes, for example through an accident (decreased functionality) or software update (increased functionality). In some embodiments, the autonomy level may be automatically diagnostically determined and included in the broadcast message.

Suppose that a cooperating vehicle is an SAE Level 4 vehicle, but one or more of the sensors are damaged in an accident. Before the accident, the broadcast message may include an autonomy level that indicates that the cooperating vehicle is an SAE Level 4 vehicle. However, after the accident the cooperating vehicle may run a diagnostic to determine the extent of damage to the vehicle systems 204, the vehicle sensors 206, and\or the subsystems, such as the subsystems 400 shown in FIG. 4. If a subsystem is damaged resulting in the vehicle having an effective autonomy level of SAE Level 2 after the accident, then the broadcast messages after the accident may automatically indicate that the cooperating vehicle is an SAE Level 2 vehicle without a vehicle occupant intervening.

A broadcast message may also include a cooperating proposal. The cooperating proposal may form a basis for sharing autonomy. For example, the cooperating proposal may include a destination, planned route, preferred pricing, specific cooperating parameters, etc. Thus, the cooperating vehicles may use the cooperating proposal to determine whether there is a minimum threshold advantage to the cooperating vehicles before having to engage in the cooperative positioning stage and/or the parameter negotiation stage.

The rendezvous module 222 of a cooperating vehicle may control transmission of the broadcast messages over remote networks by utilizing the remote transceiver 232, a wireless network antenna 234, roadside equipment 252, and/or the communication network 220 (e.g., a wireless communication network), or other wireless network connections. The broadcast messages may be transmitted based on a predetermined schedule (e.g., every second, every 10 seconds, 10 minutes, etc.), proximity to sensed vehicles (e.g., when cooperating vehicles are within 500 yards of the host vehicle), or a hybrid event (e.g., every second when a cooperating vehicle is within a predetermined radius of the host vehicle but 30 seconds when a cooperating vehicle is not within a predetermined radius of the host vehicle), amongst others.

Returning to FIG. 3, at block 308, the method 300 includes performing a compatibility check. As described above with respect to FIG. 1, shared autonomy occurs when the principal vehicle 106, having a higher autonomy level provides information to the subordinate vehicle 108 that allows the subordinate vehicle 108 to operate at a higher autonomy level. The difference in the autonomy levels between the principal vehicle 106 and the subordinate vehicle 108 is the differential autonomy. The compatibility check determines whether the principal vehicle 106 and the subordinate vehicle 108 exhibit a predetermined differential autonomy sufficient to allow the principal vehicle 106 to share autonomy with the subordinate vehicle 108.

The differential autonomy may be a specific set of levels for the principal vehicle 106 and the subordinate vehicle 108. For example, the differential autonomy may deem that the principal vehicle 106 should be an SAE Level 4 vehicle and the subordinate vehicle 108 should be at least an SAE Level 2 vehicle. In another embodiment, the differential autonomy may be an autonomy level spread. For example, the differential autonomy may deem that the principal vehicle 106 be at least two autonomy levels higher that the subordinate vehicle 108. Alternatively, the differential autonomy may be defined as the principal vehicle 106 having predetermined features that the subordinate vehicle 108 does not have and/or as the subordinate vehicle 108 not having predetermined features that the principal vehicle 106 has.

The principal vehicle 106 and/or the subordinate vehicle 108 may perform the compatibility check. In some embodiments, the cooperating vehicle that is broadcasting messages for shared autonomy performs the compatibility check. For example, a principal vehicle 106 may indicate that it is available for sharing autonomy in its broadcast messages. The rendezvous module 222 of a subordinate vehicle 108, interested in shared autonomy, may perform the compatibility check upon receiving a broadcast message from the principal vehicle 106. Alternatively, the principal vehicle 106 may receive a broadcast message from a subordinate vehicle 108 requesting shared autonomy. The rendezvous module 222 of the principal vehicle 106 may perform the compatibility check upon receiving the broadcast message of the subordinate vehicle 108. Accordingly, the compatibility check may occur in response to a broadcast message being received by a host vehicle. Otherwise, the compatibility check may be performed in response to a response message from the cooperating vehicle that received the broadcast message.

Additionally, at block 308, the compatibility check may include determining whether the principal vehicle 106 and/or the subordinate vehicle 108 meet system and/or sensor requirements for cooperative automation. The system and/or sensor requirements may be based on the cooperating vehicles autonomy level. For example, a Level 4 cooperating vehicle may be required to have a requisite number of sensors with a predetermined field of view. Accordingly, the principal vehicle 106 and/or the subordinate vehicle 108 may be declined cooperative automation on the basis of system and/or sensor requirements.

The compatibility check may also include determining whether the routes of the principal vehicle 106 and the subordinate vehicle 108 are compatible based on the cooperating proposal including a shared destination, planned route, etc. For example, suppose the subordinate vehicle 108 is broadcasting broadcast messages requesting cooperative autonomy. The broadcast message from the subordinate vehicle 108 may include a planned route that the subordinate vehicle 108 plans to travel to a desired destination.

Upon receiving the broadcast message, the principal vehicle 106 may determine if the principal vehicle 106 also plans to travel along the planned route of the subordinate vehicle 108. For example, the rendezvous module 222 of the principal vehicle 106 may compare the planned route to navigation data from the navigation system 246. If the principal vehicle 106 does plan to travel the planned route of the subordinate vehicle 108, the route planning portion of the compatibility check, at block 308, may be deemed successful.

Conversely, if the principal vehicle 106 does not plan to travel the planned route, the compatibility check may still be deemed successful if the principal vehicle 106 plans to travel at least a portion of the planned route, even if not through to the desired destination. Here, the principal vehicle 106 may schedule a handoff at the point when the planned route of the subordinate vehicle 108 diverges from the planned route of the principal vehicle 106. For example, the principal vehicle may set a geofence at the point of divergence. The geofence, which will be described in greater detail with respect to FIG. 11 below, is an intangible boundary defined by coordinates such as global positioning satellite (GPS) coordinates or radio-frequency identification (RFID) coordinates. Here, the geofence may be defined at the divergence point as the location at which cooperative automation or vehicle-to-vehicle control is scheduled to end. In this manner, the compatibility check, at block 308, may be deemed successful given a specified geofence.

Alternatively, if the principal vehicle 106 plans to travel at least a portion of the planned route of the subordinate vehicle 108, the principal vehicle 106 may provisionally determine that the compatibility check is successful with regard to the portion of the planned route that both the principal vehicle 106 and the subordinate vehicle 108 plan to travel. Likewise, the principal vehicle 106 may provisionally determine that the compatibility check is successful if the principal vehicle is also traveling to the desired destination of the subordinate vehicle. The provisional determination may be revisited at the parameter negotiation stage, discussed below, to determine if the principal vehicle 106 or the subordinate vehicle 108 are willing to negotiate the planned route or the desired destination. Accordingly, in some embodiments, the rendezvous stage is a preliminary determination of whether cooperative automation would provide the cooperating vehicles at least a minimal benefit.

While described above with respect to a broadcast message sent by the subordinate vehicle 108, the principal vehicle 106 may additionally or alternatively broadcast messages indicating that the principal vehicle is available for cooperative automation given a planned route and/or a desired destination. Accordingly, during the compatibility check, at block 308, the subordinate vehicle 108 may determine whether the planned route and/or desired destination of the principal vehicle 106 are at least partially compatible with the planned route of the subordinate vehicle 108.

At block 310, the method 300 includes sending an acceptance message to initiate cooperative autonomy. The acceptance message may be sent by the rendezvous module 222 when the host vehicle performs a successful compatibility check. For example, suppose the principal vehicle 106 transmits a broadcast message indicating that it is available for sharing autonomy, and a subordinate vehicle 108 performs the compatibility check upon receiving a broadcast message from the principal vehicle 106. The subordinate vehicle 108 may send an acceptance message and enter a shared autonomy mode. In the shared autonomy, a cooperating vehicle performs, coordinates, or facilitates sharing of autonomy between the cooperating vehicles. For example, a cooperating vehicle may share sensor data, decision-making capability, behavior plans, actions, etc.

For example, the subordinate vehicle 108 may send an acceptance messages indicating that the subordinate vehicle 108 is entering a shared autonomy mode and recommending that the principal vehicle 106 enter a shared autonomy mode. Likewise, suppose that the principal vehicle 106 received a broadcast message from a subordinate vehicle 108 requesting shared autonomy and the principal vehicle performed a successful compatibility check. The principal vehicle 106 may send an acceptance message indicating that the principal vehicle 106 is entering a shared autonomy mode and recommending that the subordinate vehicle 108 enter a shared autonomy mode.

Figure 5:
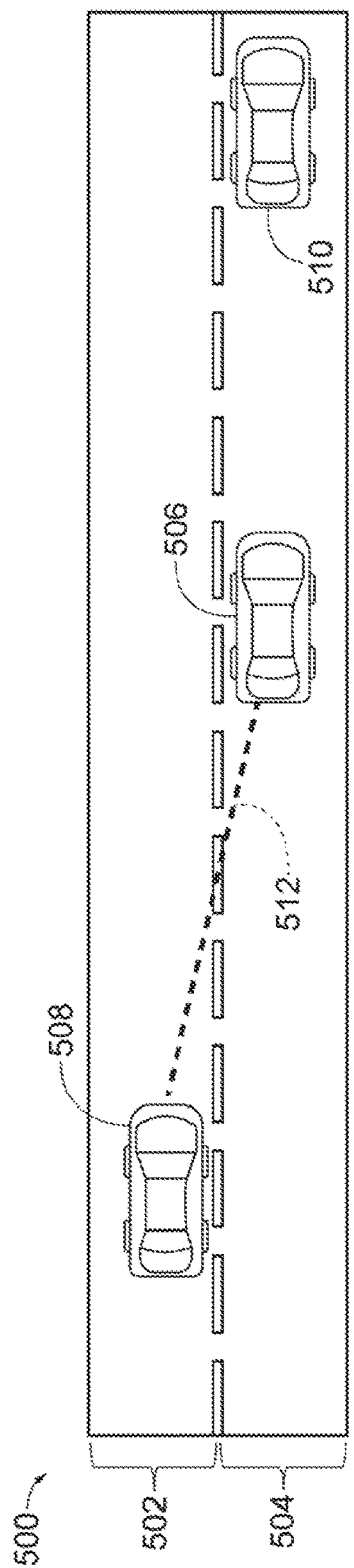
FIG. 5 is a schematic view of an exemplary traffic scenario on a roadway having vehicles with different levels of autonomy according to one embodiment.

In some embodiments, multiple principal vehicles and or multiple subordinate vehicles may be looking to be paired. Referring to FIG. 5, a number of cooperating and non-cooperating vehicles may share the roadway 500 having a first lane 502 and a second lane 504. The cooperating vehicles may have varying levels of autonomy facilitated by an ability to communicate with other vehicles. Conversely, non-cooperating vehicles may not have autonomy (e.g., SAE Level 0) or be unable to communicate with other vehicles. Here, the cooperating vehicles may include a principal vehicle 506 and subordinate vehicles 508 and 510.

Principal vehicles and subordinate vehicles may be identified from the cooperating vehicles based on one or more autonomy factors. An autonomy factor may be whether a cooperating vehicle is available for cooperative automation and thus is broadcasting that it will act like a principal vehicle or whether a cooperating vehicle is requesting cooperative automation and thus is broadcasting that it will act as a subordinate vehicle. Autonomy factors may also include a cooperating vehicle's autonomy level, historical actions acting as a principal vehicle or a subordinate vehicle, and/or other vehicle information. The rendezvous module 222 of a host vehicle may determine whether another cooperating vehicle is a principal vehicle or subordinate vehicle based on information from received broadcast messages. Thus, the broadcast messages may include autonomy factors.

Suppose that the cooperating vehicles include a principal vehicle 506 broadcasting in broadcast messages that it is available for cooperative automation and subordinate vehicles 508 and 510 are both requesting increased autonomy. The principal vehicle 506 may select either subordinate vehicle 508 or 510 based on autonomy factors including autonomy levels of the subordinate vehicles 508 and 510, the autonomy differential between each of the subordinate vehicles 508 and 510 and the principal vehicle 506, sensor capability of subordinate vehicles 508 and 510 (e.g., number of sensors, sensor range, type of sensors, etc.), amongst others. The autonomy factors may be included in broadcast messages sent by the subordinate vehicle 508 or 510, calculable by the rendezvous module 222 of the principal vehicle 506, or requested by the principal vehicle 506 from the subordinate vehicles 508 and 510. Accordingly, the principal vehicle 506 may select between the subordinate vehicles 508 and 510 based on the autonomy factors.

In one embodiment, the autonomy factors may include preferred pricing. The preferred pricing indicates the pricing that vehicle occupants of principal vehicles, such as a principal vehicle 506, wish to be paid or the pricing that subordinate vehicles, such as subordinate vehicles 508 and 510, wish to pay for cooperative automation. For example, the broadcast messages from the subordinate vehicles 508 and 510 may include preferred pricing for cooperative automation. The rendezvous module 222 of the principal vehicle 506 may receive the preferred pricing from the subordinate vehicles 508 and 510 and select either the subordinate vehicle 508 or the subordinate vehicle 510 based on which preferred pricing more closely approaches the preferred pricing of the principal vehicle 506 or a combination of autonomy factors including the preferred pricing. The preferred pricing may be additionally addressed by business parameters. For example, may determine if the preferred pricing is in within an acceptable range. If so, an exact price can be determined in parameter negotiation using the business parameters. Accordingly, determining the remuneration for cooperative autonomy can be determined over multiple stages.

In another embodiment, the principal vehicle 506 may select both the subordinate vehicle 508 and 510 based on the autonomy factors. For example, the rendezvous module 222 of the principal vehicle 506 may determine that the subordinate vehicles 508 and 510 have adequate sensor coverage to encompass each of the principal vehicle 506 and the subordinate vehicle 508 or 510 in a cooperative position. As will be discussed in greater detail below, the cooperative position is a physical arrangement of the principal vehicles 506 and the subordinate vehicle 508 or 510. Accordingly, the principal vehicle 506 may select both the subordinate vehicles 508 and 510. Selecting both the subordinate vehicles 508 and 510 may be dependent on a contingent cooperative position. For example, the contingent cooperative position may include a subordinate vehicle on either end of the principal vehicle such that the subordinate vehicles 508 and 510 can take advantage of the sensors of the principal vehicle 506.

The selection of the subordinate vehicle 508 and/or 510 may be communicated to the subordinate vehicle 508 and/or 510 in the acceptance message. The acceptance being conditional may also be sent in an acceptance message with the contingency, such as the contingent cooperative position and/or cooperating parameters.

Blocks 306, 308, and 310 describe an impromptu meeting 302 of cooperating vehicles. Alternatively, at block 312, the method 300 includes scheduling a prearranged meeting between cooperating vehicles at 304. For example, vehicle occupants may be able to schedule shared autonomy through the host vehicle, such as through a display 250, or through a portable device 254. For example, a vehicle occupant may be able to schedule shared autonomy by indicating a location and time for the principal vehicle 106 and the subordinate vehicle 108 to meet. This may be done well in advance of a meeting or while a host vehicle is traveling.

In another embodiment, shared autonomy may be scheduled based on a navigated path of the cooperating vehicles. For example, cooperating vehicles may choose to make navigational data available to other cooperative vehicles. The navigational data may be made available through a remote database such as remote data 242 or sent from the navigation system 246 of the host vehicle. A vehicle occupant, of a host vehicle, requesting shared autonomy or announcing availability for shared autonomy may be alerted when a corresponding cooperating vehicle having or desiring shared autonomy shares the navigated path of the host vehicle.

Moreover, the host vehicle may provide additional navigational data to facilitate a meeting with a cooperating vehicle. For example, the navigation system 246 may adjust the navigational path of the host vehicle to bring the host vehicle within a predetermined proximity of a cooperating vehicle. The predetermined proximity may be a radial distance from the cooperating vehicle. The adjustment to the navigational path may be based on a threshold detour. The threshold detour indicates the amount distance that a vehicle occupant is willing to deviate from the navigated path or additional time that the vehicle occupant is willing to add to the estimated time of arrival in order to meet a cooperating vehicle.

At block 314, the method 300 includes sending an acceptance message. Scheduling a prearranged meeting 304 may incorporate a compatibility check, and the acceptance message may be sent when the cooperating vehicles are within the predetermined proximity to one another. The acceptance message indicates that the host vehicle is entering a shared autonomy mode and recommends that the cooperating vehicle also enter a shared autonomy mode.

In one embodiment, a rendezvous with one subordinate vehicle may be an impromptu meeting 302 and the rendezvous with a second subordinate vehicle may be a prearranged meeting 304. For example, the principal vehicle 506 may plan to meet a first subordinate vehicle, such as the subordinate vehicle 508, and meet a second subordinate vehicle, such as the subordinate vehicle 510. The second subordinate vehicle may be met at the same time as the first subordinate vehicle or after the principal vehicle 506 and a subordinate vehicle have already cooperatively paired.

The rendezvous stage describes the interactions between cooperating vehicles to initiate cooperative automation, for example, by entering a shared autonomy mode. Once the shared autonomy mode is initiated the cooperating vehicles enter the cooperative positioning stage and the parameter negotiation stage. The cooperative positioning stage may occur first or the parameter negotiation stage may occur first. Alternatively, the cooperative positioning stage and the parameter negotiation stage may occur simultaneously. In the rendezvous stage, and possibly also the cooperative positioning stage and/or the parameter negotiation stage, it is determined whether cooperative automation would provide a minimum threshold advantage to the cooperating vehicles.

B. Cooperative Positioning

To engage in cooperative automation, the cooperating vehicles are arranged in a cooperative position. The cooperative position defines a physical arrangement of the cooperating vehicles. The cooperative position may be a physical arrangement that facilitates cooperative automation by facilitating computer communication, sharing sensor data, etc. For example, with respect to FIG. 5, the principal vehicle 506 and the one or more subordinate vehicles, such as the subordinate vehicle 508, arrange themselves in the cooperative position.

The cooperative positioning processes described below are performed, coordinated, or facilitated by the positioning module 224 for cooperative vehicles. The positioning module 224 may additionally utilize other components of the operating environment 200, including vehicle systems 204 and the vehicle sensors 206 as well as the subsystems 400 shown in FIG. 4.

Figure 4:
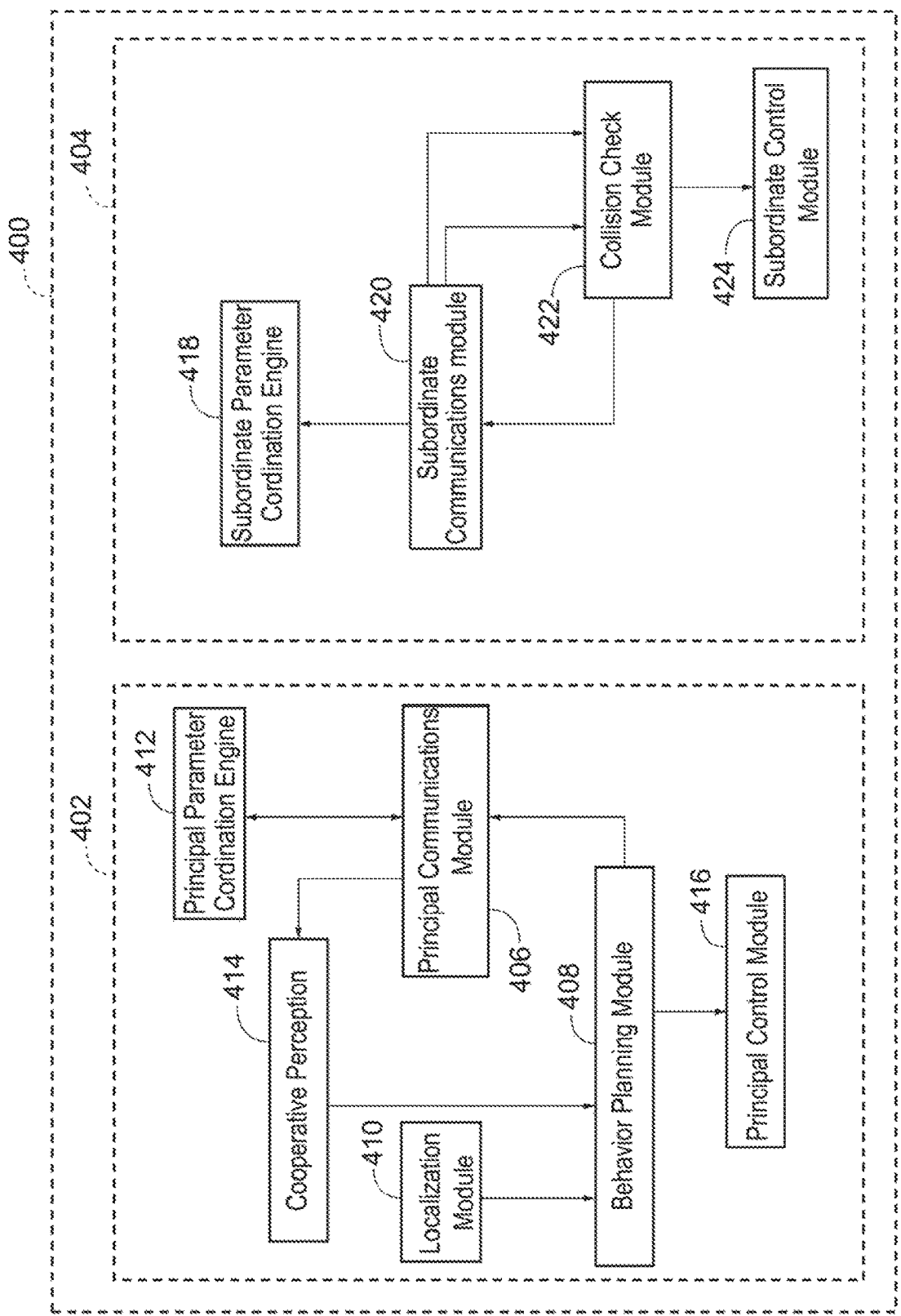
FIG. 4 is a block diagram of subsystems present on vehicles with different levels of autonomy according to an exemplary embodiment.

FIG. 4 illustrates example subsystems 400 of cooperating vehicles. The subsystems 400 may be implemented with the VCD 202 and/or the vehicle systems 204 shown in FIG. 2. In one embodiment, the subsystems 400 can be implemented with the cooperating vehicle, for example, as part of a telematics unit, a head unit, an infotainment unit, an electronic control unit, an on-board unit, or as part of a specific vehicle control system, among others. In other embodiments, the subsystems 400 can be implemented remotely from the cooperating vehicle, for example, with a portable device 254, a remote device (not shown), or the remote server 236, connected via the communication network 220 or the wireless network antenna 234.

The subsystems 400 included in the cooperating vehicle may be based on the autonomy level of the cooperating vehicle. To better illustrate the possible differences in the subsystems 400, suppose the cooperating vehicles are the principal vehicle 506 (shown in FIG. 5) having principal vehicle subsystems 402 and the subordinate vehicle 508 (shown in FIG. 5) having subordinate vehicle subsystems 404. The differences illustrated are merely exemplary in nature. One or more of the subsystems 400 described with respect to the principal vehicle subsystems 402 may be a component of the subordinate vehicle subsystems 404 and vice versa.

The positioning module 224 may utilize the subsystems 400 to achieve the cooperative position. With regard to the example discussed with respect to FIG. 5, suppose that the principal vehicle 506 and the subordinate vehicle 508 have participated in the rendezvous stage and the principal vehicle 506 sends a position message to the subordinate vehicle 508 with the desired cooperative position. For example, the position message may be sent from the communications module 406 of the principal vehicle subsystems 402 to the subordinate communications module 420 the subordinate vehicle 108 having subordinate vehicle subsystems 404. The communications modules 406 and 420 by utilizing the remote transceiver 232, a wireless network antenna 234, roadside equipment 252, and/or the communication network 220 (e.g., a wireless communication network), or other wireless network connections.

The desired cooperative position may be a predetermined default cooperative position. For example, the default cooperative position may be the principal vehicle 506 immediately ahead of the subordinate vehicle 508. The desired cooperative position may be modified from the default cooperative position based on sensor data, data from behavior planning module, etc. For example, the behavior planning module 408 may determine a cooperative position plan 600 based on the relative position of the principal vehicle 506 and the subordinate vehicle 508 as determined by the localization module 410. For example, the principal vehicle 506 is in the second lane 504, longitudinally ahead of the subordinate vehicle 508 in the first lane 502.

Figure 6:
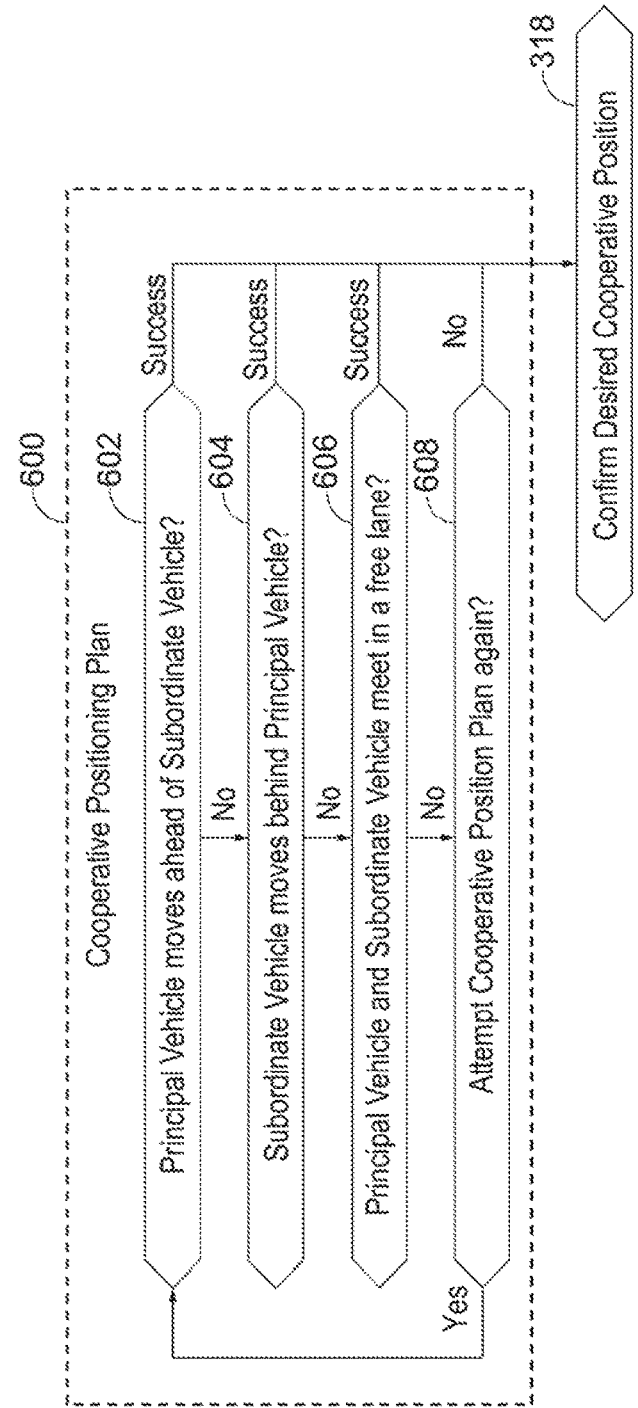
FIG. 6 is a process flow for a cooperative position plan according to one embodiment.
Figure 7:
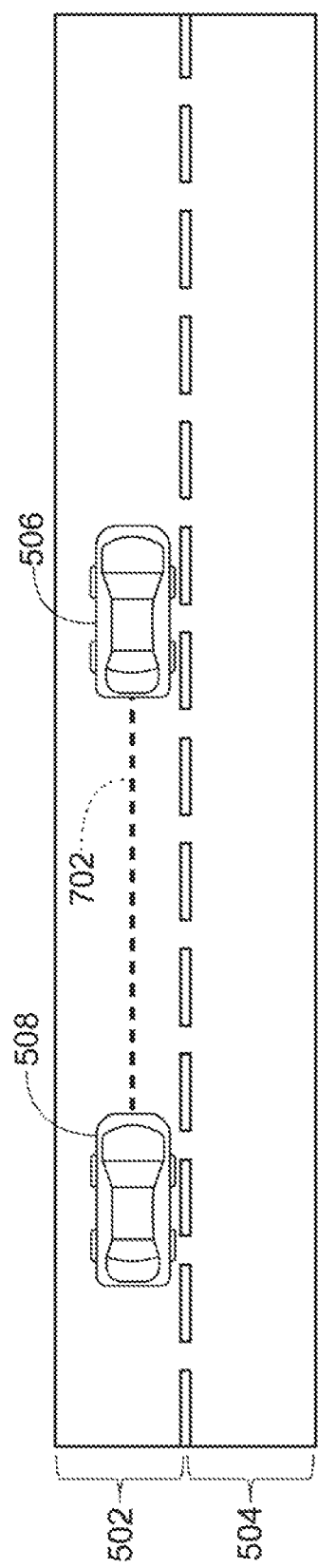
FIG. 7 is a schematic view of an exemplary traffic scenario on a roadway having the vehicles in a cooperative position according to one embodiment.

Returning to FIG. 3, at block 316, the method 300 includes generating a cooperative position plan 600, as shown in FIG. 6. For example, the positioning module 224 may utilize the behavior planning module 408 to determine a number of actions that will result in the cooperating vehicles being arranged in the default cooperative position. The vehicle systems 204, principal vehicle subsystems 402, and/or vehicle sensors 206 determine if the action of the cooperative positing in plan are appropriate given the current traffic flow, roadway conditions, etc. Accordingly, in addition to sending the desired cooperative position, the host vehicle may additionally send the cooperative position plan 600.

An example cooperative position plan 600 is illustrated in FIG. 6. The cooperative position plan 600 will be described with respect to FIGS. 3, 4, 5, and 7. In one embodiment, the cooperative position plan 600 includes a number actions for a cooperating vehicle to achieve the cooperative position. In another embodiment, as will described below, the cooperative position plan 600 may include a default cooperative position and a number of alternate cooperative positions. For example, the cooperative position plan may include a first position and a second position that may be selected when a cooperating vehicle is unable to assume the first position. The cooperative position plan 600 is exemplary in nature so the actions may be different in substance or in number. The behavior planning module 408 may generate the cooperative position plan 600 based on the cooperative position. For example, the cooperative position plan 600 may include a number of actions that when executed by the cooperating vehicles, such as the principal vehicle 506 and/or the subordinate vehicle 508, cause the cooperating vehicles to be arranged in the cooperative position.

The actions described with respect to the cooperative position plan 600 may correspond to messages between the principal vehicle 506 and the subordinate vehicle 508 for communicating the cooperative position plan 600. Accordingly, in addition to longitudinal and lateral movements, the actions may include other kinematic parameters such as trajectory, speed, etc. to achieve the actions.

Suppose the principal vehicle 506 and the subordinate vehicle 508 are a cooperating pair. At block 602, the cooperative position plan 600 includes an action step in which the principal vehicle 506 moves ahead of the subordinate vehicle 508 in the first lane 502. As discussed above, in FIG. 5 the principal vehicle 506 is in the second lane 504 and the subordinate vehicle 508 is in the first lane 502. Therefore, while the principal vehicle 506 is ahead of the subordinate vehicle 508, the principal vehicle 506 is separated from the subordinate vehicle 508 by the cross-lane line 512. Accordingly, the action described at block 602 dictates that the principal vehicle 506 to change lanes in front of the subordinate vehicle 508 as illustrated by the in-lane line 702 of FIG. 7.

Suppose the principal vehicle 506 generates the cooperative position plan 600. The cooperative position plan 600 may include kinematic parameters for the principal vehicle 506. For example, in generating the cooperative position plan 600, the behavior planning module 408 additionally calculates the kinematic parameters needed to execute the action. For example, here, the kinematic parameters for the principal vehicle 506 to move ahead of the subordinate vehicle 508 may include increasing the speed of the principal vehicle 506, trajectory (angle, lateral distance, longitudinal distance) for the principal vehicle 506, etc.

Additionally, the principal vehicle 506 may send the actions of the cooperative position plan 600 to the subordinate vehicle 508. The actions, such as the action at block 602, may include kinematic parameters for the subordinate vehicle 508. For example, the kinematic parameters for the subordinate vehicle 508 may include decreasing the speed of the subordinate vehicle 508 to increase the gap length at a potential lane change location. Accordingly, the cooperative position plan 600 may vary based on the intended recipient of the cooperative position plan 600.

In one embodiment, the behavior planning module 408 sends a message to the subordinate communications module 420 of the subordinate vehicle 508 through the communications module 406 of the principal vehicle 506. In another embodiment, the action is transmitted to a collision check module 422. The collision check module 422 receives information from the vehicle system 204 and the vehicle sensors 206 to determine if the action is feasible for the subordinate vehicle 508. If so, the action may be sent to the subordinate control module 424 for execution.

If the action at block 602 is successful, the cooperative position plan 600 is complete and the cooperative positioning stage moves to block 318 of the method 300, shown in FIG. 3, to confirm that the desired cooperative position has been achieved. Conversely, if the principal vehicle 506 is unable to move ahead of the subordinate vehicle 508 in the first lane 502, the cooperative position plan 600 moves to the next action at block 604.

At block 604, the cooperative position plan 600 includes the subordinate vehicle 508 moving behind the principal vehicle 506 in the second lane 504. For example, subordinate vehicle 508 may be an SAE Level 2 vehicle that can perform a lane change based on the position message received from the principal vehicle 506. In another embodiment, the position message may prompt a driver of the subordinate vehicle 508 to execute a lane change.

If the action at block 604 is successful, the cooperative position plan 600 is complete. Conversely, if the subordinate vehicle 508 is unable to move behind the principal vehicle 506 in the second lane 504, the cooperative position plan 600 moves to the next action at block 606. At the block 606, the cooperative position plan 600 includes an action step in which the principal vehicle 506 and the subordinate vehicle 508 meet in a free lane. If this action is successful, the cooperative position plan 600 is complete and the cooperative positioning stage moves to block 318 of the method 300, shown in FIG. 3. Conversely, if the principal vehicle 506 is unable to meet the subordinate vehicle 508, the cooperative position plan 600 moves to the next action at block 608.

At block 608 it is determined whether the cooperative position plan 600 should be attempted again. In some embodiments, the cooperative position plan 600 may be attempted again based on information from the vehicle systems 204 and the vehicle sensors 206. For example, suppose there is a vehicle (not shown) making multiple lane changes around the principal vehicle 506 and the subordinate vehicle 508. If vehicle sensor data from the vehicle sensors 206 indicates that the lane-changing vehicle has passed the principal vehicle 506 and the subordinate vehicle 508, then the cooperative position plan 600 may be attempted again. In other embodiments, the cooperative position plan 600 may be attempted a predetermined number of times. Accordingly, determining whether the cooperative position plan 600 should be attempted again may be based on dynamic incoming data or be preset.

If it is determined that the cooperative position plan 600 will be attempted again, the cooperative position plan 600 returns to the action at block 316 to initiate the cooperative position plan 600. If it is determined that the cooperative position plan 600 will not be attempted again, the cooperative positioning stage moves to the block 318 of the method 300 shown in FIG. 3. As discussed above, at block 318, it is determined whether the desired cooperative position has been achieved. The determination may be based on sensor data from the principal vehicle 506 and/or the subordinate vehicle 508. For example, suppose the desired cooperative position is a default position in which the principal vehicle 506 is positioned immediately ahead of the subordinate vehicle 508. The principal vehicle 506 may use rear sensors to determine if the subordinate vehicle 508 is directly behind the principal vehicle 506. Alternatively, the principal vehicle 506 and/or the subordinate vehicle 508 may communicate with one another to determine whether the default cooperative position has been achieved.

If at block 318, the desired cooperative position is confirmed, the method 300 moves on to a next stage, such as the parameter negotiation stage. If instead at block 318, the desired cooperative position is not confirmed, the method 300 continues to block 320 of the method 300. At block 320, the desired cooperative position is modified. As discussed above, the current desired cooperative position may be modified based on sensor data, data from behavior planning module 408, etc. to generate a modified cooperative position.

The positioning module 224 may reassess the vehicle sensor data to determine if the current relative position of the principal vehicle 506 and the subordinate vehicle 508 are better suited to a different cooperative position. Therefore, the modified cooperative position may be based on dynamic incoming data. Alternatively, the modified cooperative position may be predetermined. For example, a series of modified cooperative positions may be iteratively tried until the principal vehicle 506 and the subordinate vehicle 508 achieve a cooperative position.

In some embodiments, modifying the desired cooperative position may include the positioning module 224 deferring to the rendezvous module 222 to reassess the pairing of the principal vehicle 506 and the subordinate vehicle 508. For example, the principal vehicle 506 may select a different subordinate vehicle, such as subordinate vehicle 510. Accordingly, modifying the desired cooperative position may include changing the cooperating vehicles involved.

When the cooperative position plan 600 returns to block 316, a cooperative position plan is generated based on the modified cooperative position. Because the behavior planning module 408 may determine a cooperative position plan 600 for the modified cooperative position based on the relative position of the principal vehicle 506 and the subordinate vehicle 508 which are changing as the vehicles proceed along the roadway, the regenerated cooperative position plan 600 may be different than the initially generated cooperative position plan 600.

C. Parameter Negotiation

As discussed above, once the cooperative automation is initiated in response to the rendezvous stage being completed, the cooperating vehicles also enter the cooperative positioning stage and the parameter negotiation stage. The parameter negotiation processes described below are performed, coordinated, or facilitated by the negotiation module 226 for cooperative vehicles. The negotiation module 226 may additionally utilize other components of the operating environment 200, including vehicle systems 204 and the vehicle sensors 206 as well as the subsystems 400 shown in FIG. 4.

In the parameter negotiation stage, the cooperating vehicles are able to adjust cooperating parameters. The cooperating parameters are adjusted based on the preferred relationship and driving style of each of the cooperating vehicles. Cooperating parameters define the relationship and any cooperation between the cooperating vehicles, including conditions and parameters for sharing autonomy. The cooperating parameters may be sent in the form of specific values, ranges of values, plain text, messages, and signals, among others.

Figure 8:
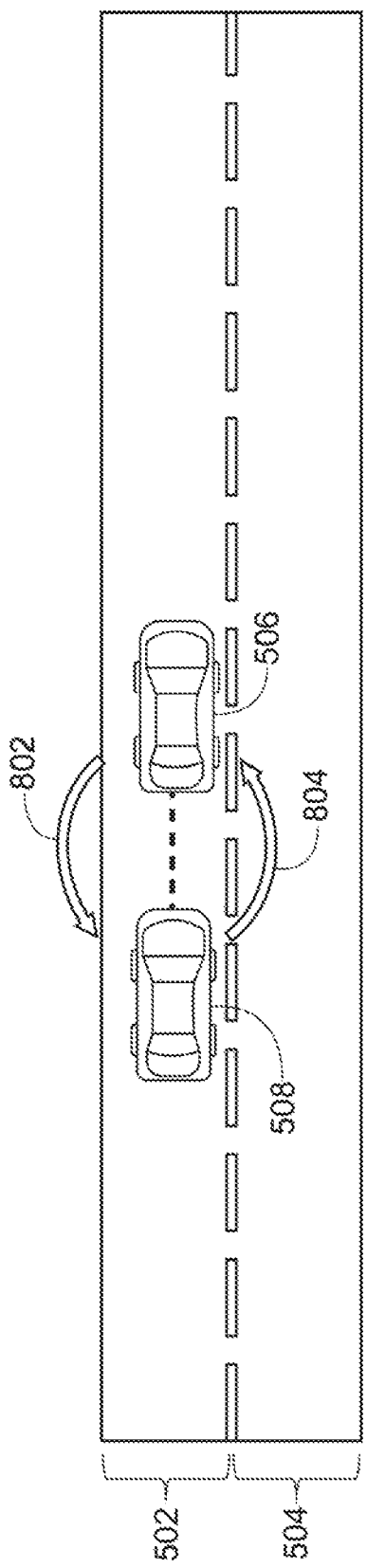
FIG. 8 is a schematic view of an exemplary traffic scenario on a roadway having vehicles engaging in parameter negotiation according to one embodiment.
Figure 9:
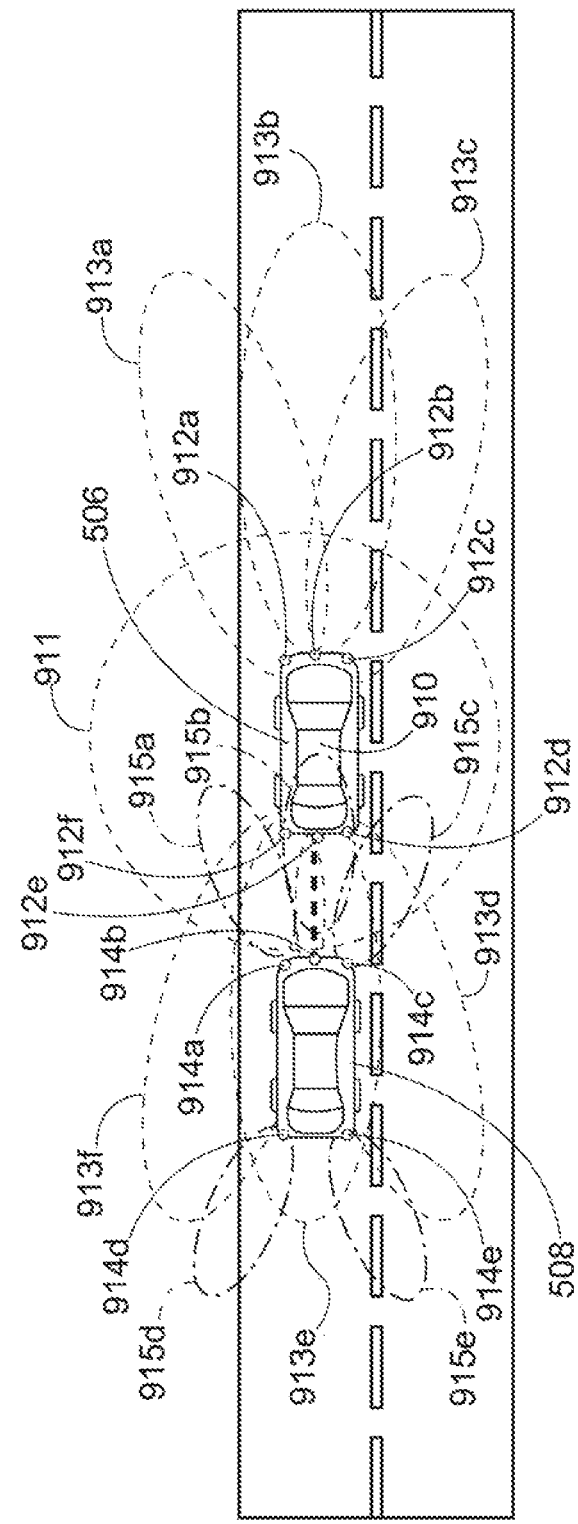
FIG. 9 is a schematic view of an exemplary traffic scenario on a roadway having vehicles engaging in cooperative sensing according to one embodiment.

Returning to FIG. 3 and the method 300, at block 322, at least one cooperating vehicle profile is exchanged. A cooperating vehicle profile aggregates at least one cooperating parameter for that cooperating vehicle. With reference to FIG. 8, the principal vehicle 506 may have a principal profile 802 (represented as an arrow) and/or the subordinate vehicle 508 may have a subordinate profile 804 (represented as an arrow). The principal vehicle 506 may send the principal profile 802 the subordinate vehicle 508. Additionally or alternatively, the subordinate vehicle 508 may send the subordinate profile 804 to the principal vehicle 506. Alternatively, in some embodiments, rather than sending a cooperating vehicle profile, a cooperating vehicle may send one or more cooperating parameters individually.

The cooperating vehicle profiles may be managed by subsystems 400 of FIG. 4. In particular, the principal profile 802 may be managed by the principal parameter coordination engine 412 and the subordinate profile 804 may be maintained by a subordinate parameter coordination engine 418. For example, the principal parameter coordination engine 412 may aggregate, maintain, and update cooperating parameters in the principal profile 802 for the principal vehicle 506. Likewise, the subordinate parameter coordination engine 418 may aggregate, maintain, and update cooperating parameters in the subordinate profile 804 for the subordinate vehicle 508.

Returning, to FIG. 3, at block 324, it is determined whether the cooperating parameters are amenable. As described above, the principal vehicle 506 and the subordinate vehicle 508 receive the other cooperating vehicle's profile and determine if the cooperating parameters defined by the other cooperating vehicle are agreeable. The determination may be made by comparing the cooperating parameters received from the other cooperating vehicle to the vehicle's own listing of cooperating parameters. Additionally or alternatively, the cooperating parameters received from the other cooperating vehicle may be compared to safety guidelines, vehicle capabilities, etc. before determining whether the cooperating parameters are amenable.

The cooperating vehicles, including the principal vehicle 506 and the subordinate vehicle 508, exchange cooperating parameters to determine the manner in which the cooperative automation will be performed by the cooperating vehicles. Suppose a cooperating parameter is sent from the subordinate vehicle 508 to the principal vehicle 506 in a subordinate profile 804, and that the cooperating parameter is a desired speed of the subordinate vehicle 508, such as 65 miles per hour (mph). The principal vehicle 506 may have a safety guideline that dictates that the principal vehicle 506 will not exceed a posted speed limit. Suppose the speed limit of the first lane 502 is 60 mph. Additionally or alternatively, the cooperating parameters of the principal vehicle 506 may include a range of traveling speeds, such as a range of 55 mph to 65 mph. In this example, the desired traveling speed in the cooperating parameter of the subordinate vehicle 508, 65 mph, is within the range of traveling speeds, the range of 55 mph to 65 mph. However, the desired traveling speed in the cooperating parameter of the subordinate vehicle 508, 65 mph, exceeds the safety guideline, because the posted speed limit is 60 mph. Accordingly, the desired traveling speed in the cooperating parameter of the subordinate vehicle 508 is not amenable to the principal vehicle 506.

If at block 324, one or more of the cooperating vehicles do not find the cooperating parameters amenable, then the method 300 continues to block 326. At block 326, the one or more cooperating vehicles that did not find the cooperating parameters amenable, attempt to generate a counter parameter. A counter parameter is a cooperating parameter that proposes an adjustment to a cooperating parameter. The counter parameter may be selected from a range of alternative values provided with a cooperating parameter. For example, rather than sending a single desired speed of 65 mph, the subordinate vehicle 508, the subordinate vehicle 508 may include a desired speed range, such as 60 mph to 65 mph. Accordingly, the principal vehicle 506 may select 60 mph from the desired speed range as a counter parameter to satisfy both the cooperating parameters and safety guidelines of the principal vehicle 506. Thus, the cooperating parameters and counter parameters can be discrete values, ranges, thresholds, etc.

In another embodiment, a vehicle occupant may be prompted to confirm the cooperating parameters are amenable with a negotiation alert. The negotiation alert may be an audio cue, visual cue, hybrid cue, etc. generated through an audio system (not shown) or a display 250 of the vehicle systems 204. The vehicle occupant of the principal vehicle 506 may be alerted that the subordinate profile 804 includes a desired speed of 65 mph, which exceeds the posted speed limit. The negotiation alert may prompt the vehicle occupant to accept the desired speed of the subordinate vehicle 508 (i.e., the cooperating parameter is amenable). The negotiation alert may also provide the vehicle occupant an opportunity to provide a counter parameter. In this manner, the vehicle occupant may manually input the counter parameter, at block 326, such that the vehicle occupant is able to take an active role in the parameter negotiation.

Alternatively, the negotiation module 226 may generate a counter parameter, at block 326, based on the proposed cooperating parameter of the subordinate vehicle. For example, the negotiation module 226 may determine that the desired traveling speed in the cooperating parameter of the subordinate vehicle 508, 65 mph, is greater than the posted speed limit of 60 mph. Because the posted speed limit, 60 mph is the highest speed in the range of traveling speeds, the range of 55 mph to 65 mph that the principal vehicle will travel, the negotiation module 226 may calculate the counter parameter to be 60 mph and send the calculated counter parameter to the subordinate vehicle 508.

Counter parameters may be based on cooperating vehicle profile, historical data in a similar scenario, the type of vehicle that the cooperating vehicle (e.g., recreational vehicle, sedan, truck, all-terrain vehicle, etc., type of roadway (e.g., state highway, residential street, off-road area, etc.). The counter parameter may be used to tailor the cooperating proposal to the cooperative scenario based on past and current data. For example, the negotiation module 226 may determine that the desired traveling speed in the cooperating parameter of the subordinate vehicle 508, exceeds a safety threshold based on historical data for a given roadway on the planned route. Accordingly, the negotiation module 226 may calculate the counter parameter with a lower traveling speed and send the calculated counter parameter to the subordinate vehicle 508.

In some embodiments, a counter parameter may not be able to be generated at block 326. For example, a cooperating vehicle may not be able to calculate counter parameters based on other cooperating parameters or safety guidelines. Alternatively, the counter parameter may not be generated due to another cooperating vehicle indicating that it is unwilling to negotiate. If a counter parameter cannot be generated, the method 300 continues to block 328.

At block 328, the shared autonomy mode established in the rendezvous stage is terminated. Terminating the shared autonomy mode severs the cooperative pairing between the cooperating vehicles for a current instance. However, it may not a bar to future cooperative pairings between the cooperating vehicles. In some embodiments, terminating the shared autonomy mode may cause a cooperating vehicle to reenter the rendezvous stage in an attempt to identify other cooperating vehicles. So that the cooperating vehicles do not enter into a loop of initiating and terminating a shared autonomy mode, once a shared autonomy mode is terminated, the cooperating vehicles involved may be temporarily barred from re-initiating the shared autonomy mode for a predetermined amount of time and/or mileage.

If a counter parameter is generated at 326, the method 300 continues to block 330. At block 330, the counter parameter is added to the cooperating vehicle profile. For example, suppose the principal vehicle 506 generates a counter parameter. The counter parameter is added to the principal profile 802 by the principal parameter coordination engine 412. In some embodiments, the principal parameter coordination engine 412 may add the counter parameter to the principal profile 802 by updating an existing cooperating parameter with the counter parameter.

The method 300 then returns to block 322. The counter parameter is sent to the other cooperating vehicles when the cooperating vehicle profiles are exchanged at block 322. For example, the counter parameter being generated may prompt the parameter negotiation module to resend the vehicle profile. In this manner, the other cooperating vehicles can assess the counter parameter at block 324. If the counter parameter is not amenable, the negotiation cycle begins again, and at block 326 a new counter parameter may be generated by the other cooperating vehicles and again the vehicle profiles are resent.

Once each of the cooperating vehicles in the cooperative pairing determine that the cooperating parameters are amenable at block 324, the method 300 continues to block 332. At block 332, a control handoff is initiated in the shared autonomy mode. The control handoff occurs when a cooperating vehicle hands off control to another cooperating vehicle. For example, the principal vehicle 506 begins sharing autonomy with the subordinate vehicle 508 by providing the subordinate vehicle 508 with data, functionality, and/or control to function in a manner consistent with a higher level of autonomy than the inherent level of autonomy of the subordinate vehicle 508. Initiating the control handoff may be performed negotiation module 226 without intervention by a vehicle occupant of either the principal vehicle 506 or the subordinate vehicle 508. Accordingly, the negotiation stage as well as the rendezvous stage and the cooperative positioning stage may happen in a way that is transparent to the vehicle occupant and appear to be automatic. In some embodiments, the control handoff may be initiated before the cooperating vehicles have reached the cooperative position. In another embodiment, the control handoff may be delayed until the cooperating vehicles assume the cooperative position.

In one embodiment, initiating the control handoff may include alerting a vehicle occupant of the principal vehicle 506 and/or a vehicle occupant of the subordinate vehicle 508 with a handoff alert. The handoff alert may prompt the vehicle occupant to confirm the autonomy sharing. Thus, the vehicle occupant may have an opportunity to approve the autonomy sharing before the principal vehicle 506 provides the subordinate vehicle 508 with data, functionality, and/or control.

Turning back to the types of cooperating parameters, the cooperating parameters include categories of parameters, such as business parameters, kinematic parameters and relative parameters, which will be discussed in greater detail below. The listed categories are not exhaustive of the types of cooperating parameters, and more or fewer categories may be employed. The grouping of different categories of the cooperating parameters is given for organizational clarity of the cooperating parameters. However, the VCD 202, the vehicle systems 204, vehicle sensors 206, and/or negotiation module 226 may not recognize categorical differences between the cooperating parameters.

In some embodiments, categories of parameters may be recognized and the cooperating vehicles may even prioritize categories. By prioritizing categories of cooperating parameters, cooperating vehicles may identify the cooperating parameters based on importance. For example, cooperating parameters in a first category of cooperating parameters may have a higher priority than a second category of cooperating parameters. By prioritizing the categories of cooperating parameters, the cooperating vehicles may indicate the categories of cooperating parameters that it is less likely to negotiate (e.g., categories of cooperating parameters that have a high priority) as compared to those that the cooperating vehicle is more likely to negotiate (e.g., categories of cooperating parameters that have a lower priority).

1. Business Parameter

The cooperating vehicles establish remuneration for cooperative automation. For example, the principal vehicle 506 and subordinate vehicle 508 may establish a pecuniary arrangement. For example, the subordinate vehicle 508 may pay the principal vehicle 506 for sharing autonomy with the subordinate vehicle 508. Accordingly, the subordinate vehicle 508 may pay for cooperative automation. Additionally or alternatively, the principal vehicle 506 may provide the subordinate vehicle with data such as navigation data or principal sensor data that the subordinate vehicle can use to make limited decisions. The subordinate vehicle 508 may pay for that data.

The business parameter may describe the details of the pecuniary arrangement. In the example given above, the business parameters may describe how the subordinate vehicle 508 will pay the principal vehicle 506 for cooperative automation. For example, the business parameters may include the rates of payments (e.g. an amount of payment per time (e.g., minute, hour, etc.), amount of payment per distance (e.g., mile, kilometer, etc.), flat rate, etc.), payment details, how payment is made (e.g., credit card, through a vehicle payment system, payment applications, etc.), when the payment will be made including whether a deposit is required, how a receipt is received, among others.

Suppose the principal profile 802 has cooperating parameters that include at least one business parameter, for example, that a subordinate vehicle 508 will be charged $0.10 per mile during cooperative automation. With respect to the parameter negotiation stage described in the method 300, at 322 the business parameter is sent by the principal vehicle 506 to the subordinate vehicle 508 in the principal profile 802.

As discussed above, the cooperating vehicles involved in the exchange of vehicle profiles at block 322, at block 324 the cooperating vehicles determine whether the cooperating parameters are amenable. Suppose the subordinate vehicle 508 has a vehicle profile that defines a preferred pricing with a maximum of $0.08. Accordingly, the subordinate vehicle 508 may object to being charged $0.10 per mile during cooperative automation. Accordingly, the subordinate vehicle 508 may generate a counter parameter in response to the business parameter, in accordance with block 326. For example, the subordinate vehicle 508 may counter with a counter parameter, for example, $0.05 per mile. If approved by the principal vehicle 506, the principal vehicle may initiate a handoff. Alternatively, the principal vehicle 506 could suggest a further counter parameter, such as charging the subordinate vehicle 508 a rate of $0.07 per mile. The principal vehicle 506 could also choose to end negotiations by terminating the shared autonomy mode and thus the cooperative pairing at block 328.

As another example, the business parameter may be based on a group affiliation. For example, one or more of the cooperating vehicles, or a vehicle occupant thereof, may be associated with a group that augments the business parameter. The group may be a subscription service, loyalty program, membership service, industry group, preferred group, undesirable group, or other group that collectively affects the pecuniary arrangement between the cooperating vehicles. For example, a preferred group may have predetermined business parameters (e.g., reduced payment rates, reduced deposit, etc.), preferred cooperating vehicles, and pre-negotiated parameters, among others.

As on example, suppose that the subordinate vehicle 508 has a vehicle profile that indicates that the subordinate vehicle 508 is associated with the group. The subordinate vehicle 508 may include this information in the broadcast message (e.g., block 306 or block 312) or send affiliation information for the group as a counter parameter in response to receiving the business parameter, in accordance with block 326. Based on the affiliation with the group, the principal vehicle 506 may suggest a counter parameter, such as reduced payment, extend negotiations beyond a threshold, access pre-negotiated business parameters which may be specific to the group, or extend other benefits. Alternatively, the principal vehicle 506 may suggest deterrents such as increased pricing or distances based on the affiliation of the subordinate vehicle 508.

The negotiation module 226 of the host vehicles, here the principal vehicle 506 and the subordinate vehicle 508, may negotiate a pecuniary arrangement. As discussed above, the negotiation performed by the negotiation module 226 may be based on the vehicle profiles and the vehicle occupant may not intervene. Accordingly, the whole process may be transparent to the vehicle occupant. Alternatively, the vehicle occupant may participate in the negotiation.

2. Kinematic Parameter

Kinematic parameters are cooperating parameters that describe a preferred style of driving as it pertains to the kinematic operation of the principal vehicle 506 and/or the subordinate vehicle 508. For example, the kinematic parameters may include a destination, preferred travel route, acceptance of routes with toll roads, desired average travel speed, maximum travel speed, minimum travel speed, preferred lane, amongst others.

The kinematic parameters may also include parameters for specific maneuvers. For example, a lane change maneuver may have specific kinematic parameters that describe the instances when a lane change would be deemed appropriate, such as when traveling at or near the minimum travel speed due to a preceding vehicle moving slowly, encountering an obstacle in the roadway, sensing an emergency vehicle, etc.

The lane change maneuver may also be associated with kinematic parameters that describe the physical boundaries of the lane change, such as the desired gap length between a preceding vehicle (not shown) and a following vehicle (not shown) or the number of lanes that can be laterally traversed in a lane change maneuver.

By way of example, suppose a kinematic parameter defines a range of minimum speeds or minimum speed threshold that when satisfied, prompt a request for a lane change. Whether the lane change request is made to or from the subordinate vehicle 508 depends on whether the kinematic parameter is received from the principal vehicle 506 or the subordinate vehicle 508. For example, if the subordinate profile 804 includes the kinematic parameter then the subordinate vehicle 508 may request that the principal vehicle 506 change lanes when the minimum speed threshold is satisfied. Conversely, if the principal profile 802 includes the kinematic parameter then the principal vehicle 506 may inform the subordinate vehicle 508 that a lane change is imminent.

An additional kinematic parameter may require that permission from subordinate vehicle 508 be received before a lane change is attempted. For example, when the minimum speed threshold is satisfied, the principal vehicle 506 may request a lane change before attempting the lane change maneuver. Thus, the kinematic parameters allow the vehicle occupant to control how their vehicle is driven such that another cooperating vehicle is not able to cause their vehicle to behave in a manner that is antithetical to the vehicle occupants' driving habits or styles. Accordingly, by defining how the cooperating vehicle can be driven in the vehicle profile with kinematic parameters, the vehicle occupant maintains their desired driving experience.

3. Relative Parameter

Relative parameters are cooperating parameters that describe the relationship between the cooperating vehicles sharing autonomy. For example, the relative parameters may define a preferred following distance between the principal vehicle 506 and the subordinate vehicle 508. A relative parameter may also define the operation of signaling devices (e.g., turn signals, blind spot indicators) mounted on various locations of the vehicle, for example, front, side, rear, the top of the vehicle, the side mirrors, among others. For example, the principal vehicle 506 may control a turn signal control system (not shown) of the subordinate vehicle 508 for controlling lighting (e.g., head lights, flood lights, brake lights, signaling lights, etc.), such that during cooperative automation the principal vehicle 506 can illuminate lights on the subordinate vehicle 508.

The relative parameter may include adaptive cruise control (ACC) parameters. The ACC parameters may be used by the principal vehicle 506 to control the subordinate vehicle 508. For example, the ACC parameters may be used to control acceleration and/or deceleration by generating an acceleration control rate and/or modifying a current acceleration control rate (e.g., a target acceleration rate). Likewise, the ACC parameters may control the manner in which the subordinate vehicle 508 adjusts speed, velocity, yaw rate, steering angle, throttle angle, range or distance data, among others. The ACC parameters may also include status information about different vehicle systems the subordinate vehicle 508, such as turn signal status, course heading data, course history data, projected course data, kinematic data, current vehicle position data, and any other vehicle information about the subordinate vehicle. The ACC parameters may also include parameters related to cooperative adaptive cruise control (C-ACC), intelligent cruise control systems, autonomous driving systems, driver-assist systems, lane departure warning systems, merge assist systems, freeway merging, exiting, and lane-change systems, collision warning systems, integrated vehicle-based safety systems, and automatic guided vehicle systems.

The ACC parameters may be negotiated based on a preferred driving style of the principal vehicle 506 or the subordinate vehicle 508. For example, the principal vehicle 506 may have an ACC parameter that indicates the subordinate vehicle 508 should accelerate at a predetermined acceleration rate. The subordinate vehicle 508, however, may have an ACC parameter indicative of a slower acceleration rate. In some embodiments the principal vehicle 506 and the subordinate vehicle 508 may negotiate a difference acceleration rate. Alternatively, the principal vehicle 506 may support the slower acceleration rate of the subordinate vehicle as long as the subordinate vehicle stays in a predetermined sensor range of the principal vehicle 506. Accordingly, the ACC parameters can be negotiated to determine how the principal vehicle 506 and subordinate vehicle 508 will operate relative to one another.

The relative parameters may also identify the types of vehicles that can be a principal vehicle 506 or subordinate vehicle 508. For example, a subordinate vehicle 508 may have a relative parameter indicating that only vehicles that have not been involved in an accident for a predetermined amount of time can act as a principal vehicle 506. The communications modules 406 and/or 420 may access vehicle histories and/or vehicle occupant records by accessing remote data 242 on the remote server linked to law enforcement or insurance agencies. Additionally or alternatively, a relative parameter may be associated with a vehicle occupant. For example, a subordinate vehicle 508 may have a relative parameter indicating that only vehicles registered to a vehicle occupant with a clean driving record can act as a principal vehicle. Accordingly, the relative parameters may be used to ensure or reassure vehicle occupant safety.

While for clarity, the categories of the cooperating parameters have been described in insular examples, different types of cooperating parameters can be combined. For example, suppose a relative parameter of the subordinate profile 804 indicated that the subordinate vehicle 508 should maintain a following distance of 50 feet in order to make use of the rear sensors of the principal vehicle 506 rather than employ the rear sensors of the subordinate vehicle 508.

The principal profile 802 may prefer a following distance of 100 feet. In this situation, the principal vehicle 506 may send a counter parameter that the following distance of 50 feet is acceptable if the subordinate vehicle 508 accepts a business parameter, that a $0.03 per mile be applied to any rate already being charged to the subordinate vehicle 508. Accordingly, the categories of cooperating parameters are not exclusive and may be used in combination including conditional dependence.

While the cooperating parameters have been described with respect to parameter negotiation, one or more of the cooperating parameters may be used to select a cooperating vehicle. For example, the broadcast messages described with respect to the rendezvous stage may include one or more of the cooperating parameters. For example, the principal vehicle 506 may broadcast that the principal vehicle 506 is available for cooperative automation given a specific business parameter, such as at predetermined principal price per mile. Likewise, the subordinate vehicles 508 and 510 may broadcast a request for cooperative automation at predetermined subordinate prices per mile. Accordingly, the principal vehicle 506 can select either the subordinate vehicle 508 or 510 based on the business parameter, here, how much the subordinate vehicles 508 and 510 are willing to pay for cooperative automation.

The cooperating vehicles may additionally engage in a preliminary negotiation in the rendezvous stage when a cooperating proposal is included in the broadcast messages. A preliminary negotiation may occur in a similar manner as described above with respect to negotiation in the parameter negotiation stage. For example, the cooperating vehicles may communicate with one or more of principal and subordinate profiles, counter parameters, vehicle occupant input, etc. Accordingly, the cooperating parameters can be adjusted by one or more of the cooperating vehicles in the rendezvous stage. In this manner, the cooperating parameters can be used during the rendezvous stage for selection of one or more cooperating vehicles.

When used at the rendezvous stage for selection purposes, the cooperating parameters may additionally be used at the parameter negotiation stage for customization. As described above, the cooperating parameters define the relationship and any cooperation between the cooperating vehicles, including conditions and parameters for sharing autonomy. Accordingly, some initial cooperating parameters may be shared at the rendezvous stage for selection of a cooperating vehicle and other cooperating parameters may be negotiated at the parameter negotiation stage to customize cooperative automation experience based on vehicle occupant preferences using, for example, the cooperating vehicle profiles.

As an example of the cooperating parameters exhibiting conditional dependence in the rendezvous stage, the principal vehicle 506 may select the subordinate vehicle 508 from the plurality of cooperating vehicles. The principal vehicle 506 may also include the pecuniary arrangement with the subordinate vehicle 508 based on the destination of the plurality of cooperating vehicles. Suppose, the principal vehicle 506 has a business parameter that indicates a minimum compensation for cooperative automation. The principal vehicle 506 may broadcast the principal vehicle's destination and indicate that the principal vehicle will tow for a shorter distance than that indicated by the principal vehicle's destination if the minimum compensation is satisfied.

Additionally, the conditional dependence in the rendezvous stage may be based on a cooperating vehicle profile. For example, a subordinate vehicle 508 may have to agree to a pecuniary arrangement and have a cooperating vehicle profile with cooperating parameters indicative of a desired driving style. Suppose the travel route traverses a busy roadway, the principal vehicle 506 may select a subordinate vehicle 508 with cooperating vehicle profile that is similar to the cooperating vehicle profile of the principal vehicle 506. Therefore, the selection of the subordinate vehicle 508 may be based on the type of roadway to be traversed, cooperating vehicle profiles, and/or specific cooperating parameters, such as the business parameters, being satisfied.

D. Cooperative Perception

As discussed above, once the control handoff is initiated, the cooperating vehicles enter the cooperative perception stage. The cooperative perception processes described below are performed by, coordinated by, or facilitated by the perception module 228 of cooperative vehicles. The perception module 228 may additionally utilize other components of the operating environment 200, including vehicle systems 204 and the vehicle sensors 206 as well as the subsystems 400 shown in FIG. 4. For example, the principal vehicle subsystems 402 may include a cooperative perception module 414.

During the cooperative perception stage, the cooperating vehicles participate in cooperative automation such that the cooperating vehicles may share sensor data from one or more of the sensors, such as the forward, side, or rearward sensors, of a cooperating vehicle. Accordingly, the cooperating vehicles can share their perception of their environment using sensor data. Furthermore, one cooperating vehicle may exert control over another cooperating vehicle. For example, the cooperating vehicle may provide another cooperating vehicle a behavior plan, as will be discussed below. In this manner the perception and/or behavior of the cooperating vehicles becomes interdependent.

The cooperative perception stage begins at block 334 of the method 300. At block 334 the principal vehicle 506 combines principal sensor data with subordinate sensor data. With respect to FIG. 9, the principal sensor data sensor data from the sensors of the principal vehicle 506 including the vehicle sensors 206 such as a light sensor 910 and the one or more principal image sensors 912a, 912b, 912c, 912d, 912e, and 912f that operate in a similar manner as the light sensor 110 and the one or more principal image sensors 112a, 112b, 112c, 112d, 112e, and 112f as described with respect to FIG. 1.

The light sensor 910 may be used to capture light data in the light sensing area 911. The size of the light sensing area 911 may be defined by the location, range, sensitivity, and/or actuation of the light sensor 910. The one or more principal image sensors 912a, 912b, 912c, 912d, 912e, and 912f may be used to capture image sensing data in corresponding image sensing areas 913a, 913b, 913c, 913d, 913e, and 913f. Accordingly, the principal sensor data of the principal vehicle 506 may include the light sensing data from the light sensing area 911 and the image sensing data from the image sensing areas 913a-913f. The principal sensor data may also include data from the vehicle systems 204 of the principal vehicle 506, such as a cruise control system (not shown) or navigation system 246, which can provide kinematic data such as speed and trajectory. Likewise, the principal sensor data may include information from the principal vehicle subsystems 402, shown in FIG. 4.

The subordinate sensor data includes sensor data from the vehicle sensors on the subordinate vehicle 508 including the one or more subordinate image sensors 914a, 914b, 914c, 914d and 914e that operate in a similar manner as the subordinate image sensors 114a, 114b, 114c, 114d and 114e described with respect to FIG. 1. The subordinate sensor data may also include data from vehicle systems 204 or subordinate vehicle subsystems 404 of the subordinate vehicle 508. In this example, the subordinate sensor data is captured using the one or more subordinate image sensors 914a, 914b, 914c, and 914d from the image sensing subordinate areas 915a-915e. Therefore, the subordinate sensor data is from the subordinate sensing area defined by the image sensing subordinate areas 915a-915e.

The principal sensor data is combined with the subordinate sensor data using the perception module 228, shown in FIG. 2, as wells as the principal vehicle subsystems 402, shown in FIG. 4. For example, the cooperative perception module 414 receives principal sensor data from the vehicle systems 204 and vehicle sensors 206. Accordingly, the subsystems 400 may be integrated with the vehicle sensors 206.

The subordinate sensor data may be sent through the subordinate vehicle subsystems 404. For example, the subordinate sensor data is sent through the subordinate communications module 420 to the principal communications module 406. The cooperative perception module 414 receives the subordinate sensor data from the principal communications module 406. The cooperative perception module 414 aggregates the principal sensor data and the subordinate sensor data to generate the combined sensor data. The combined sensor data may include a sensor map of an area surrounding the paired cooperative vehicles such as the principal vehicle 506 and the subordinate vehicle 508.

Figure 10:
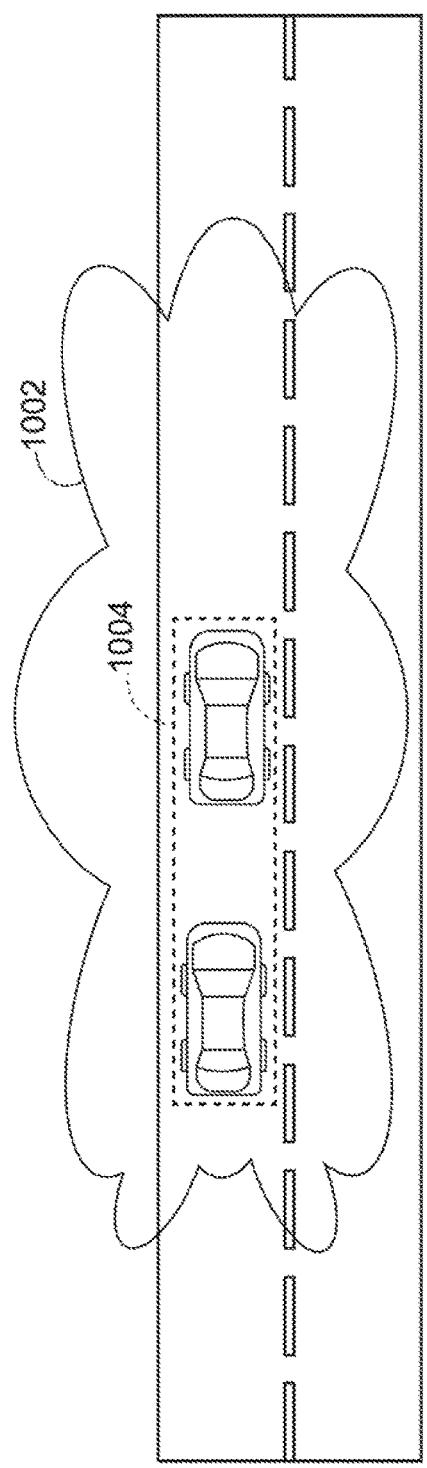
FIG. 10 is a schematic view of an exemplary traffic scenario on a roadway having vehicles engaging in cooperative sensing to generate a sensor map according to one embodiment.

FIG. 10 is a schematic view of an exemplary traffic scenario on a roadway having vehicles engaging in cooperative sensing to generate a sensor map according to one embodiment. The sensor map 1002 is based on the sensor footprint of the combined sensor areas, including the light sensing area 911 and the image sensing areas 913a-913f of the principal vehicle 506 and the image sensing subordinate areas 915a-915e of the subordinate vehicle 508. For example, the size of the sensor map 1002 may be based on the combined ranges of the sensors of the principal vehicle 506 and the subordinate vehicle 508. The sensor map 1002 may also be based on the sensor footprint of the principal vehicle 506 and the subordinate vehicle 508 given a threshold sensitivity of the sensors. For example, an underperforming sensor may not contribute to the sensor map 1002. In some embodiments, not all sensors may be continuously actuated. For example, the light sensor 910 of the principal vehicle 506 may have a 30-degree field of view that rotates about the principal vehicle 506. Accordingly, the sensor map may be dynamic based on how the sensors are calibrated and/or actuated.

In some embodiments, the principal vehicle 506 may control the sensors of the principal vehicle 506 and the subordinate vehicle 508 to capture sensor data for specific areas of the sensor map 1002. For example, the principal vehicle 506 may control actuation of subordinate sensors (e.g., triggering the activation of sensors) of the subordinate vehicle 508 and control transmission of sensor data to the principal vehicle 506 using a communication network 220. The synchronized actuation of the sensors and the synchronized transmission of sensor data allows the cooperating vehicles to synergistically share relevant sensor information that each vehicle alone may not be able to acquire and/or process.

The sensor map 1002 uses both the principal vehicle 506 and the subordinate vehicle 508 to encompass the combined vehicle area 1004 of the principal vehicle 506 and the subordinate vehicle 508. Accordingly, the combined vehicle area 1004 can be considered a single aggregate vehicle formed by the cooperating vehicles, here the principal vehicle 506 and the subordinate vehicle 508.

Returning to FIG. 3, at block 336 the method 300 includes generating a behavior plan for the subordinate vehicle 508 based on the sensor map 1002. For example, the perception module 228 may generate the behavior plan. In particular, the principal vehicle 506 utilizes its increased decision-making ability to make decisions for itself as well the subordinate vehicle 508. For example, the behavior planning module 408 uses information from the localization module 410 and the combined sensor data from the cooperative perception module 414 to generate the behavior plan. In some embodiments, the cooperating parameters may define a destination. The perception module 228 may use the vehicle systems 204 such as the navigation system 246 to plan a route. The actions of the behavior plan may include the directions necessary to travel the planned route. Likewise, the perception module 228 may use the vehicle sensors 206 to navigate the roadway, such as maneuvering through traffic. Additionally, at 336 the behavior plan may be executed by principal control module 416. The principal control module 416 may access the vehicle systems 204, such as the navigation system 246 and the steering system to control the principal vehicle 506.

Like the cooperative position plan 600 shown in FIG. 6, the behavior plan includes one or more actions for navigating a roadway. The actions may correspond to messages between the principal vehicle 506 and the subordinate vehicle 508. The actions may include longitudinal movements, lateral movements, trajectory, speed, etc. to achieve the actions. For example, the actions may result in a subordinate vehicle 508 being directed to mirror the maneuvers of the principal vehicle 506. The behavior plan may include spatial or temporal offsets. The spatial and temporal offsets indicate a specific location or time at which an action is to occur. For example, a spatial and/or temporal offset may be used so that the subordinate vehicle maneuvers before, simultaneously, or after the principal vehicle 506 maneuvers. In another example, a first action may be set to happen at a first time and a second action, if necessary, may be set to happen at a second time using a temporal offset. In this manner, it may appear that the subordinate vehicle 508 is acting independently of the principal vehicle 506.

At block 338, the behavior plan is provided to the subordinate vehicle 508. For example, the perception module 228 can transmit the subordinate vehicle 508 through the communication network 220 or using the transceiver 230 and the remote transceiver 232. The behavior plan may be received at a subordinate control module 424 for execution. The subordinate control module 424 may access the vehicle systems 204, such as the navigation system 246 and the steering system to control the subordinate vehicle 508.

In some embodiments, the behavior plan may be reviewed by the collision check module 422. Here, the collision check module 422 receives information from the vehicle system 204 and the vehicle sensors 206 to determine if the actions from the behavior plan are feasible for the subordinate vehicle 508. For example, the collision check module 422 may determine if an action, like a lane change, is possible or should be prevented for some reason, such as an obstacle in the roadway.

Once received, the subordinate vehicle 508 executes the behavior plan at block 340. Because the behavior plan may be executed according to offsets, the subordinate vehicle 508 may delay any maneuvers. Executing the behavior plan may result in the subordinate vehicle 508 acting with a higher level of autonomy than the subordinate vehicle 508 is intrinsically capable of.

Figure 11:
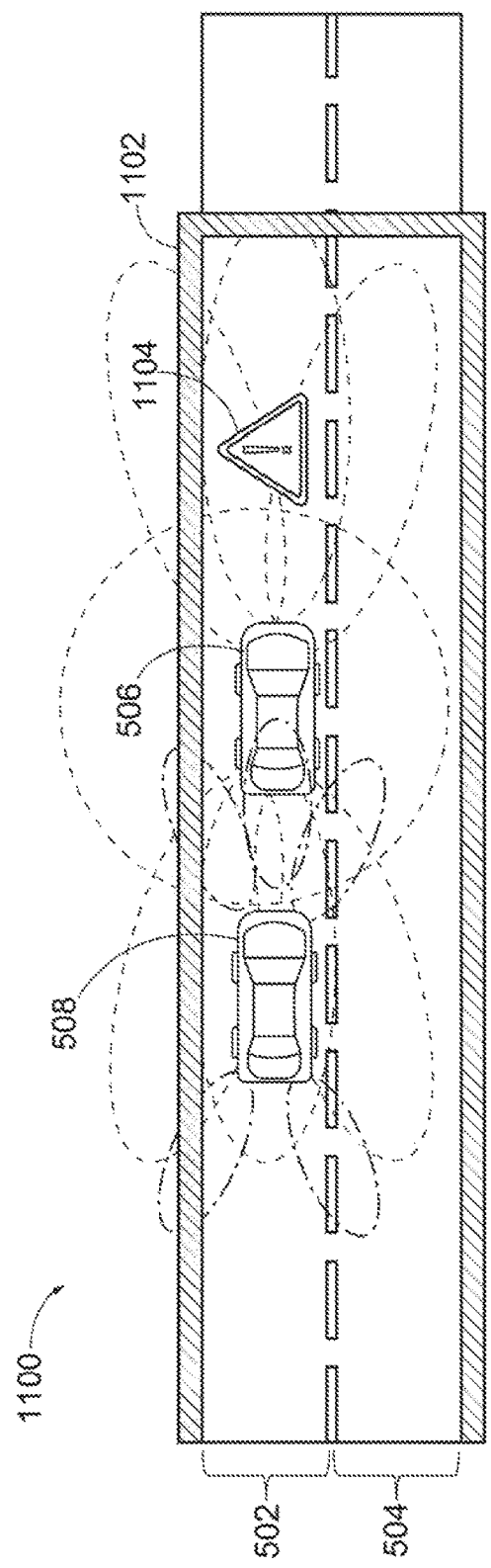
FIG. 11 is a schematic view of an exemplary traffic scenario on a roadway having an obstacle according to one embodiment.

At block 342, an obstacle is identified. The obstacle may be any manner of object in the roadway. FIG. 11 illustrates a roadway 1100 having obstacles including a geofence 1102 and an object 1104 in a path according to one embodiment. The geofence 1102 is an intangible boundary defined by coordinates such as global positioning satellite (GPS) coordinates or radio-frequency identification (RFID) coordinates. As discussed above, the geofence 1102 identifies a boundary at which shared autonomy, such as cooperative automation or vehicle-to-vehicle control, is not permitted or scheduled to end. The geofence 1102 may be placed for a safety. For example, the geofence 1102 may be defined if the region beyond is not safe to travel autonomously. Alternatively, the geofence 1102 may be defined due to local legal requirements, zoning laws, terrain concerns, weather conditions, cooperating vehicle limitations, etc.

The geofence 1102 may be known obstacle. For example, the navigation system 246 may receive and/or store data about the geofence 1102. Suppose the navigation system 246 plans a route, the navigational data may include information about the geofence 1102. Alternatively, the coordinates of the geofence 1102 may be received from other vehicles, such as the cooperating vehicle 218 or stored on the remote server 236 as remote data 242 and received over the communications interface over the communication network 220 or the wireless network antenna 234. In another embodiment, the geofence coordinates may be received from roadside equipment 252.

The object 1104 may be any obstacle including pedestrians crossing the roadway, other vehicles, animals, debris, potholes, roadway conditions, etc. The combined sensor data including the principal sensor data and the subordinate sensor data may be used to identify the object 1104. Additionally, the vehicle systems 204 or subsystems 400 may be used to identify the obstacle as an object 1104.

At block 344, it is determined whether a return handoff is required. Whether a return handoff is required may be based the type of obstacle, cooperating parameters, and/or a combination thereof. For example, encountering the geofence 1102 may require a return handoff. However, the object 1104 may not necessarily require a return handoff. Instead, a relationship parameter may indicate that if the object 1104 is within 50 yards of the cooperating vehicle leading in the cooperation position then return handoff is required. Otherwise the return handoff may be based on the ability of the principal vehicle 506 to generate a behavior plan to navigate around the object 1104 regardless of the location of the principal vehicle 506 in the cooperative position. If a return handoff is not required at block 344, the method 300 returns to 336 and a behavior plan is generated. Thus, as discussed above, the behavior plan can incorporate sensed changes to the roadway such as the object 1104. In this manner, behavior plans may be continually updated since the vehicles are typically moving and therefore the roadway is typically changing.

If return handoff is required at block 344, the method 300 continues to block 346. At block 346 the shared autonomy ends by initiating a return handoff that returns control to the subordinate vehicle 508 such that the principal vehicle 506 is no longer providing data, functionality, and/or control that allows the subordinate vehicle 508 to function in a manner consistent with a higher level of autonomy than the inherent level of autonomy of the subordinate vehicle 508. Accordingly, the subordinate vehicle 508 returns to behaving in a manner consistent with its inherent level of autonomy. Likewise, the principal vehicle 506 no longer receives subordinate sensor data from the subordinate vehicle 508.

The return handoff may be a standard return handoff or an emergency return handoff. The type of handoff may be based on obstacle identified at block 342 as well as the negotiated cooperating parameters provided by the cooperating vehicles. For example, the geofence 1102 may be known before it can be directly sensed and thus may be included in the planned route and/or the behavior plan. Accordingly, the return handoff can be planned and executed as a standard return handoff. The standard return handoff may be a planned event that has a pattern of handoff alerts and/or handoff actions. In some embodiments, control of the subordinate vehicle 508 may be returned in stages. Conversely, the object 1104 may not be planned for in the behavior plan. The principal vehicle 506 may have to perform an emergency handoff to the subordinate vehicle 508. The emergency handoff may be performed on a predetermined time scale to return control to the vehicle occupant of the subordinate vehicle as soon as may be.

While the FIGS. 5-11 are described with respect to a cooperative pairing including a principal vehicle 506 and the subordinate vehicle 508, as discussed above, the systems and methods may include cooperative pairings of one or more principal vehicles and one or more subordinate vehicles. For example, the cooperative pairings may include three or more vehicles and each of the three or more vehicles may agree to cooperating parameters. A principal vehicle among the three or more vehicles combines sensor data from the three or more vehicles in order to generate a behavior plan for each of the three or more vehicles. Alternatively, the principal vehicle 506 may combine sensor data from the three or more vehicles to generate a behavior plan for two of the three or more vehicles.

Figure 12:
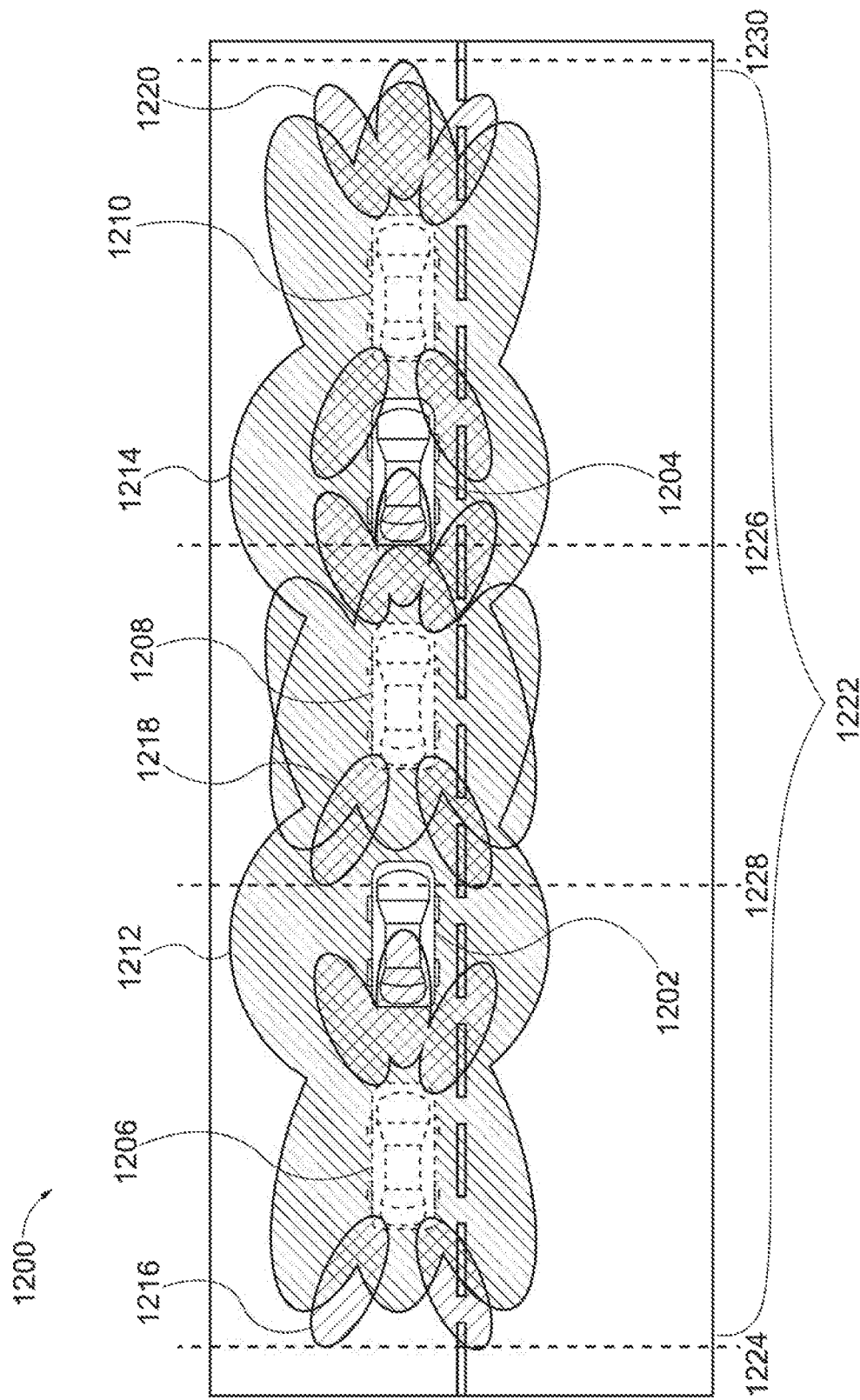
FIG. 12 is a schematic view of an exemplary traffic scenario on a roadway having multiple principal vehicles engaging in a cooperative automation chain according to one embodiment.

For example, a plurality of cooperating vehicles may participate in a cooperative automation chain 1200. FIG. 12 is a schematic view of an exemplary traffic scenario on a roadway having multiple principal vehicles engaging in a cooperative automation chain 1200 according to one embodiment. The cooperative automation chain 1200 may include three or more cooperating vehicles. The three or more cooperating vehicles may include at least two principal vehicles and/or two subordinate vehicles. The cooperative automation chain 1200 includes two principal vehicles: a first principal vehicle 1202 and a second principal vehicle 1204 and three subordinate vehicles: a first subordinate vehicle 1206, a second subordinate vehicle 1208, and a third subordinate vehicle 1210.

The first principal vehicle 1202 has a first principal sensor area 1212 based on the sensor footprint of the first principal vehicle 1202. The size of the first principal sensor area 1212 may be based on the ranges and/or threshold sensitivity of the sensors of the first principal vehicle 1202. The first principal sensor area 1212 encompasses the first subordinate vehicle 1206 and the second subordinate vehicle 1208. The first subordinate vehicle 1206 has a first subordinate sensor area 1216 and the second subordinate vehicle 1208 has a second subordinate sensor area 1218. The subordinate sensor areas 1216 and 1218 are based on the on the ranges and/or threshold sensitivity of the sensors of their respective subordinate vehicles 1206 and 1208.

The second principal vehicle 1204 has a second principal sensor area 1214 based on the sensor footprint of the second principal vehicle 1204. The size of the second principal sensor area 1214 may be based on the ranges and/or threshold sensitivity of the sensors of the second principal vehicle 1204. The second principal sensor area 1214 encompasses the second subordinate vehicle 1208 and the third subordinate vehicle 1210. The third subordinate vehicle 1210 has a third subordinate sensor area 1220.

During the cooperative perception stage, the sensor data from one or more of the cooperating vehicles is provided to the other cooperating vehicles. For example, the first principal vehicle 1202 may receive sensor data from the second principal vehicle 1204, the first subordinate vehicle 1206, the second subordinate vehicle 1208, and the third subordinate vehicle 1210. The sensor data can be used to generate a sensor map 1222 that combines the first principal sensor area 1212, second principal sensor area 1214, the first subordinate sensor area 1216, the second subordinate sensor area 1218, and the third subordinate sensor area 1220.

Using the sensor map 1222, the first principal vehicle 1202 and/or the second principal vehicle 1204 can provide decisions for itself as well as the other principal vehicle and/or the subordinate vehicles 1206, 1208, and 1210. For example, the behavior planning module 408 of the first principal vehicle 1202 may use information from the localization module 410 and the sensor data from the sensor map 1222 of the cooperative perception module 414 to generate behavior plans for the second principal vehicle 1204 and/or the subordinate vehicles 1206, 1208, and 1210.

The manner in which the cooperating vehicles function together may be determined during the rendezvous stage or the parameter negotiation stage. The cooperating vehicles may meet in one or more impromptu meetings, described at 302, one or more arranged meetings, described at 304, or a combination of impromptu meetings and arranged meetings. For example, the first principal vehicle 1202 may have an arranged meeting 304 with the first subordinate vehicle 1206 and the second principal vehicle 1204 may have had an arranged meeting 304 with the second subordinate vehicle 1208 and an impromptu meeting 302 with the third subordinate vehicle 1210.

Suppose the first principal vehicle 1202 is cooperating with first subordinate vehicle 1206. The first principal vehicle 1202 may also be broadcasting a broadcast message requesting additional principal vehicles for a cooperative automation chain. A principal vehicle may request an additional principal vehicle to enlarge the size of the sensor map of the principal vehicle. The larger the sensor map the more sensor data that the principal vehicle receives allowing the principal vehicle to make more informed and safer decisions for itself and any other cooperating vehicles it is engaging in cooperative perception. For example, the first principal vehicle 1202 has an individual sensor map that extends from a first sensor border 1224 to a second sensor border 1226 based on the first principal sensor area 1212. The second principal vehicle 1204 has a sensor map that extends from a third sensor border 1228 to a fourth sensor border 1230. By engaging the second principal vehicle 1204 in cooperative automation, the first principal vehicle 1202 can extend the sensor map 1222 from the first sensor border 1224 to the fourth sensor border 1230.

The third subordinate vehicle 1210 may have sent a broadcast message with a cooperative proposal received by the second principal vehicle 1204 in an impromptu meeting. In such an example, the second principal vehicle 1204 may have conditional accepted the cooperative proposal if the third subordinate vehicle 1210 is able to assume a cooperative position in which the third subordinate vehicle is ahead of the second principal vehicle 1204. Thus, even though the second principal vehicle 1204 is in the cooperative perception stage with the second subordinate vehicle 1208, the second principal vehicle 1204 may also be in the rendezvous stage or cooperative position stage with the third subordinate vehicle 1210. Accordingly, cooperating vehicles can simultaneously participate in different stages of cooperative automation with different vehicles. In this manner, the second principal vehicle 1204, the second subordinate vehicle 1208, and the third subordinate vehicle 1210 form a cooperative automation chain of three vehicles.

Figure 13:
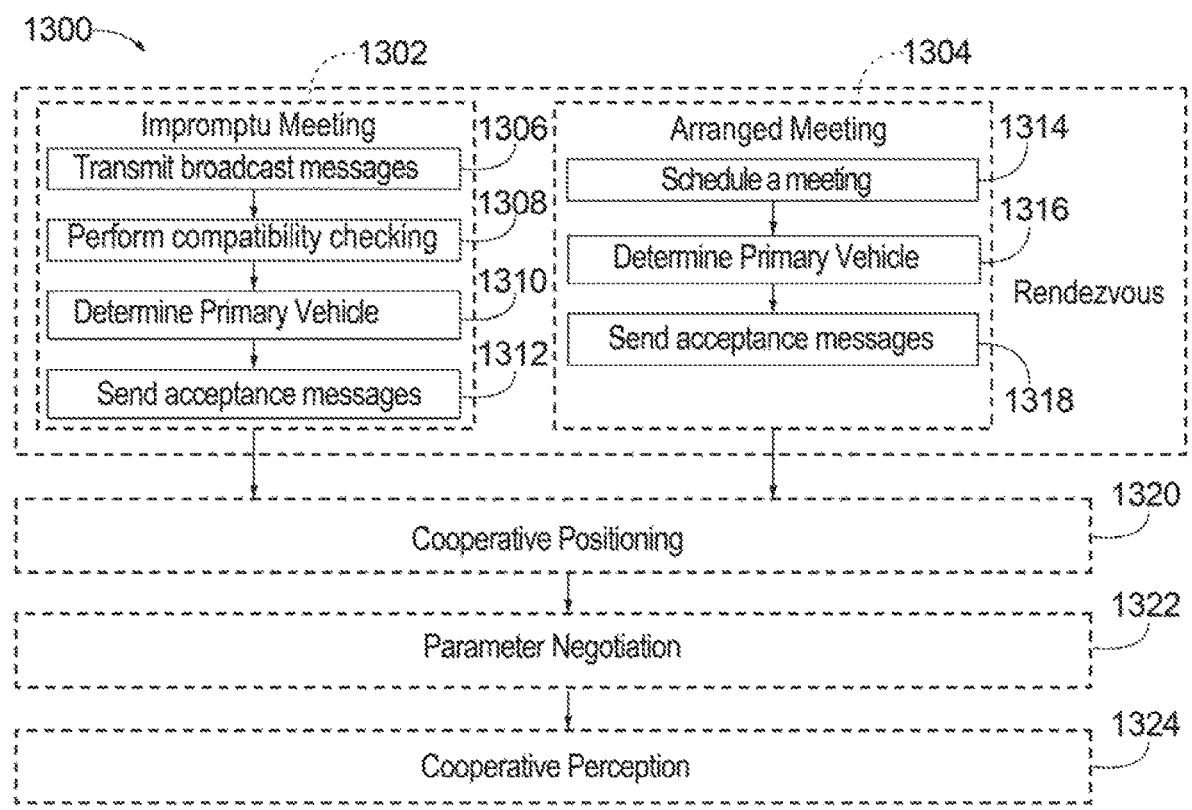
FIG. 13 is a process flow for shared autonomy in a cooperative automation chain according to one embodiment.

In addition to messaging between the principal vehicles and the subordinate vehicles, principal vehicles may communicate with each other in order to form a cooperative automation chain together. FIG. 13 is a process flow for shared autonomy between principal vehicles in a cooperative automation chain according to one embodiment. Referring now to FIG. 13, a method 1300 for cooperative sensing will now be described according to an exemplary embodiment. FIG. 13 will also be described with reference to FIG. 12.

Like FIG. 3, the method for shared autonomy between principal vehicles in a cooperative automation chain can be described by the four stages: (A) rendezvous, (B) cooperative positioning, (C) parameter negotiation, and (D) cooperative perception. For simplicity, the method 1300 will be described by these stages, but it is understood that the elements of the method 1300 can be organized into different architectures, blocks, stages, and/or processes.

As discussed above with respect to FIG. 3, cooperating vehicles identify other cooperating vehicles in an impromptu meeting 1302 or an arranged meeting 1304. For example, an impromptu meeting 1302 may occur when the cooperating vehicles are traveling in the same direction on a roadway. At block 1306, the cooperating vehicles transmit broadcast messages. The broadcast messages may be generated and transmitted by the rendezvous module 222. The broadcast messages include vehicle identifiers and a level of autonomy of the cooperating vehicle. In the event that a cooperating vehicle is currently acting as a principal vehicle, the broadcast message may also include this information as well as details regarding the current cooperative automation. For example, the broadcast message may include the cooperating parameters (e.g., the destination of the current cooperative automation, the destination of the broadcasting cooperating vehicle, the number of cooperating vehicles receiving behavior plans from the cooperating vehicle, etc.). The broadcast message may also include information about the sensor map of the broadcasting cooperating vehicle and/or sensor map of vehicles cooperating with the broadcasting cooperating vehicles.

The broadcast message may also include a vehicle identifier for each of the cooperating vehicles already engaged in cooperative automation and the cooperating vehicles' level of autonomy. Suppose that the second principal vehicle 1204 is the broadcasting cooperating vehicle. The broadcast message may include that the second principal vehicle 1204 has two subordinate vehicles and/or may identify the second subordinate vehicle 1208 and the third subordinate vehicle 1210. The broadcast message may also include the size of the second principal sensor area 1214 and the length of the sensor map of the second principal vehicle 1204. For example, the length of the sensor map and may include the location of the third sensor border 1228 and the fourth sensor border 1230. The sensor border may be identified as a distance from the second principal vehicle 1204. Thus, the broadcast message may include GPS coordinates of the second principal vehicle 1204 and a distance to the third sensor border (e.g., 10 meters rearward from the second principal vehicle 1204, 10 meters including a trajectory, to meters in a southerly direction, etc.) and a distance to the fourth sensor border (e.g., 10 meters forward from the second principal vehicle 1204, 10 meters including a trajectory, to meters in a northerly direction, etc.). Suppose that the second principal vehicle 1204 is a Level 4 autonomous vehicle, the second subordinate vehicle 1208 is a Level 2 autonomous vehicle and the third subordinate vehicle 1210 is a Level 3 autonomous vehicle, that information may also be included in the broadcast message.

At 1308, a compatibility check is performed in a similar manner as described above with respect to FIG. 3. The compatibility check may be performed by the rendezvous module 222. Suppose that the first principal vehicle 1202 receives the broadcast message from the second principal vehicle 1204. Here, shared autonomy between the principal vehicles occurs when the first principal vehicle 1202 and the second principal vehicle 1204 exchange information. Unlike the principal vehicle and the subordinate vehicle described above with respect to FIG. 1, the principal vehicles may have the same autonomy level such that the principal vehicles do not have a differential autonomy. Here, a cooperating vehicle may be a principal vehicle if it is supporting a subordinate vehicle.

Additionally or alternatively, the status of a cooperating vehicle as a principal vehicle or a subordinate vehicle may be based on the autonomy level of the cooperating vehicle. For example, the autonomy level of the cooperating vehicle may be compared to a principal vehicle threshold. For example, the principal vehicle threshold may be Level 4 vehicles and higher. Accordingly, if the cooperating vehicle is a Level 4 vehicle it is determined to be a principal vehicle. In some embodiments, the cooperating vehicle may be a principal vehicle based on the sensor capabilities of the cooperating vehicle. For example, a cooperating vehicle may be a principal vehicle if it has a sensor threshold. The sensor threshold may be at least one predetermined sensor capability. In another embodiment, the status of the cooperating vehicles may be determined relative to other cooperating vehicles. For example, cooperating vehicles with a higher autonomy level than the cooperating vehicles that it is cooperating with, may be deemed a principal vehicle.

Instead, the compatibility check between principal vehicles may determine whether the sensor area of the principal vehicles is sufficient to encompass any subordinate vehicles that are sharing autonomy with the principal vehicles. For example, during the compatibility check, the first principal vehicle 1202 may determine if the first principal sensor area 1212 and the second principal sensor area 1214 of the second principal vehicle 1204 are sufficient to provide adequate sensor coverage to the first subordinate vehicle 1206, the second subordinate vehicle 1208, and the third subordinate vehicle 1210. Adequate sensor coverage may be determined based on whether each of the first subordinate vehicle 1206, the second subordinate vehicle 1208, and the third subordinate vehicle 1210 can be covered if the principal vehicles share autonomy. In this manner, the compatibility check may involve cooperative positioning 1320 discussed above with respect to FIG. 3. For example, the compatibility check may include determining whether the sensor coverage is adequate based on one or more generated cooperative position plans.

Suppose that the first principal vehicle 1202 is sharing autonomy with the first subordinate vehicle 1206 and that the second principal vehicle 1204 is sharing autonomy with the second subordinate vehicle 1208 and the third subordinate vehicle 1210. During a compatibility check, at 1308, between the first principal vehicle 1202 and the second principal vehicle 1204, may generate a cooperative position plan, described at 316, and/or modify a desired cooperative position, described at 320, for each of the cooperating vehicles. For example, the cooperative position plans may include different positional arrangements of the first principal vehicle 1202 and the second principal vehicle 1204 relative to each other, and relative to the first subordinate vehicle 1206, the second subordinate vehicle 1208, and the third subordinate vehicle 1210. Thus, the compatibility check can determine whether the first principal vehicle 1202 and the second principal vehicle 1204 can share autonomy safely.

The compatibility check at block 1308 may also include determining whether the routes of the first principal vehicle 1202 and the second principal vehicle 1204 are compatible. For example, suppose the second principal vehicle 1204 is broadcasting broadcast messages requesting cooperative autonomy. The broadcast message from the second principal vehicle 1204 may include a planned route that the second principal vehicle 1204 plans to travel to a desired destination. The planned route of the second principal vehicle 1204 may be based on an individual route of the second principal vehicle 1204 or the shared autonomy route of the second principal vehicle 1204 and the second subordinate vehicle 1208 and/or the third subordinate vehicle 1210. Additionally, the planned route may include a geofence as discussed above with respect to FIG. 11.

Upon receiving the broadcast message, the first principal vehicle 1202 may determine if the first principal vehicle 1202 also plans to travel along the planned route of the second principal vehicle 1204. For example, the first principal vehicle 1202 may compare the planned route to navigation data from the navigation system 246. If the first principal vehicle 1202 does plan to travel at least a portion of the planned route of the second principal vehicle 1204, the route planning portion of the compatibility check, at block 1308, may be deemed successful.

At block 1310, the cooperating vehicles determine which vehicle will act as the primary vehicle. The primary vehicle is the principal vehicle that makes decisions for at least some of the cooperating vehicles. The primary vehicle may make decisions for each of the cooperating vehicles in the cooperative automation chain. For example, if the first principal vehicle 1202 is the primary vehicle, then the first principal vehicle 1202 may generate a behavior plan and transmit the behavior plan to the second principal vehicle 1204, the first subordinate vehicle 1206, the second subordinate vehicle 1208, and the third subordinate vehicle 1210. Accordingly, the behavior plan may include individualized actions for each of the cooperating vehicles and any offsets.

In another embodiment, the first principal vehicle 1202 acting as the primary vehicle generates a behavior plan and transmits the behavior plan to the second principal vehicle 1204. Suppose the second principal vehicle 1204 is sharing autonomy with the second subordinate vehicle 1208 and the third subordinate vehicle 1210. The second principal vehicle 1204 may then transmit the behavior plan to the second subordinate vehicle 1208 and the third subordinate vehicle 1210. Accordingly, the principal vehicles sharing autonomy may be transparent to the subordinate vehicles. In this example, because the second subordinate vehicle 1208 and the third subordinate vehicle 1210 receive the behavior plan from the second principal vehicle 1204, vehicle occupants of the second subordinate vehicle 1208 and/or the third subordinate vehicle 1210 may be unaware of the first principal vehicle 1202.

In some embodiments, determining the primary vehicle may be based on the differential autonomy of the principal vehicles. Suppose that the first principal vehicle 1202 has a Level 4 autonomy level and the second principal vehicle 1204 has a Level 5 autonomy level. The primary vehicle may be the principal vehicle with a higher level of autonomy. Therefore, in this example, the primary vehicle would be the second principal vehicle 1204 because it has a higher level of autonomy than the first principal vehicle 1202.

In other embodiments, the primary vehicle may be determined based on the compatibility check. For example, determining the primary vehicle may be based on the planned route exchanged during the compatibility check. Suppose that the first principal vehicle 1202 is traveling a planned route to a predetermined destination and the second principal vehicle 1204 is traveling along only a portion of the planned route. The first principal vehicle 1202 may be determined to be the primary vehicle since it is traveling a longer distance on the planned route.

At block 1312, the method 1300 includes sending an acceptance message to initiate a shared autonomy mode when the compatibility check is successful and a primary vehicle is determined. The acceptance message may be sent by the rendezvous module 222 when the host vehicle performs a successful compatibility check. For example, suppose the first principal vehicle 1202 transmits a broadcast message indicating that it is available for sharing autonomy with the rendezvous module 222. The second principal vehicle 1204 performs the compatibility check with its rendezvous module 222 upon receiving a broadcast message from the first principal vehicle 1202. The second principal vehicle 1204 may send an acceptance message indicating that the second principal vehicle 1204 is entering a shared autonomy mode and recommending that the first principal vehicle 1202 enter a shared autonomy mode.

Alternatively, at block 1314, the method 1300 includes scheduling a prearranged meeting between cooperating vehicles at 1304. For example, vehicle occupants may be able to schedule shared autonomy through the host vehicle, such as through a display 250, or through a portable device 254 using an application as will be discussed at FIG. 15. For example, a vehicle occupant may be able to search for and schedule shared autonomy with other principal vehicles to form a cooperative automation chain. In some embodiments, the scheduling at block 1314 may be made by indicating a location and time for the first principal vehicle 1202 and the second principal vehicle 1204 to meet. This may be done well in advance of a meeting or while a host vehicle is traveling.

At block 1316, the cooperating vehicles determine which vehicle will act as the primary vehicle. In some embodiments, the primary vehicle determination may be made during scheduling. In other embodiments, the determination may be made once the principal vehicles are within a shared autonomy range of one another. The shared autonomy range may be based on the sensor range of the principal vehicles, a predetermined distance (300 yards, 500 yards, 750 yards, etc.), arrival at the scheduled location, or a combination thereof. For example, the first principal vehicle 1202 initiates a determination once the first principal vehicle 1202 is within shared autonomy range of the second principal vehicle 1204 to determine which vehicle will act as the primary vehicle.

At block 1318, the method 1300 includes sending an acceptance message to initiate a shared autonomy mode when the compatibility check is successful and a primary vehicle is determined. Accordingly, the method 1300 progresses to cooperative positioning 1320, parameter negotiation 1322, and cooperative perception as discussed above with respect to the stages described in FIG. 3.

Figure 14:
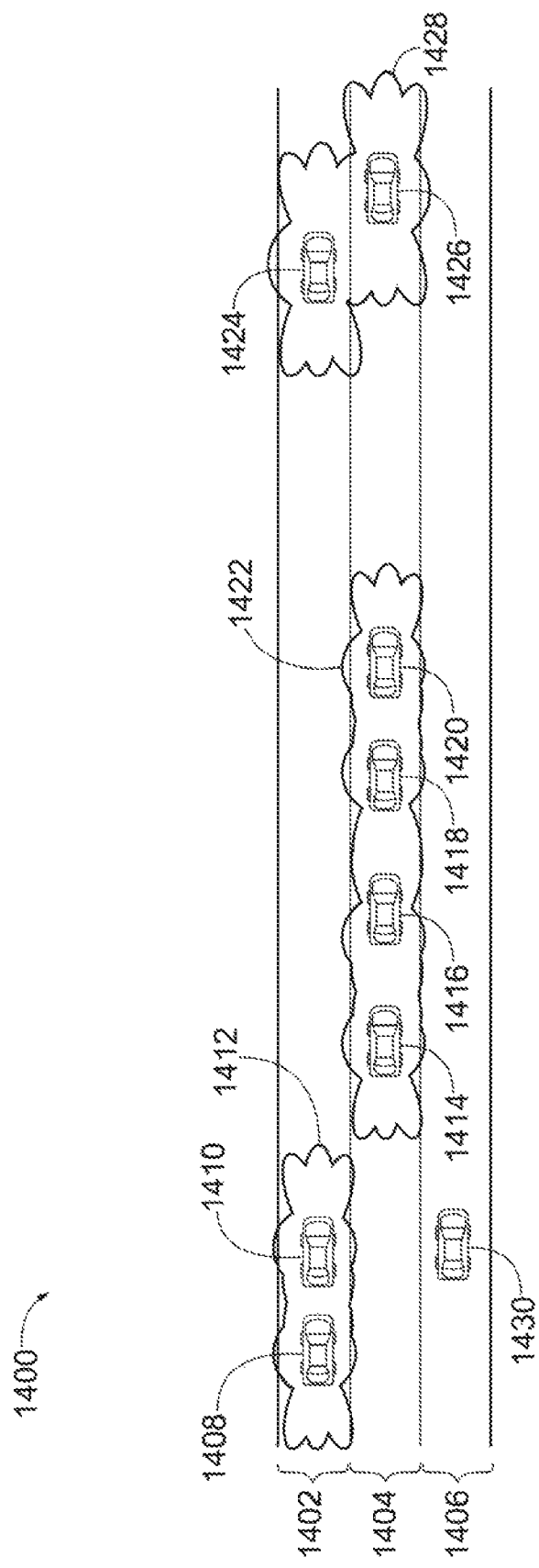
FIG. 14 is a schematic view of an exemplary traffic scenario on a roadway having different groupings of cooperating vehicles according to one embodiment.

FIG. 14 is a schematic view of an exemplary traffic scenario on a roadway having grouping of cooperating vehicles engaging in a cooperative automation chain according to one embodiment. The roadway 1400 has a first lane 1402, a second lane 1404, and a third lane 1406. Cooperating vehicles may share autonomy in numerous arrangements shown on the roadway 1400. For example, a first principal vehicle 1408 may be following a first subordinate vehicle 1410 in the first lane 1402. The combination of the first principal vehicle 1408 and the first subordinate vehicle 1410 have a first sensor map 1412.

In another arrangement, cooperating vehicles form a cooperative automation chain including a second principal vehicle 1414, a second subordinate vehicle 1416, a third subordinate vehicle 1418, and a third principal vehicle 1420 in the second lane 1404. The cooperative automation chain has a second sensor map 1422. Although positioned in a longitudinal arrangement in the second lane 1404, the cooperative automation chain may span a plurality of lanes. For example, a cooperating vehicle 1430 in the third lane 1406 may be included in the cooperative automation chain if the second sensor map 1422 is large enough to encompass the cooperating vehicle 1430.

In one arrangement, cooperating vehicles, including a fourth subordinate vehicle 1424 and a fourth principal vehicle 1426 form an inter-lane combination that spans the first lane 1402 and the second lane 1404. Accordingly, the combination of the fourth subordinate vehicle 1424 and the fourth principal vehicle 1426 have a third sensor map 1428 that spans the first lane 1402 and the second lane 1404.

Figure 15:
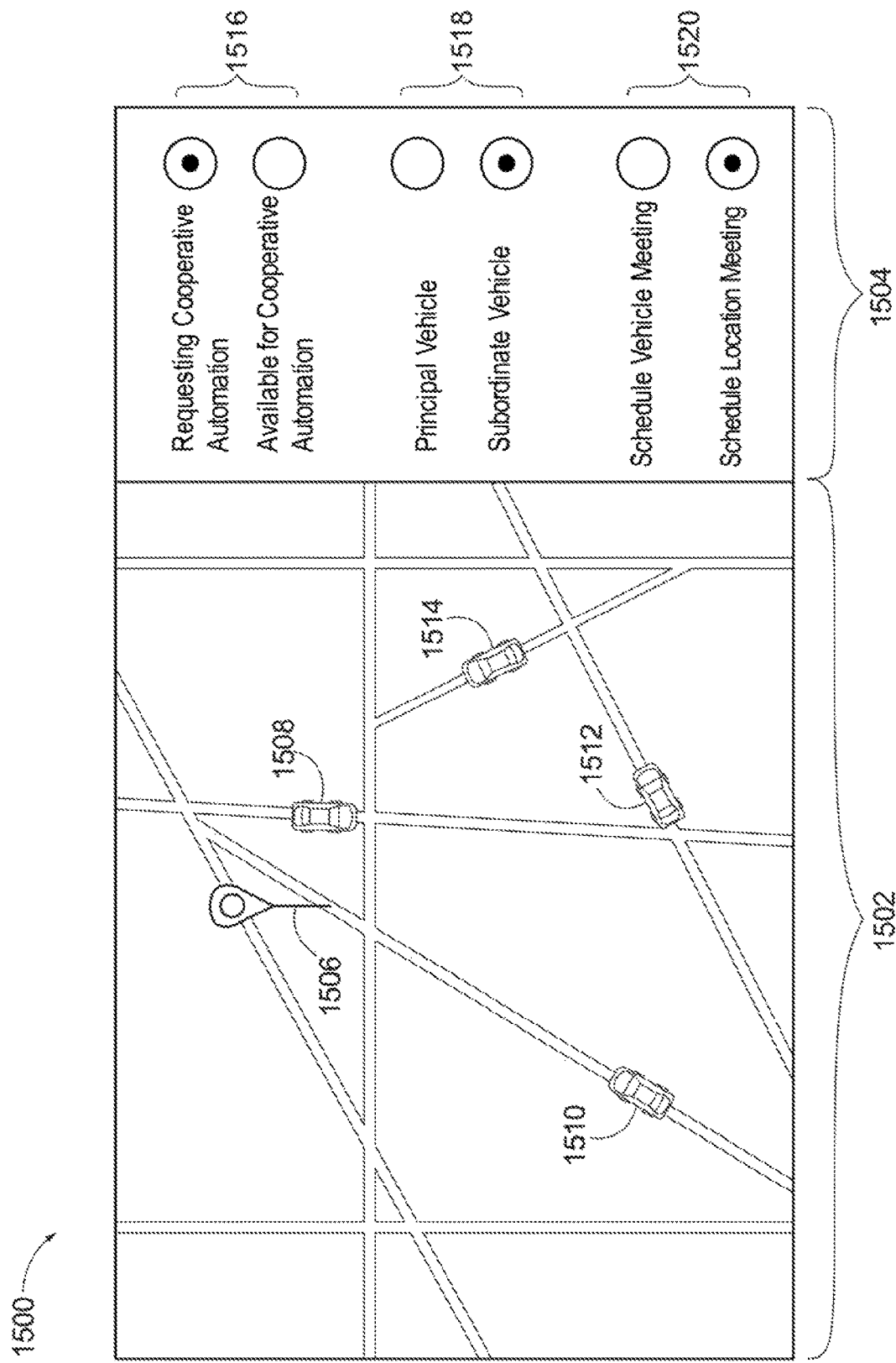
FIG. 15 is a schematic view of an exemplary visual representation of cooperating vehicles according to one embodiment.

Cooperating vehicles may be identified, scheduled and/or selected using a visual representation, such as the visual representation 1500 shown in FIG. 15. The visual representation 1500 may be displayed on the display 250 of the infotainment system 248 or on the portable device 254. In some embodiments, the visual representation 1500 is generated in conjunction with an application, program, or software and displayed on the display 250 of the infotainment system 248 or on the portable device 254. The visual representation 1500 may be modified using a touch screen or input device, such as a keyboard, a mouse, a button, a switch, voice enablement, etc.

The visual representation 1500 may include a map area 1502 and a settings area 1504. Here, the map area 1502 and the settings area 1504 are shown side by side for clarity, but one or the other may be dominant in the field of view of a user. Alternatively, the user may be able to toggle between the map area 1502 and the settings area 1504 so that one or the other is displayed at a given time. The map area 1502 and the settings area 1504 are exemplary nature and may rendered with different or additional features. For example, the settings area 1504 is shown with radio buttons, however, toggle switches, check boxes, dialog boxes, pop-up menus, drop down menus, among other graphical interfaces may be used additionally or alternatively. In some embodiments, other data related to cooperating vehicles may also be shown with the map area 1502 and the settings area 1504.

The map area 1502 may be rendered based on the location of the display rendering the map area 1502. For example, suppose the map area is displayed on a portable device 254. The map area 1502 may be rendered based on the location of the portable device 254 and thus, a user. The map area 1502 may be rendered using any of a number of network-based mapping tools available. Network-based mapping tools generally provide the user with on-demand textual or graphical maps of user specified locations. Further, several related systems may provide the user with on-demand maps of automatically determined device locations based, for example, positioning technology such as satellite navigation (GPS, Galileo, Glonass, etc.) or as some function of Wi-Fi mapping, GSM-based cell signal mapping, RFID tracking, etc. In some embodiments, the portable device 254 may be tracked by using signal triangulation from nearby cell towers to pinpoint the location of the portable device 254. Similarly, Wi-Fi mapping generally locates a user by evaluating signal samples from multiple access points. In this manner, the map area 1502 can be rendered by tracking the portable device 254. Thus, the map area 1502 can be rendered to illustrate a predetermined area centered on the portable device 254. In some embodiments, the user can select the size of the predetermined area or change the size of the predetermined area based on a desired radius.

The map area 1502 may be displayed on the portable device 254 such that a user can see, select, and/or track cooperating vehicles that are available for cooperative automation. In one embodiment, a vehicle and or a location can be selected for cooperative automation. For example, a user can select a destination by placing a destination indicator 1506 in the map area 1502. Alternatively, a user can select a vehicle by selecting a vehicle icon such as a first vehicle icon 1508, a second vehicle icon 1510, a third vehicle icon 1512, or a fourth vehicle icon 1514. The vehicle icons may represent cooperating vehicle on the roadway illustrated in the map area 1502 in real-time. Accordingly, a user can track the locations of cooperating vehicles.

In some embodiments, the cooperating vehicles may be shown in the map area 1502 when the vehicle occupants of the cooperating vehicles are participating in shared autonomy by broadcasting requests or availability. In another embodiment, the cooperating vehicles may be shown in the map area 1502 when a vehicle occupant inputs a destination for a cooperating vehicle. The destination may be input using the navigation system 246 of the operating environment or through an application running on the portable device 254. In another embodiment, the cooperating vehicles may be shown in the map area 1502 when the application is running on the portable device 254.

In some embodiments, the cooperating vehicles may be filtered from the map area 1502 based on settings in the settings area 1504. The settings area 1504 may allow a user to select cooperating vehicles the type of broadcast message selection at 1516. For example, the broadcasting message selection 1516 may be a radio button that allows the user to select between requesting cooperative automation or available for cooperative automation. As shown, the user has selected to request cooperative automation. Accordingly, the user can modify the map area 1502 to show filtered results based on the user's preferences. Other filter preferences may include, but are not limited to, showing cooperating vehicles with a threshold autonomy level or higher, showing cooperating vehicles based on a shared travel route, whether the cooperating vehicle is operating as a principal vehicle or a subordinate vehicle, proximity to the host vehicle, etc. For example, the proximity to the host vehicle may be based on cooperating vehicles located in the area of the roadway rendered in the map area 1502.

The settings area 1504 may allow a user to select features of the host vehicle. For example, the settings area 1504 may allow a user to select whether the user wishes the host vehicle to operate as a principal vehicle or a subordinate vehicle at status selection 1518. For example, the host vehicle may have an autonomy level such that the host vehicle can act as a principal vehicle and/or a subordinate vehicle. Suppose that the host vehicle has a Level 4 autonomy level. Accordingly, the host vehicle can act as a principal vehicle to a subordinate vehicle having a lower level of autonomy or in conjunction with another principal vehicle in a cooperative automation chain.

Alternatively or additionally, the host vehicle may act as a subordinate vehicle to a vehicle having a sufficient autonomy level. Therefore, a user can choose whether the host vehicle acts as a principal vehicle or a subordinate vehicle using the status selection 1518. In this manner, the user can select whether the host vehicle broadcasts as a principal vehicle or a subordinate vehicle by selecting a radio button or other input interface. Other selectable features of the host vehicle may include, but are not limited to, the cooperating parameters to exchange with other cooperating vehicles, the cooperating vehicle profile to be shared, etc.

In addition to filtering the display results for cooperating vehicles, the settings area 1504 may provide a way for the user to set meeting preferences. For example, a user may identify a preference to schedule a meeting with a location, for example using a destination indicator 1506, or schedule a meeting with a specific vehicle, for example, using a vehicle icon such as the first vehicle icon 1508, using a meet selection 1520. Other meeting preferences may include, but are not limited to, how the rendezvous is conducted, how a user is prompted when cooperating vehicles meet, etc.

Figure 16:
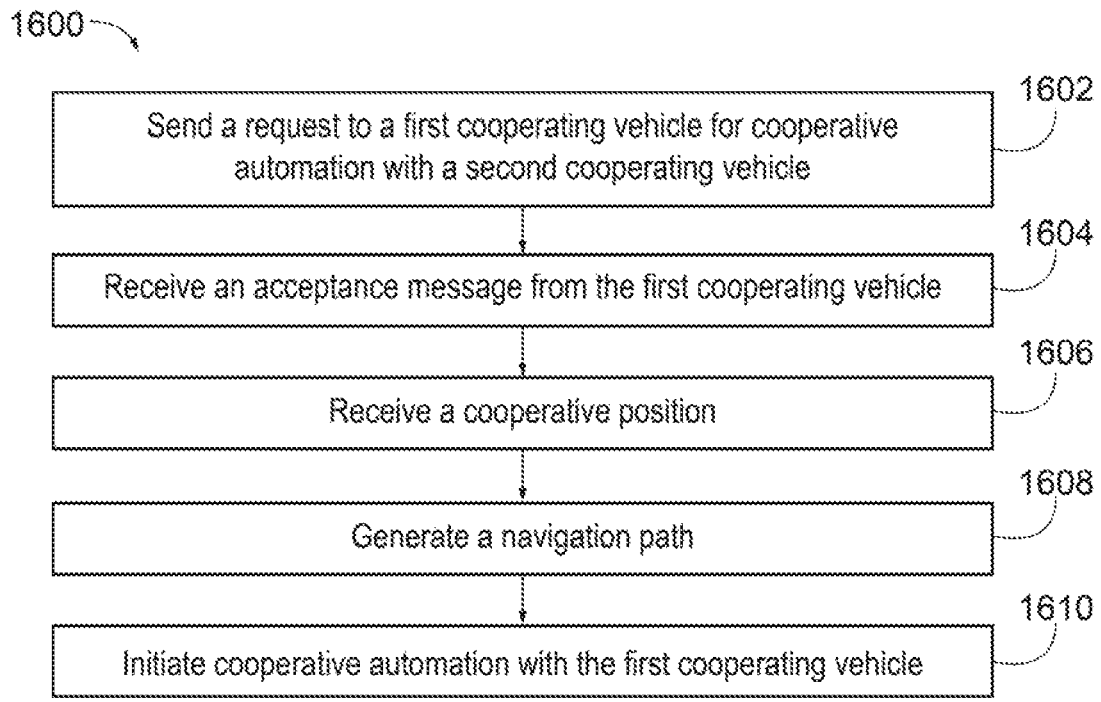
FIG. 16 is a process flow for shared autonomy using a visual representation according to one embodiment.

FIG. 16 is a process flow for shared autonomy using a visual representation according to one embodiment. FIG. 16 will be described with reference to FIGS. 1, 2, and 16. In particular, the method 1600 will be described with respect to the operating environment 200. For example, the VCD 202 may be used in conjunction with the display 250 of the infotainment system 248 and/or the portable device 254. In one embodiment, the VCD 202 may be accessed thought the display 250 and/or the portable device 254. Additionally or alternatively, the VCD 202 may be have one or more modules, components, or units distributed, combined, omitted or organized with other components or into different architectures on the display 250 and/or the portable device 254.

At block 1602, a request is sent to a first cooperating vehicle for cooperative automation from a second cooperating vehicle. The request may be sent by the rendezvous module 222 using a visual representation 1500. A user may interface with the visual representation 1500 using the display 250 and/or the portable device 254. The first cooperating vehicle may be selected based on a visual representation 1500 of the first cooperating vehicle. For example, the first cooperating vehicle may be selected by selecting a vehicle icon such as a first vehicle icon 1508, a second vehicle icon 1510, a third vehicle icon 1512, or a fourth vehicle icon 1514, shown in FIG. 15. The first cooperating vehicle may be selected based on its autonomy level. For example, the first cooperating vehicle may have a first autonomy level and the second cooperating vehicle may have a second autonomy level that is different than the first autonomy level. The visual representation 1500 may have icons that identify both the first cooperating vehicle and the second cooperating vehicle.

At block 1604, an acceptance message is received in response to the request from the first cooperating vehicle. The acceptance message may be received by the rendezvous module 222 or received remotely and sent to the rendezvous module 222 using wireless network antenna 234, roadside equipment 252, and/or the communication network 220 (e.g., a wireless communication network), or other wireless network connections. In another embodiment, the acceptance message may be received at a portable device 254. For example, the acceptance message may be received as an audio and/or visual prompt associated with the visual representation 1500.

At block 1606, a cooperative position is received at the second cooperating vehicle. The cooperative position describes a position of the second cooperating vehicle relative to the first cooperating vehicle.

At block 1608, a navigation path is generated that when executed causes the second cooperating vehicle to be within a predetermined radius of the first cooperating vehicle. The navigation path may be rendered in real-time on the visual representation 1500 and is modified to illustrate the relative position of the first cooperating vehicle and the second cooperating vehicle. In some embodiments, following the navigation path causes the second cooperating vehicle to assume the cooperative position.

At block 1610, cooperative automation is initiated with the first cooperating vehicle when the first cooperating vehicle and the second cooperating vehicle are positioned in the cooperative position.

Figure 17:
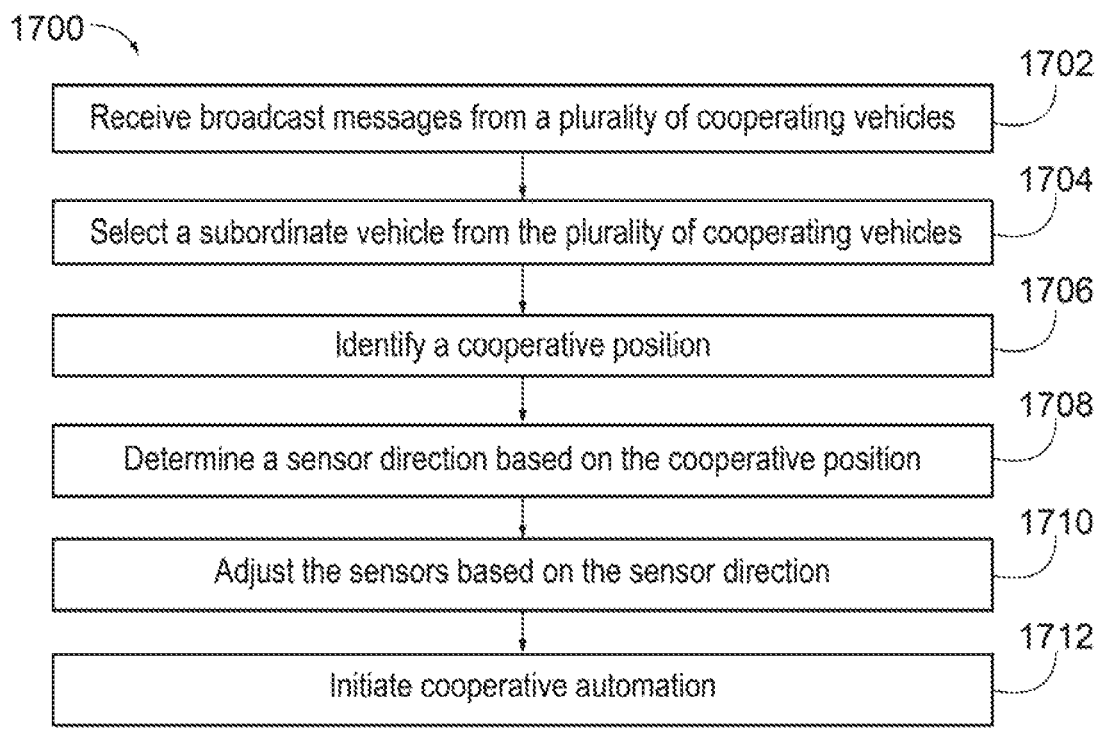
FIG. 17 is a process flow for shared autonomy with a cooperative position sensor adjustment according to one embodiment.

FIG. 17 is a process flow for shared autonomy with a cooperative position sensor adjustment according to one embodiment. FIG. 17 will be described with reference to FIGS. 1 and 2. In particular, the method 1700 will be described with respect to the operating environment 200.

At block 1702, broadcast messages are received from a plurality of cooperating vehicles on the roadway. The cooperating vehicles may include a principal vehicle 106 and the subordinate vehicle 108. In one embodiment, each cooperating vehicle of the plurality of cooperating vehicles has an autonomy level. The broadcast message received from a cooperating vehicle of the plurality of cooperating vehicles may include a vehicle identifier and an autonomy level of the cooperating vehicle. The broadcast message may include a cooperative proposal with one or more cooperating parameters.

At block 1704, a subordinate vehicle 108 is selected from the plurality of cooperating vehicles. The subordinate vehicle 108 may be selected based on the subordinate vehicle 108 having a lower autonomy level of the subordinate vehicle 108 as compared to the principal vehicle 106. Additionally or alternatively, the subordinate vehicle 108 may be selected due to the proximity of the subordinate vehicle 108 to the principal vehicle 106. Moreover, the subordinate vehicle 108 may be selected based on a cooperating proposal and or one or more cooperating parameters broadcast by the subordinate vehicle 108 in a broadcast message. In another embodiment, the subordinate vehicle 108 may be selected due to a response or acceptance of the cooperating proposal and or one or more cooperating parameters broadcast by the principal vehicle 106 in a broadcast message.

At block 1706, a cooperative position is determined for the principal vehicle 106 and the subordinate vehicle 108. The cooperative position may be determined by the principal vehicle 106. The cooperative position may be sent to the subordinate vehicle 108 in a position message. The position message may also include a cooperative position plan that has one or more actions, which if executed by the subordinate vehicle 108, will cause the subordinate vehicle 108 to be arranged, with the principal vehicle 106, in the cooperative position.

At block 1708, a sensor direction is determined for at least one sensor of the principal vehicle 106 based on the cooperative position. For example, the at least one sensor may include a light sensor 110 and one or more principal image sensors 112a, 112b, 112c, 112d, 112e, and 112f. The sensor direction may be determined to focus the field of view of the at least one sensor in a predetermined area. The sensor direction may include sensor factors that affect the at least one sensor's ability to capture sensor data. For example, the sensor factors may include location, range, field of view, sensitivity, actuation, and timing, among of others.

As discussed above with respect to FIG. 1, the light sensor 110 captures principal sensor data in a light sensing area 111 and the one or more principal image sensors 112a, 112b, 112c, 112d, 112e, and 112f for capture principal sensor data in corresponding image sensing principal areas 113a, 113b, 113c, 113d, 113e, and 113f. The sensor direction may be determined based on a desired area. The desired area may be the area where a cooperating vehicle is located. In another embodiment, the desired area may be an area which is a sensor gap between the cooperating vehicles. Thus, the sensor direction can accommodate cooperative automation and/or correct sensor issues. The sensor direction may be represented as a coordinate shift the light sensing area 111 and the image sensing areas 113a-113f to focus the at least one sensors.

In another embodiment, a sensor direction may additionally or alternatively be determined for at least one sensor of the subordinate vehicle 108 based on the cooperative position. For example, the subordinate vehicle 108 may include one or more subordinate image sensors 114a, 114b, 114c, 114d, and 114e. The one or more subordinate image sensors 114a-114e capture subordinate sensor data from the corresponding image sensing subordinate areas 115a, 115b, 115c, 115d, and 115e. For example, the principal vehicle 106 may determine a sensor direction of at least one sensor of the subordinate vehicle 108.

At block 1710, the sensors of the principal vehicle 106 are adjusted based on the determined sensor direction. For example, the sensor factors, such as the location, range, field of view, sensitivity, actuation, and/or timing, of the light sensor 110 and/or the one or more principal image sensors 112a-112f may be adjusted in accordance with the sensor direction. Likewise, the sensor factors of the one or more subordinate image sensors 114a-114e may be adjusted based on the determined sensor direction. In one embodiment, the perception module 228. Therefore, the sensors can be adjusted to facilitate cooperative autonomy between the cooperating vehicles.

At block 1712, cooperative automation is initiated with the subordinate vehicle according to the at least one cooperating parameter. The cooperative automation is initiated in response to the principal vehicle and the subordinate vehicle being positioned in the cooperative position.

Figure 18:
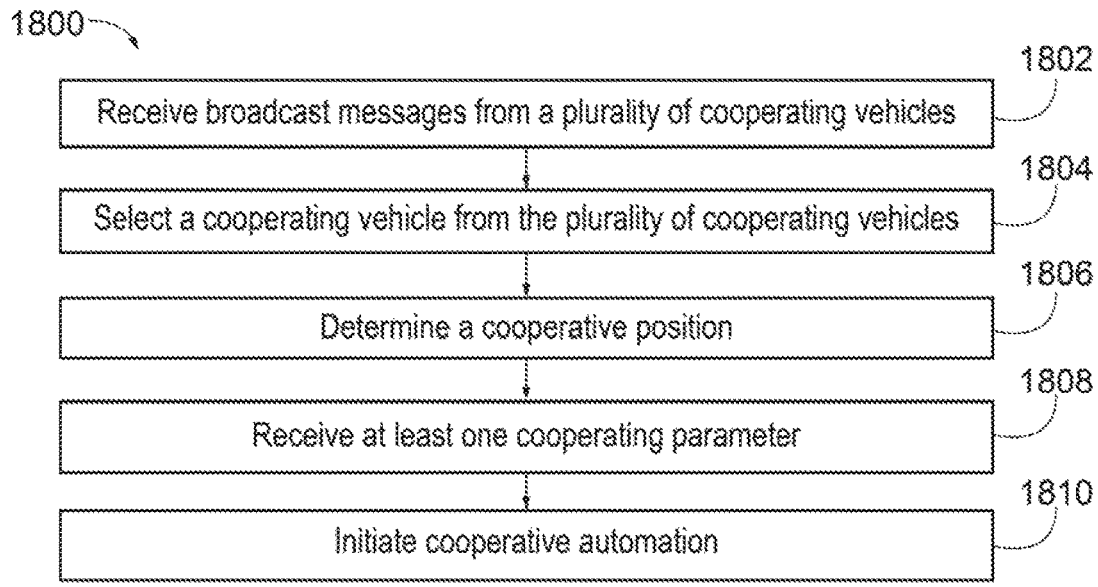
FIG. 18 is a process flow for shared autonomy according to one embodiment.

FIG. 18 is a process flow for shared autonomy with a business parameter negotiation according to one embodiment. FIG. 18 will be described with reference to FIGS. 1 and 2. In particular, the method 1800 will be described with respect to the operating environment 200.

At block 1802, broadcast messages are received from a plurality of cooperating vehicles on the roadway. Block 1802 operates in a similar manner as described with respect to blocks 1602 and 1702. For example, each cooperating vehicle of the plurality of cooperating vehicles has an autonomy level. The broadcast message received from a cooperating vehicle of the plurality of cooperating vehicles may include a vehicle identifier and an autonomy level of the cooperating vehicle.

At block 1804, a subordinate vehicle 108 is selected from the plurality of cooperating vehicles based on a lower autonomy level of the subordinate vehicle 108 as compared to the principal vehicle 106. Block 1804 operates in a similar manner as described with respect to blocks 1604 and 1704.

At block 1806, a cooperative position is determined for the principal vehicle 106 and the subordinate vehicle 108. Block 1806 operates in a similar manner as described with respect to blocks 1606 and 1706.

At block 1808, at least one cooperating parameter is received from the subordinate vehicle 108. The at least one cooperating parameter defines a behavioral aspect of the subordinate vehicle 108 during cooperative automation. For example, the cooperating parameter may define a range speeds of that the vehicle occupant of the subordinate vehicle 108 would like to travel. Thus, cooperating parameters may inform the principal vehicle 106 how the subordinate vehicle 108 should be directed to maneuver during cooperative automation. The at least one cooperating parameter may be received individually or as a part of cooperating proposal and/or cooperating vehicle profile.

At block 1810, cooperative automation is initiated with the subordinate vehicle 108 according to the at least one cooperating parameter. The cooperative automation may be initiated when the subordinate vehicle 108 enters a shared autonomy mode. The cooperative automation is initiated in response to the principal vehicle 106 and the subordinate vehicle 108 being positioned in the cooperative position. During cooperative automation, the subordinate vehicle 108 receives actions to execute from the principal vehicle 106. For example, the subordinate vehicle 108 may receive a behavior plan from the principal vehicle 106. By executing the actions from the principal vehicle 106, the subordinate vehicle 108 appears to operate with a higher level of autonomy than the subordinate vehicle 108 inherently has until handoff occurs.

In some embodiments, the hand off procedure may be initiated based on the actions of the vehicle occupant of the principal vehicle 106 or the subordinate vehicle 108. For example, the perception module 228 may use the vehicle sensors 206 to monitor the vehicle occupant. Additionally or alternatively, the principal vehicle subsystems 402 of the principal vehicle 106 or the subordinate vehicle subsystems 404 of the subordinate vehicle 108 may perform, facilitate, or enable monitoring of the vehicle occupant.

Figure 19:
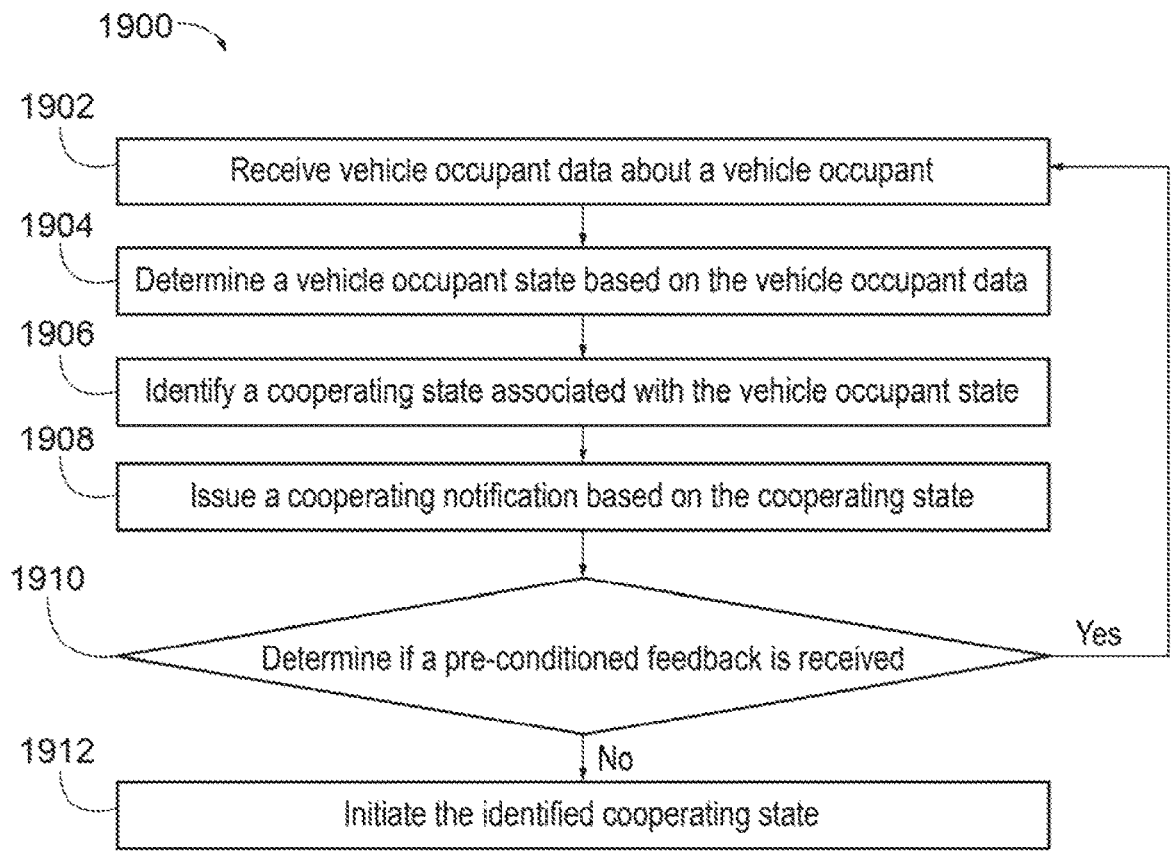
FIG. 19 is a process flow for shared autonomy based on a vehicle occupant state according to one embodiment.

FIG. 19 is a process flow for shared autonomy based on a vehicle occupant state according to one embodiment. FIG. 19 will be described with reference to FIGS. 1-3. In particular, the method 1900 will be described with respect to the operating environment 200.

At block 1902, the principal vehicle 106 and/or the subordinate vehicle 108 may receive the vehicle occupant data. The vehicle occupant data may be received in any stage of cooperation. For example, the vehicle occupant data may be collected during the rendezvous stage, the cooperative positioning stage, the parameter negotiation stage, and/or the cooperative perception stage. Accordingly, while the method 1900 is discussed with respect to the perception module 228, the method may occur in any stage of cooperation. Furthermore, as described above, the cooperating vehicles may share vehicle occupant data from one or more of the sensors.

The vehicle occupant data may measure a body temperature, a pulse, a pulse rate or heart rate, a respiration rate, perspiration rate, a blood pressure, demographic data, eye movement, facial movement, body movement, head movement, gesture recognition, carbon dioxide output, consciousness, or other biometric or functional aspects of the vehicle occupant. Eye movement can include, for example, pupil dilation, degree of eye or eyelid closure, eyebrow movement, gaze tracking, blinking, and squinting, among others. Eye movement can also include eye vectoring including the magnitude and direction of eye movement/eye gaze. Facial movements can include various shape and motion features of the face (e.g., nose, mouth, lips, cheeks, and chin). For example, facial movements and parameters that can be sensed, monitored and/or detected include, but are not limited to, yawning, mouth movement, mouth shape, mouth open, the degree of opening of the mouth, the duration of opening of the mouth, mouth closed, the degree of closing of the mouth, the duration of closing of the mouth, lip movement, lip shape, the degree of roundness of the lips, the degree to which a tongue is seen, cheek movement, cheek shape, chin movement, and chin shape, among others. Head movement includes direction (e.g., forward-looking, non-forward-looking) the head of the driver is directed to with respect to the vehicle, head vectoring information including the magnitude (e.g., a length of time) and direction of the head pose.

At block 1904, the vehicle occupant data is utilized to determine a vehicle occupant state. The perception module 228, the principal vehicle subsystems 402 of the principal vehicle 106, and/or the subordinate vehicle subsystems 404 of the subordinate vehicle 108 may utilize the vehicle occupant data to determine and/or measure the vehicle occupant state. The vehicle occupant states may include drowsiness, attentiveness, distractedness, vigilance, impairedness, intoxication, stress, emotional states and/or general health states, among others of the vehicle occupant. The perception module 228 may include and/or access a database, look-up table, algorithm, decision tree, protocol, etc. to determine the vehicle occupant state. Moreover, the vehicle occupant state may be assigned a level and/or value that indicates the intensity of the vehicle occupant state.

At block 1906, a corresponding cooperating state of the principal vehicle 106 and/or the subordinate vehicle 108 is identified. The cooperating state determines the manner in which the cooperating vehicles should cooperate, compliance in the parameter negotiation stage, future processes for cooperation. The cooperating state, for example, may include continuing the cooperation as is, proposing that a cooperating parameter be modified, or initiating a change in cooperation, such as by initiating a handoff or emergency handoff. For example, suppose that it is determined that a vehicle occupant is drowsy. The perception module 228 may identify that cooperating state as requiring an emergency handoff. For example, identifying the cooperating state as requiring an emergency handoff may include may cause the principal vehicle 106 to pull to the side of the roadway, the subordinate vehicle 108 to turn on hazard lights (not shown) and/or to alert a third party, such as emergency services regarding a vehicle occupant, the principal vehicle 106, and/or the subordinate vehicle 108. In another example, a business parameter may set, altered or proposed based on the cooperating state. For example, if the vehicle occupant of the subordinate vehicle 108 is drowsy, the principal vehicle 106 may charge more per mile for cooperative automation, such as $0.10 per mile rather than $0.05 per mile when the vehicle occupant state is drowsy. Accordingly, the subordinate vehicle 508 may object to being charged $0.10. Likewise, the parameter negotiation may require that the vehicle occupant state satisfy a threshold that corresponds to a cooperating state that results in cooperative automation. The perception module 228 may again include and/or access a database, look-up table, algorithm, decision tree, protocol, etc. to identify the cooperating state.

At block 1908, a cooperation notification is issued based on the cooperating state. The perception module 228 may cause the cooperating notification to be issued to one or more vehicle occupants of the principal vehicle 106, and/or the subordinate vehicle 108. The cooperation notification may utilize the display 250 of the infotainment system 248 or lights associated with a cooperating vehicle including dashboard lights, roof lights, cabin lights, or any other lights. The cooperation notification may also generate various sounds using speakers in a cooperating vehicle. The sounds could be spoken words, music, alarms, or any other kinds of sounds. Moreover, the volume level of the sounds could be chosen to ensure the vehicle occupant is put in an alert state by the sounds. The type of cooperating notification may be based on the type of vehicle occupant state and/or vehicle occupant data including demographic information about the vehicle occupant.

Suppose that the vehicle occupant of the subordinate vehicle 108 is determined to be drowsy. The cooperation notification may notify the vehicle occupant of the subordinate vehicle 108 that the vehicle occupant state is drowsy using an alarm. In this example, the notification may act as an alert that gives the vehicle occupant of the subordinate vehicle 108 an opportunity to achieve a minimum state of alertness. For example, the cooperation notification may be issued a predetermined number of times and/or for a predetermined length. In another embodiment, additional cooperating vehicles, for example, in a cooperating chain may be notified. Continuing the example from above in which the vehicle occupant of the subordinate vehicle 108 receives an issued cooperating notification, the principal vehicle 106 may also receive a cooperation notification. The cooperation notification may be sent via the remote transceiver 232 of the cooperating vehicle 218, over remote networks by utilizing a wireless network antenna 234, roadside equipment 252, and/or the communication network 220 (e.g., a wireless communication network), or other wireless network connections.

In some embodiments, one or more criteria could be used to determine if a second cooperating vehicle should be notified of the vehicle occupant state detected by the host vehicle, here, the subordinate vehicle 108. In embodiments where multiple vehicle systems are in communication with one another, the perception module 228 may broadcast a cooperating notification to any communicating vehicles within a predetermined distance. For example, the perception module 228 of the subordinate vehicle 108 may broadcast a cooperative notification to any vehicles within a ten meter distance to inform other vehicles and/or vehicle occupants that the vehicle occupant of the subordinate vehicle 108 is incapacitated and is unable to independently control the subordinate vehicle 108.

In another embodiment, a predetermined number of cooperating notifications may be issued to the host vehicle. Also, the cooperating notifications may increase with the intensity of the vehicle occupant state and/or with each iteration of the cooperating notifications. In some embodiments, the timing and/or intensity associated with various cooperating notifications could also be modified according to the level of distraction. For example, an initial cooperating notification may include an audio alert, while a subsequent cooperating notification may use an electronic pretensioning system to increase or decrease the intensity and/or frequency of automatic seat belt tightening. Accordingly, the cooperating notification may escalate. In this manner, the cooperating notification may gain the vehicle occupant's attention in order to prompt the user to act. For example, the vehicle occupant may be able to stop, delay, mute, or otherwise impede receiving the cooperating notifications by providing feedback. The feedback may be a gesture, such as a haptic feedback, a vocal response, providing an entry on the portable device 254, etc.

The cooperation notification may be delayed to allow the vehicle occupant to self-correct the vehicle occupant state. The length of the delay may be based on the vehicle occupant state, cooperating state, and/or vehicle occupant data including demographic information about the vehicle occupant. For example, if the vehicle occupant state indicates that the vehicle occupant has unbuckled the seatbelt, the cooperation notification may be delayed by ten seconds to allow the vehicle occupant time to re-buckle the seatbelt before a cooperation notification is issued. The delay may also snooze the cooperation notification before a second iteration of the cooperation notification.

At block 1910, it is determined whether a pre-conditioned feedback is received. The pre-conditioned feedback may be feedback from the principal vehicle 106, the subordinate vehicle 108, or a vehicle occupant of either. In the example in which the vehicle occupant of the subordinate vehicle 108 is drowsy, a pre-conditioned feedback may be the vehicle sensors 206 determining that a vehicle occupant's hands are in contact with the front and/or back of the touch steering wheel (e.g., gripped and wrapped around the steering wheel). Additionally or alternatively, the pre-conditioned feedback may be received from another cooperating vehicle. For example, the pre-conditioned feedback may include a vehicle occupant of the principal vehicle 106 acknowledging the vehicle occupant state of the vehicle occupant of the subordinate vehicle 108. Accordingly, there are many forms of feedback which may vary based on the intensity of the vehicle occupant state, the origination of the feedback the type, or number of cooperating notifications.

In addition to stopping an escalating cooperative notification, the pre-conditioned feedback may return the subordinate vehicle 108 of this example to its cooperation with the principal vehicle 106 as it is being conducted. Accordingly, the method 1900 returns to the receiving sensor data about the vehicle occupant at block 1902. And the cooperating vehicles continue monitoring the vehicle occupants.

If it is determined that the pre-conditioned feedback was not received, the method continues to block 1912. At block 1912, the identified cooperating state is initiated. For example, if the identified cooperating state was a control hand-off, then the control hand-off is initiated in the manner described above, for example, with respect to FIG. 3. In this manner, the cooperative notification may be repeated and/or escalated a predetermined number of times before the identified cooperating state is initiated. Accordingly, the cooperation of the cooperating vehicles can be altered based on the state of the vehicle occupants.

In one embodiment, the cooperating state maybe escalated. Suppose that the cooperating state is a control handoff. The control handoff may require further action from a vehicle occupant. For example, the control handoff may require that a vehicle occupant have their hands on the steering wheel of the principal vehicle 506 and/or that a vehicle occupant have their hands on the steering wheel of the subordinate vehicle 508. Suppose, that none of the vehicle occupants place their hands on the steering wheel of subordinate vehicle 508 as required in the control handoff, then the control handoff may be escalated to an emergency handoff. An emergency handoff may halt principal vehicle and/or subordinate vehicle 508 quickly and safely. The escalated cooperating state, here the emergency handoff, may be performed to grow, develop, increase, heighten, strengthen, intensify, and/or accelerate the effects of the cooperating state. For example, if the control handoff provides control back to a vehicle occupant of the subordinate vehicle 508, the emergency handoff may reduce the requirements (e.g., hands on steering wheel, maintaining speed of a cooperating vehicle, etc.) to affect the handoff as soon as possible in the safest manner possible. In this manner, the cooperating state can also evolve based on the vehicle occupant data.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A cooperative sensing system of a principal vehicle for providing enhanced autonomy to a subordinate vehicle having a vehicle occupant on a roadway, the cooperative sensing system comprising:
   a rendezvous module configured to:
      receive broadcast messages from a plurality of cooperating vehicles on the roadway, wherein a broadcast message received from a cooperating vehicle of the plurality of cooperating vehicles includes a vehicle identifier and an autonomy level of the cooperating vehicle, wherein the autonomy level is selected from a set of autonomy levels; and
      select the subordinate vehicle from the plurality of cooperating vehicles based on a differential autonomy based on a comparison of the autonomy level from the set of autonomy levels associated with the subordinate vehicle with the autonomy level from the set of autonomy levels associated with the principal vehicle;
   a positioning module configured to determine a cooperative position of the principal vehicle and the subordinate vehicle;
   a negotiation module configured to receive at least one cooperating parameter from the subordinate vehicle, wherein the parameter defines a behavioral aspect of the subordinate vehicle; and
   a perception module configured to:
      initiate cooperative automation with the subordinate vehicle according to the at least one cooperating parameter when the principal vehicle and the subordinate vehicle are positioned in the cooperative position, and
      initiate a hand off procedure, by the principal vehicle, based on monitoring of the vehicle occupant of the subordinate vehicle.

2. The cooperative sensing system of claim 1, wherein the differential autonomy is based on the subordinate vehicle having a lower autonomy level from the set of autonomy levels of the subordinate vehicle as compared to the principal vehicle.

3. The cooperative sensing system of claim 1, wherein the cooperative position defines the subordinate vehicle being inline and directly behind the principal vehicle.

4. The cooperative sensing system of claim 1, wherein the positioning module further comprises sending a position message to the subordinate vehicle that provides vectoring instructions for the subordinate vehicle to assume the cooperative position.

5. The cooperative sensing system of claim 1, wherein the at least one cooperating parameter is a kinematic parameter that defines kinematic operation of the subordinate vehicle.

6. The cooperative sensing system of claim 1, wherein the at least one cooperating parameter is a relative parameter that defines relative behavior between the principal vehicle and the subordinate vehicle.

7. The cooperative sensing system of claim 1, wherein the negotiation module is further configured to send a cooperative proposal to the subordinate vehicle.

8. The cooperative sensing system of claim 7, wherein the cooperative proposal includes a pecuniary arrangement for the cooperative automation.

9. The cooperative sensing system of claim 1, wherein the perception module is further configured to receive subordinate sensor data from the subordinate vehicle and send navigation data to the subordinate vehicle based on the subordinate sensor data.

10. The cooperative sensing system of claim 9, wherein the navigation data is also based on principal sensor data from sensors of the principal vehicle.

11. The cooperative sensing system of claim 1, wherein the subordinate vehicle participates in cooperative automation with the principal vehicle until the principal vehicle reaches a geofence.

12. The cooperative sensing system of claim 11, wherein to initiate the hand off procedure the perception module is configured to send a handoff message to the subordinate vehicle.

13. A computer-implemented method for a principal vehicle to provide enhanced autonomy to a subordinate vehicle on a roadway, comprising:
  receiving broadcast messages from a plurality of cooperating vehicles on the roadway, wherein a broadcast message received from a cooperating vehicle of the plurality of cooperating vehicles includes an autonomy level of the cooperating vehicle, wherein the autonomy level is selected from a set of autonomy levels;
  selecting the subordinate vehicle, from the plurality of cooperating vehicles, by the principal vehicle, based on a differential autonomy based on a comparison of the autonomy level from the set of autonomy levels associated with the subordinate vehicle with the autonomy level from the set of autonomy levels associated with the principal vehicle;
  determining a cooperative position of the principal vehicle and the subordinate vehicle;
  sending a cooperative proposal to the subordinate vehicle, wherein the cooperative proposal includes a pecuniary arrangement for the cooperative automation;
  receiving acceptance of the cooperative proposal;
  receiving at least one cooperating parameter from the subordinate vehicle, wherein the cooperating parameter defines a behavioral aspect of the subordinate vehicle;
  controlling the subordinate vehicle according to the at least one cooperating parameter when the principal vehicle and the subordinate vehicle are positioned in the cooperative position; and
  initiating a hand off procedure, by the principal vehicle, based on monitoring of the vehicle occupant of the subordinate vehicle.

14. The computer-implemented method of claim 13, further comprising:
  receiving rearward subordinate sensor data from the subordinate vehicle;
  combining the rearward subordinate sensor data with principal sensor data from the principal vehicle to generate combined sensor data; and
  planning a path for the cooperative automation based on the combined sensor data.

15. The computer-implemented method of claim 14, wherein controlling the subordinate vehicle includes sending navigation data, based on the planned path, to the subordinate vehicle.

16. The computer-implemented method of claim 15, wherein the navigation data includes steering information for the subordinate vehicle based on the cooperative position.

17. A non-transitory computer-readable storage medium including instructions for a principal vehicle to provide enhanced autonomy to a subordinate vehicle on a roadway, that when executed by a processor cause the processor to:
  receive broadcast messages from a plurality of cooperating vehicles on the roadway, wherein a broadcast message received from a cooperating vehicle of the plurality of cooperating vehicles includes an autonomy level of the cooperating vehicle;
  select the subordinate vehicle from the plurality of cooperating vehicles based on a differential autonomy based on a comparison of the autonomy level from the set of autonomy levels associated with the subordinate vehicle with the autonomy level from the set of autonomy levels associated with the principal vehicle;
  determine a cooperative position of the principal vehicle and the subordinate vehicle;
  receive at least one cooperating parameter from the subordinate vehicle, wherein the cooperating parameter defines a behavioral aspect of the subordinate vehicle;
  receive subordinate sensor data from the subordinate vehicle;
  combine the subordinate sensor data with principal sensor data from the principal vehicle to generate combined sensor data;
  plan a path based on the combined sensor data;
  control the subordinate vehicle on the planned path according to the at least one cooperating parameter when the principal vehicle and the subordinate vehicle are positioned in the cooperative position; and
  initiating a hand off procedure, by the principal vehicle, based on monitoring of the vehicle occupant of the subordinate vehicle.

18. The non-transitory computer-readable storage medium of claim 17, wherein initiating the hand off procedure includes sending a handoff message to the subordinate vehicle in response to determining a vehicle occupant state.

19. The non-transitory computer-readable storage medium of claim 18, wherein the vehicle occupant state is based on vehicle occupant data from monitoring the vehicle occupant of the subordinate vehicle.

20. The non-transitory computer-readable storage medium of claim 18, wherein the vehicle occupant state is assigned a value that indicates an intensity of the vehicle occupant state.

* * * * *